United States Patent
Park et al.

(10) Patent No.: US 11,277,252 B2
(45) Date of Patent: Mar. 15, 2022

(54) METHOD AND APPARATUS FOR TRANSMITTING PPDU ON BASIS OF FDR IN WIRELESS LAN SYSTEM

(71) Applicant: LG ELECTRONICS INC., Seoul (KR)

(72) Inventors: Eunsung Park, Seoul (KR); Jeongki Kim, Seoul (KR); Kiseon Ryu, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/040,497

(22) PCT Filed: Mar. 6, 2019

(86) PCT No.: PCT/KR2019/002570
§ 371 (c)(1),
(2) Date: Sep. 22, 2020

(87) PCT Pub. No.: WO2019/182267
PCT Pub. Date: Sep. 26, 2019

(65) Prior Publication Data
US 2021/0028917 A1    Jan. 28, 2021

(30) Foreign Application Priority Data
Mar. 23, 2018 (KR) .................... 10-2018-0034153

(51) Int. Cl.
*H04W 84/12* (2009.01)
*H04L 5/14* (2006.01)

(52) U.S. Cl.
CPC .............. *H04L 5/14* (2013.01); *H04W 84/12* (2013.01)

(58) Field of Classification Search
CPC ................................. H04L 5/14; H04W 84/12
(Continued)

(56) References Cited

U.S. PATENT DOCUMENTS

| 2015/0172038 A1 | 6/2015 | Jiang et al. |
| 2017/0055284 A1 | 2/2017 | Min et al. |
| 2017/0170946 A1 | 6/2017 | Min et al. |

FOREIGN PATENT DOCUMENTS

WO    2016/089059    6/2016

OTHER PUBLICATIONS

PCT International Application No. PCT/KR2019/002570, International Search Report dated Jun. 19, 2019, 2 pages.

(Continued)

*Primary Examiner* — Angel T Brockman
(74) *Attorney, Agent, or Firm* — Lee, Hong, Degerman, Kang & Waimey PC

(57) ABSTRACT

A method and an apparatus for transmitting and receiving PPDU on the basis of FDR in a wireless LAN system are presented. Specifically, an AP generates FDR indication information that FDR can be performed. The AP transmits a DL PPDU including the FDR indication information to a first STA. The AP receives a UL PPDU from the first STA. The DL PPDU includes a legacy signal field, a first signal field, a second signal field, a third signal field, and a DL data field. The second signal field includes information on an RU placement in the entire frequency band and allocation information for a first RU to which the DL data field is allocated. The third signal field includes allocation information for a second RU to which the UL PPDU is allocated on the basis of the information on the RU placement. The allocation information for the second RU includes a bitmap of whether the UL PPDU is allocated in units of 26 RUs.

16 Claims, 46 Drawing Sheets

(58) Field of Classification Search
USPC .......................................................... 370/277
See application file for complete search history.

(56) References Cited

OTHER PUBLICATIONS

Huawei, "Full Duplex Benefits and Challenges," IEEE 802.11-18/0448r1, Feb. 13, 2018, 12 pages.

FIG. 1
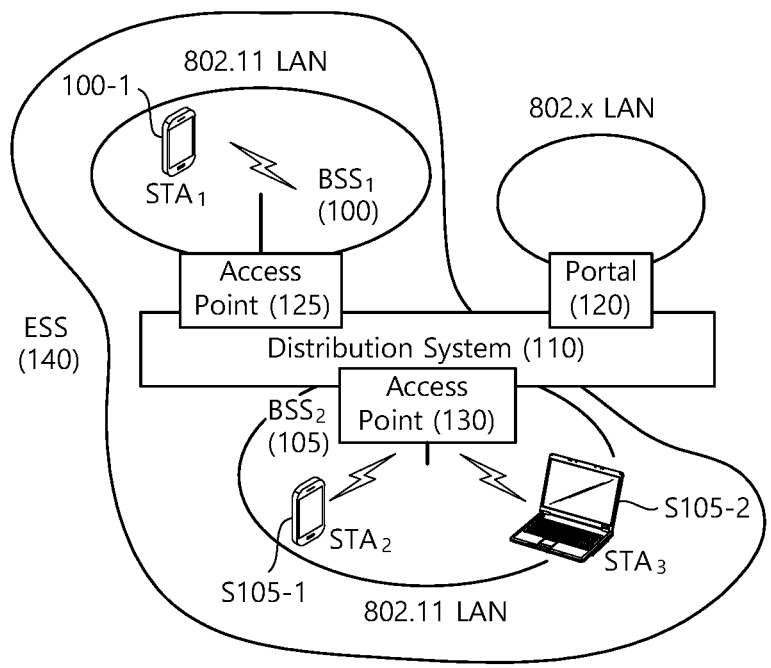
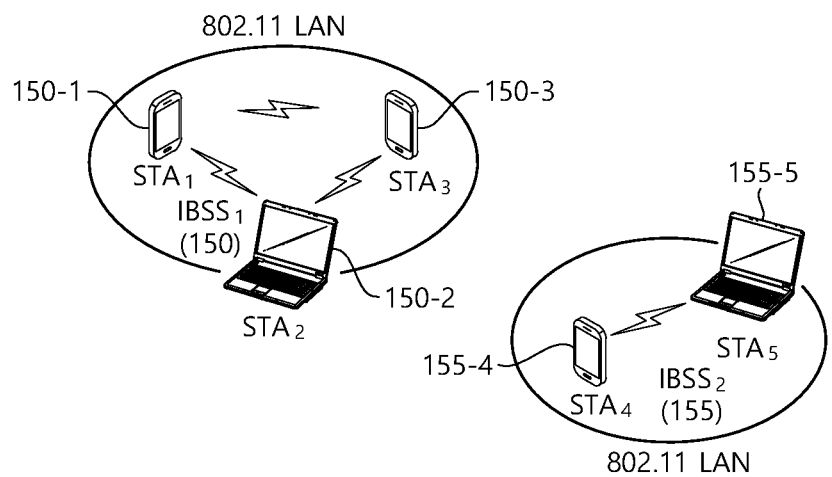

Self-interference is millions to billions(60-90dB)
stronger than received signal

FIG. 23

| L-STF | L-LTF | L-SIG | RL-SIG | FDR-SIG-A | FDR-SIG-B | FDR-SIG-C | FDR-STF | FDR-LTF | Data for STA 1 |
|---|---|---|---|---|---|---|---|---|---|
| | | | | | | | | | Data for STA 2 |

FIG. 24

| L-STF | L-LTF | L-SIG | RL-SIG | FDR-SIG-A | FDR-SIG-B | FDR-STF | FDR-LTF | Data for STA 1 |
|---|---|---|---|---|---|---|---|---|
| | | | | | | | | Data for STA 2 |

FIG. 25

| FDR-STF | FDR-LTF | FDR-SIG-A | Data for STA 3 |

FIG. 26

| FDR-STF | FDR-LTF | Data for STA 3 |

FIG. 29

| FDR-STF | FDR-LTF | Data for STA 3 |
| --- | --- | --- |
| FDR-STF | FDR-LTF | Data for STA 4 |

| FDR-STF | FDR-LTF | Data for STA 3 |

FIG. 36

| FDR-STF | FDR-LTF | Data for STA 3 |
|---|---|---|
| | | Data for STA 4 |

FIG. 37

| FDR-STF | FDR-LTF | Data for STA 3 & STA 4 |

METHOD AND APPARATUS FOR TRANSMITTING PPDU ON BASIS OF FDR IN WIRELESS LAN SYSTEM

CROSS-REFERENCE TO RELATED APPLICATIONS

This application is the National Stage filing under 35 U.S.C. 371 of International Application No. PCT/KR2019/002570, filed on Mar. 6, 2019, which claims the benefit of earlier filing date and right of priority to Korean Application No. 10-2018-0034153, filed on Mar. 23, 2018, the contents of which are all hereby incorporated by reference herein in their entirety.

BACKGROUND

Field

The present specification relates to a scheme of performing full duplex radio (FDR) in a wireless local area network (WLAN) system, and more particularly, to a method and apparatus for transmitting a physical layer protocol data unit (PPDU) by using the FDR in the WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY

The specification proposes a method and apparatus for transmitting a physical layer protocol data unit (PPDU), based on full duplex radio (FDR) in a wireless local area network (WLAN) system.

According to an embodiment, the present specification proposes a method of transmitting/receiving a PPDU, based on FDR.

The present embodiment proposes a PPDU based on an FDR operation, assuming that self-interference, which is a major obstacle in performing FDR, can be successfully removed from a PHY layer.

The present embodiment may be performed in a network environment in which a next-generation WLAN system is supported. The next-generation WLAN system is a WLAN system evolved from an 802.11ax system, and may satisfy backward compatibility with the 802.11ax system.

To summarize the terms, an HE MU PPDU, an HE TB PPDU, an HE SU PPDU, an HE-SIG-A field, an HE-SIG-B field, an HE-STF field, and an HE-LTF field may all be PPDUs and fields defined in the 802.11ax system. An FDR MU PPDU, an FDR TB PPDU, an FDR-SIG-A field (first signal field), an FDR-SIG-B field (second signal field), an FDR-STF field, and an FDR-LTF field may be PPDUs and fields defined in the next-generation WLAN system to perform FDR. An FDR-SIG-C field (third signal field) may be a signal field newly defined in the next-generation WLAN system to perform FDR. However, the PPDU and field defined to perform FDR may be generated by directly using the HE PPDU and HE field to satisfy backward compatibility with the 802.11ax system. A trigger frame is a (MAC) frame defined in the 802.11ax system, and a field may be added or changed to perform FDR.

The present embodiment may be performed in a transmitting device, and the transmitting device may correspond to an access point (AP). A receiving device of the present embodiment may correspond to a station (STA) (non AP STA) having FDR capability. In addition, the present embodiment may include both a symmetric FDR operation and an asymmetric FDR operation.

First, the AP generates FDR indication information on that the FDR can be performed.

The AP transmits a downlink (DL) PPDU including the FDR indication information to a first STA. The DL PPDU may be generated by using/based on a high efficiency multi user PPDU (HE MU PPDU). That is, the DL PPDU may be an FDR MU PPDU generated by reusing the HE MU PPDU.

The AP receives an uplink (UL) PPDU from the first STA. The UL PPDU may be generated by using/based on a high efficiency trigger-based PPDU (HE TB PPDU). That is, the UL PPDU may be an FDR TB PPDU generated by using/based on the HE TB PPDU. In this case, the DL PPDU and the UL PPDU are transmitted/received based on the FDR.

Regarding DL primary transmission, the DL PPDU may include a legacy signal field, a first signal field, a second signal field, a third signal field, and a DL data field. The legacy signal field may be related to a legacy-signal (L-SIG) field or repeated legacy signal (RL-SIG) field included in the HE MU PPDU. The first signal field may be related to an HE-SIG-A field included in the HE MU PPDU. The first signal field is defined to perform an FDR operation, and thus may be named as an FDR-SIG-A field. The second signal field may be related to an HE-SIG-B field included in the HE MU PPDU. The second signal field is defined to perform the FDR operation, and thus may be named as an FDR-SIG-B field. The DL data field may be related to data received by an STA through a configured RU during MU DL transmission.

The second signal field includes information on a resource unit (RU) layout in a full frequency band and allocation information on a first RU to which the DL data field is allocated. The information on the RU layout and the allocation information on the first RU may be an 8-bit RU allocation subfield for RU allocation as shown in Table 9 below. The information on the RU layout and the allocation information on the first RU may be included in a common field of the second signal field.

The third signal field includes allocation information on a second RU to which the UL PPDU is allocated based on the information on the RU layout. This case is an embodiment in which a field of an HE MU PPDU is reused in the DL PPDU, and the third signal field is additionally inserted to generate a PPDU. The third signal field is newly defined to perform an FDR operation, and thus may be named as an FDR-SIG-C field. The allocation information on the second RU may be included in a common field of the third signal field.

Allocation information on the second RU included in the third signal field is described in detail in the present embodiment.

The allocation information on the second RU includes a bitmap regarding whether the UL PPDU is allocated in unit of 26RU. The information on the RU layout may be configured with 8 bits. The bitmap may be configured with 9 bits for 20 MHz. Each 1 bit of the bitmap may include allocation information on the UL PPDU for each 26RU within 20 MHz.

For example, it is assumed that information on the RU layout included in the common field of the second signal field is '01110000' (8 bits). According to the 8-bit RU allocation subfield as shown in Table 9 below, the bitmap '01110000' includes RU layout information on that four 52RUs are used in the full frequency band (herein, 20 MHz is assumed). That is, if the information on the RU layout is 01110000, the full frequency band may be arranged with four 52RUs.

In a state where the information on the RU layout is known, it is assumed that the bitmap included in the common field of the third signal field is '001100011' (9 bits). The bitmap '001100011' includes information on that third and fourth 26RUs and eighth and ninth 26RUs are allocated for the UL PPDU in the full frequency band. However, since it is known through the information (01110000) for the RU layout that the full frequency band is configured with not nine 26RUs but four 52RUs, the bitmap '001100011' may be interpreted as information on that a second 52RU and a fourth 52RU are allocated for the UL PPDU in the full frequency band.

Accordingly, a location of the second RU (the order of 56RU to which to-be-allocated RU corresponds) may be confirmed based on the bitmap, and a size of the second RU (a size of the to-be-allocated RU is 56RU) may be confirmed based on the information on the RU layout.

The bitmap may use 9 bits per 20 MHz. Therefore, the bitmap may be configured with 9 bits when the full frequency band is 20 MHz. The bitmap may be configured with 18 bits when the full frequency band is 40 MHz. The bitmap may be configured with 37 bits when the full frequency band is 80 MHz. The bitmap may be configured with 74 bits when the full frequency band is 160 MHz.

Information on an identifier of an STA for transmitting a DL PPDU may be included in a user-specific field of the second signal field. Information on an identifier of an STA for transmitting a UL PPDU and information on a transmitting timing of the UL PPDU may be included in a user-specific field of the third signal field.

In this case, the second RU is an RU remaining after excluding the first RU from the full frequency band. That is, the present embodiment proposes a method of performing FDR in such a manner that the DL PPDU is transmitted through a specific RU and the UL PPDU is received through another RU except for the specific RU.

Specifically, the DL data field may be transmitted through the first RU. The UL PPDU may be received through the second RU, based on the third signal field. The identifier of the STA for transmitting the UL PPDU may include an identifier of the first STA. The DL PPDU may be preferentially transmitted over the UL PPDU (DL primary transmission and UL secondary transmission). The DL PPDU and the UL PPDU may be transmitted and received simultaneously after a transmitting timing of the UL PPDU.

The information on the identifier of the STA for transmitting the UL PPDU may be configured with an 11-bit STA identifier (ID), a 9-bit partial association ID (PAID), or a 12-bit association ID (AID). That is, a specific STA for transmitting a UL PPDU may be indicated by using/based on one of the aforementioned three methods.

Allocation information on the second RU may be configured with a bitmap consisting of 1 bit per 26RU. That is, by using/based on 26RU as a minimum unit, a bit may be set to 1 if a UL PPDU is transmitted in each 26RU, and the bit may be set to 0 if the UL PPDU is not transmitted.

The information on the transmission timing of the UL PPDU may include a length to a transmission timing of the UL PPDU after the third signal field or a length to a transmission timing of the UL PPDU after the legacy signal field. In particular, the transmitting timing of the UL PPDU may be indicated by directly using a rate field and length field type of L-SIG, or may be indicated by directly using a 7-bit TXOP field used in HE-SIG-A in the user field, or may be indicated on a symbol basis by using/based on a specific bit and substituting a specific symbol count to each bit.

The FDR indication information may be included in the legacy signal field, the first signal field, or the second signal field.

Regarding UL secondary transmission, the UL PPDU may include only a high efficiency-short training field (HE-STF) field, high efficiency-long training field (HE-LTF) field, and UL data field included in the HE TB PPDU. That is, the UL PPDU may be configured by reusing the HE TB PPDU or by omitting (excluding) the legacy preamble and the FDR-SIG-A. Accordingly, the DL PPDU (FDR MU PPDU) is completely divided in frequency (completely divided into a first RU and a second RU), so as to be less affected by interference caused by FDR.

In addition, if the second RU is 20 MHz or 40 MHz, the UL PPDU may be generated by using/based on a high efficiency single user PPDU (HE SU PPDU). Since the entire band is used for UL transmission, transmission may be performed by using/based on the HE SU PPDU. The UL PPDU may include only an HE-STF field, HE-LTF field, and UL data field included in the HE SU PPDU. That is, the UL PPDU may be configured by reusing the HE SU PPDU or by omitting (excluding) the legacy preamble and the FDR-SIG-A. Accordingly, the DL PPDU (FDR MU PPDU) is completely divided in frequency (completely divided into a first RU and a second RU), so as to be less affected by interference caused by FDR.

The present specification proposes a scheme of transmitting/receiving a PPDU by using/based on full duplex radio (FDR) in a wireless local area network (WLAN) system.

According to an embodiment proposed in the present specification, a PPDU configured with a newly defined field may be generated based on FDR to remove self-interference caused by performing the FDR and to reduce an overhead, thereby obtaining a high throughput.

BRIEF DESCRIPTION OF THE DRAWINGS

FIG. 1 is a conceptual view illustrating the structure of a wireless local area network (WLAN).

FIG. 23 illustrates an example of an OFDMA-based FDR MU PPDU.

FIG. 24 illustrates another example of an OFDMA-based FDR MU PPDU.

FIG. 25 illustrates an example of an OFDMA-based FDR UL PPDU.

FIG. 26 illustrates another example of an OFDMA-based FDR UL PPDU.

FIG. 27 to FIG. 29 illustrate another example of an OFDMA-based FDR UL PPDU.

FIG. 34 illustrates an example of an OFDMA-based FDR TB PPDU.

FIG. 35 illustrates an example of an OFDMA-based FDR MU PPDU.

FIG. 36 illustrates another example of an OFDMA-based FDR MU PPDU.

FIG. 37 illustrates another example of an OFDAM-based FDR MU PPDU.

DESCRIPTION OF EXEMPLARY EMBODIMENTS

Figure 2:
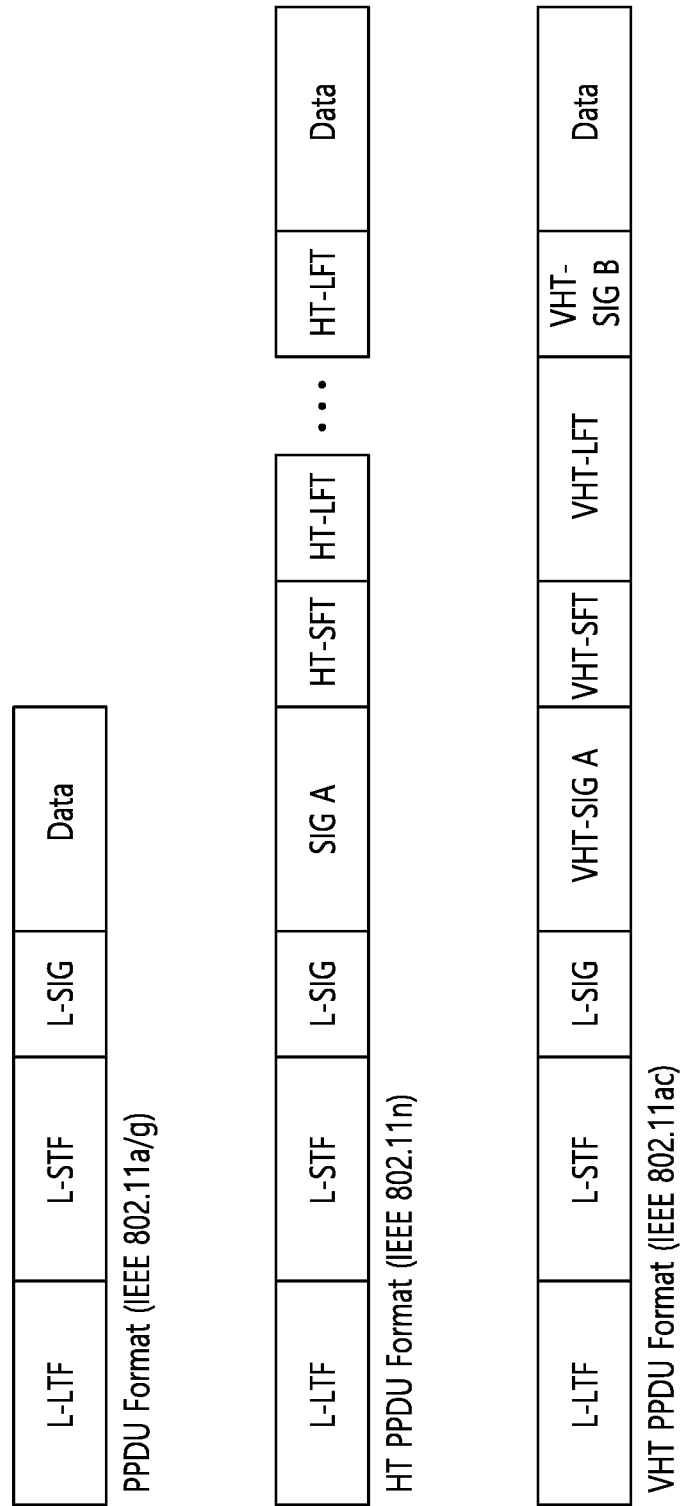
FIG. 2 is a diagram illustrating an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centerized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in diverse meanings, for example, in wireless LAN communication, this term may be used to signify a STA participating in uplink MU MIMO and/or uplink OFDMA transmission. However, the meaning of this term will not be limited only to this.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
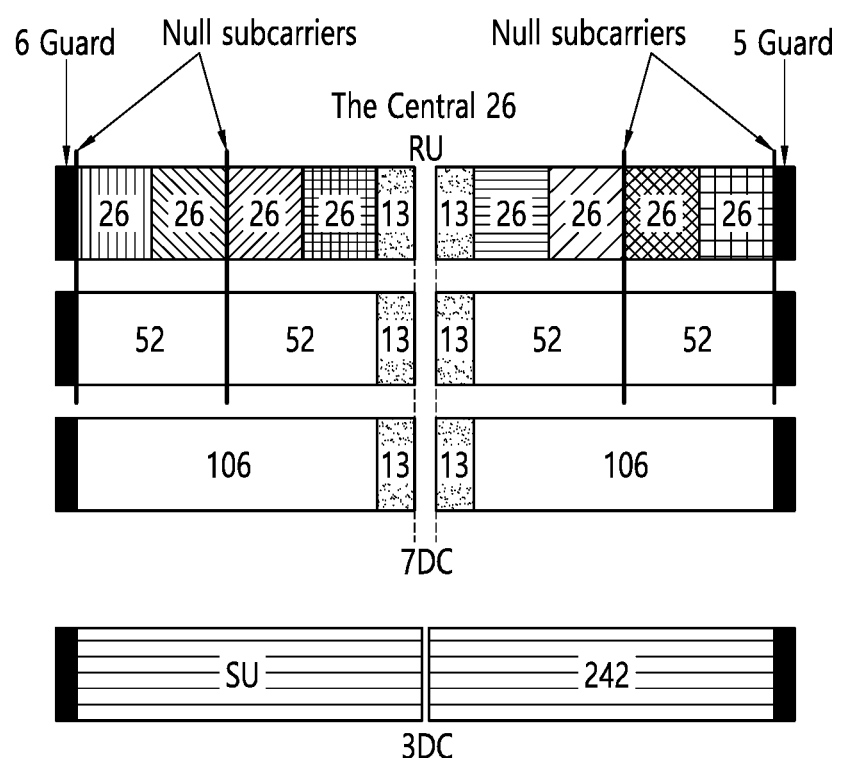
FIG. 4 is a diagram illustrating a layout of resource units (RUs) used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
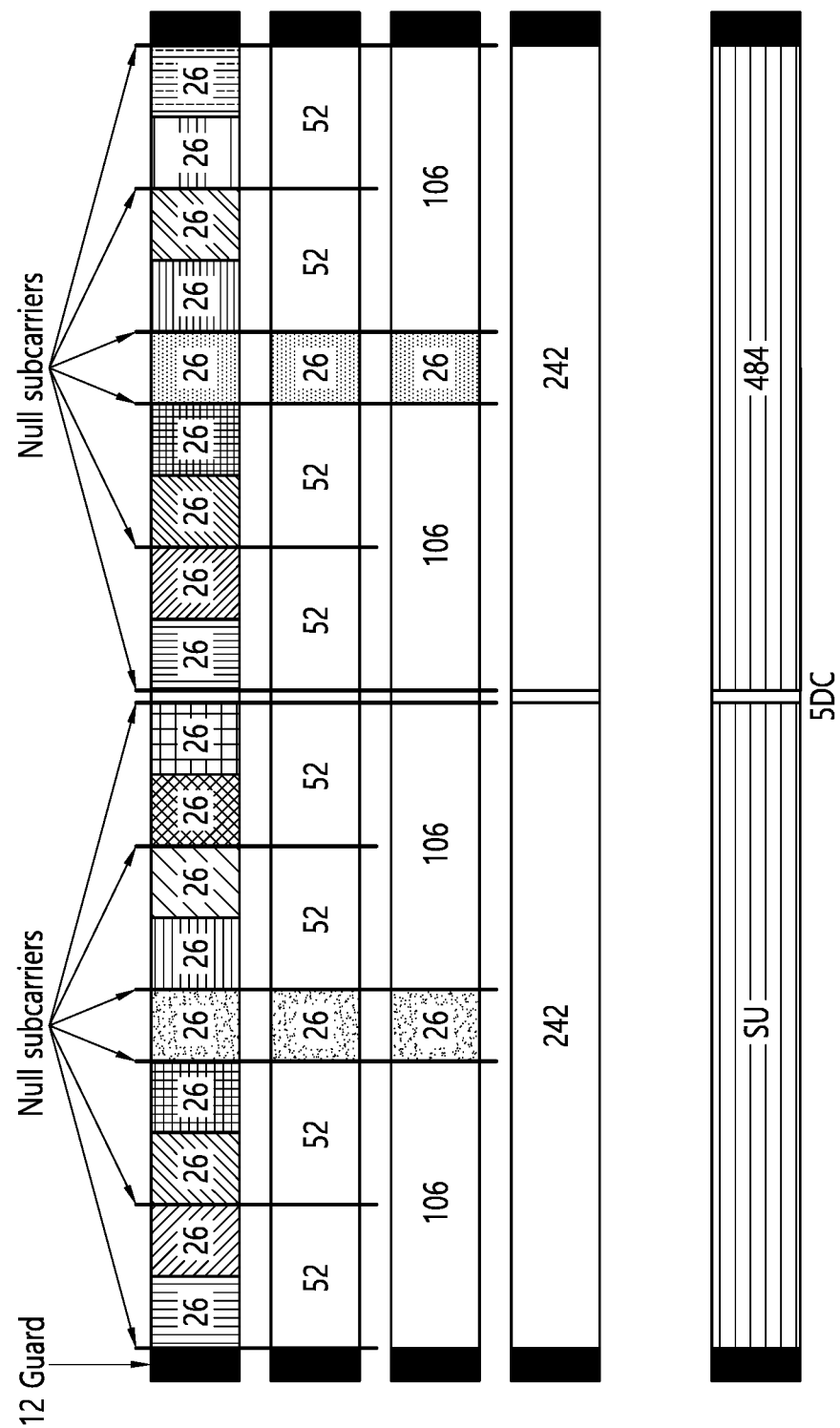
FIG. 5 is a diagram illustrating a layout of resource units (RUs) used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
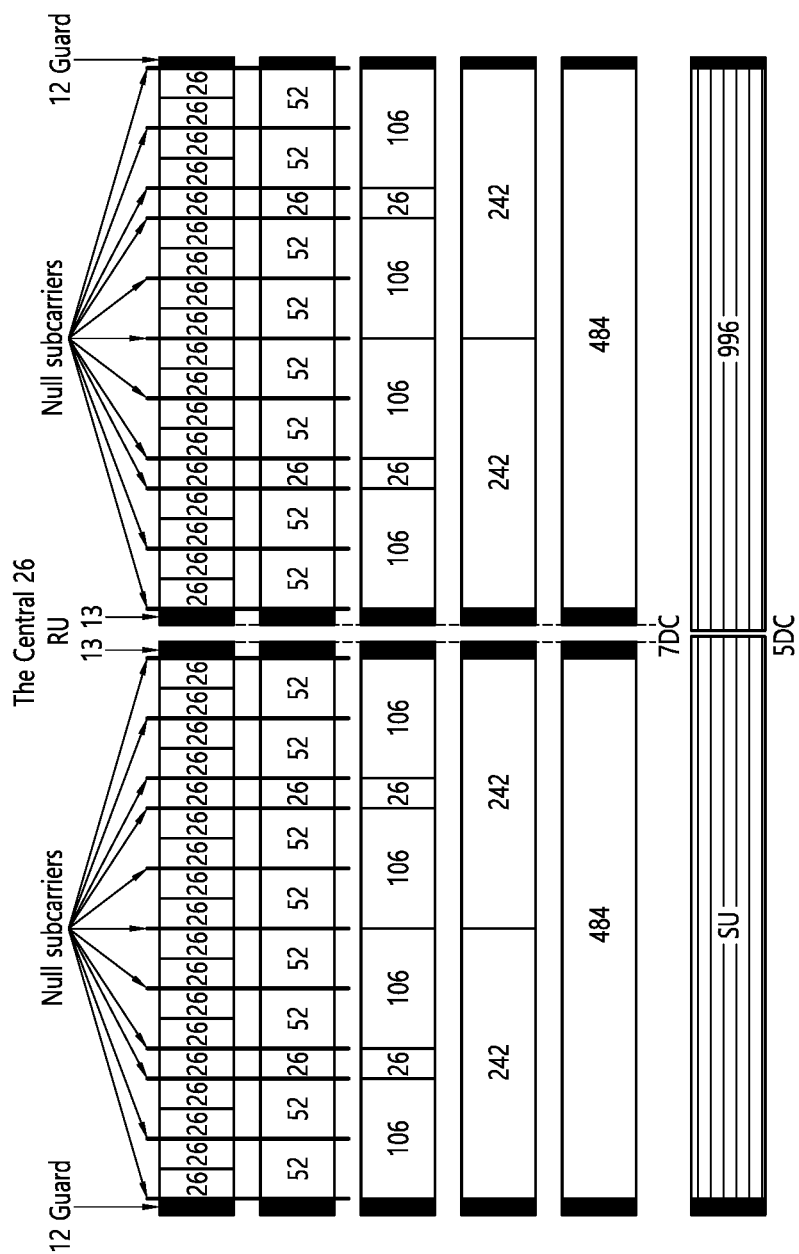
FIG. 6 is a diagram illustrating a layout of resource units (RUs) used in a band of 80 MHz.

FIG. 6 is a diagram illustrating a layout of resource units (RUs) used in a band of 80 MHz.

Figure 26:
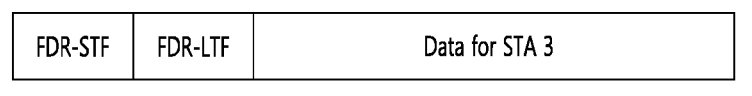

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted.

Meanwhile, the detailed number of RUs may be modified similarly to one example of each of FIG. 4 or 5.

Figure 7:
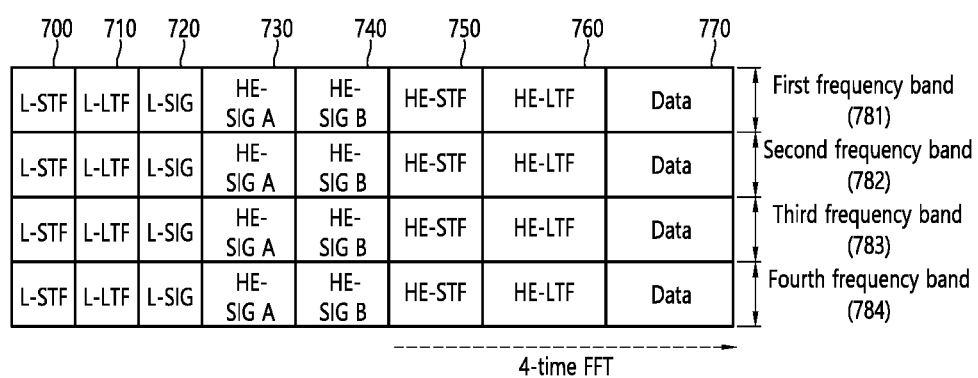
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment.

In addition, the HE-SIG-A 730 may be composed of two parts: HE-SIG-A1 and HE-SIG-A2. HE-SIG-A1 and HE-SIG-A2 included in the HE-SIG-A may be defined by the following format structure (fields) according to the PPDU. First, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1.<br>Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0. (#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU:<br>Set to n for MCSn, where n = 0, 1, 2, . . . , 11<br>Values 12-15 are reserved<br>For HE ER SU PPDU with Bandwidth field set to 0 (242-tone RU):<br>Set to n for MCSn, where n = 0, 1, 2<br>Values 3-15 are reserved<br>For HE ER SU PPDU with Bandwidth field set to 1 (upper frequency 106-tone RU):<br>Set to 0 for MCS 0<br>Values 1-15 are reserved |
| | B7 | DCM | 1 | Indicates whether or not DCM is applied to the Data field for the MCS indicated.<br>If the STBC field is 0, then set to 1 to indicate that DCM is applied to the Data field. Neither DCM nor STBC shall be applied if (#15489) both the DCM and STBC are set to 1.<br>Set to 0 to indicate that DCM is not applied to the Data field.<br>NOTE—DCM is applied only to HE-MCSs 0, 1, 3 and 4. DCM is applied only to 1 and 2 spatial streams. DCM is not applied in combination with STBC (#15490). |

TABLE 1-continued

| Two Parts of HE-SIG-A | Bit | Field | Number of bits | Description |
|---|---|---|---|---|
| | B8-B13 | BSS Color | 6 | The BSS Color field is an identifier of the BSS. Set to the value of the TXVECTOR parameter BSS_COLOR. |
| | B14 | Reserved | 1 | Reserved and set to 1 |
| | B15-B18 | Spatial Reuse | 4 | Indicates whether or not spatial reuse is allowed during the transmission of this PPDU (#16804) Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |
| | B21-B22 | GI + LTF Size | 2 | Indicates the GI duration and HE-LTF size. Set to 0 to indicate a 1x HE-LTF and 0.8 μs GI Set to 1 to indicate a 2x HE-LTF and 0.8 μs GI Set to 2 to indicate a 2x HE-LTF and 1.6 μs GI Set to 3 to indicate: a 4x HE-LTF and 0.8 μs GI if both the DCM and STBC fields are 1. Neither DCM nor STBC shall be applied if (#Ed) both the DCM and STBC fields are set to 1. a 4x HE-LTF and 3.2 μs GI, otherwise |
| | B23-B25 | NSTS And Midamble Periodicity | 3 | If the Doppler field is 0, indicates the number of space-time streams. Set to the number of space-time streams minus 1 For an HE ER SU PPDU, values 2 to 7 are reserved If the Doppler field is 1, then B23-B24 indicates the number of space time streams, up to 4, and B25 indicates the midamble periodicity. B23-B24 is set to the number of space time streams minus 1. For an HE ER SU PPDU, values 2 and 3 are reserved B25 is set to 0 if TXVECTOR parameter MIDAMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if (#15491) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor (TXOP_DURATION/8) (#16277). Otherwise, B0 is set to 1 and B1-B6 is set to floor ((TXOP_DURATION-512)/128) (#16277). where (#16061) B0 indicates the TXOP length granularity. Set to 0 for 8 is: otherwise set to 1 for 128 μs. B1-B6 indicates the scaled value of the TXOP_DURATION |
| | B7 | Coding | 1 | Indicates whether BCC or LDPC is used: Set to 0 to indicate BCC Set to 1 to indicate LDPC |
| | B8 | LDPC Extra Symbol Segment | 1 | Indicates the presence of the extra OFDM symbol segment for LDPC: Set to 1 if an extra OFDM symbol segment for LDPC is present Set to 0 if an extra OFDM symbol segment for LDPC is not present |

TABLE 1-continued

| Two Parts of HE-SIG-A | Bit | Field | Number of bits | Description |
|---|---|---|---|---|
| | B9 | STBC | 1 | Reserved and set to 1 if the Coding field is set to 0 (#15492).<br>If the DCM field is set to 0, then set to 1 if space time block coding is used. Neither DCM nor STBC shall be applied if (#15493) both the DCM field and STBC field are set to 1.<br>Set to 0 otherwise. |
| | B10 | Beam-formed (#16038) | 1 | Set to 1 if a beamforming steering matrix is applied to the waveform in an SU transmission.<br>Set to 0 otherwise. |
| | B11-B12 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity (#16274) as defined in 28.3.12 (Packet extension). |
| | B14 | Reserved | 1 | Reserved and set to 1 |
| | B15 | Doppler | 1 | Set to 1 if one of the following applies:<br>The number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HF-STG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

35

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TXVECTOR parameter UPLINK_FLAG. (#16805)<br>NOTE—The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the FIE-SIG-B is not modulated with DCM for the MCS.<br>NOTE—DCM is only applicable to MCS 0, MCS 1, MCS 3, and MCS 4. |
| | B5-B10 | BSS Color | 6 | The BSS Color field is an identifier of the BSS.<br>Set to the value of the TXVECTOR parameter BSS_-COLOR. |

TABLE 2-continued

| Two Parts of HE-SIG-A | Bit | Field | Number of bits | Description |
|---|---|---|---|---|
| | B11-B14 | Spatial Reuse | 4 | Indicates whether or not spatial reuse is allowed during the transmission of this PPDU (#16806). Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble puncturing in 80 MHz, where in the preamble only one of the two 20 MHz subchannels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where in the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the IIE-SIG-B Compression field is set to 0, indicates the number of OFDM symbols in the HE-SIG-B field (#15494) Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE SIG-B OFDM Symbols Support subfield of the HE Capabilities element transmitted by at least one recipient STA is 0; Set to 15 to indicate that the number of OFDM symbols in the HE-SIG-B field is greater than or equal to 16 if the Longer Than 16 HE SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1 (#15495). |
| | B22 | SIGB Compression | 1 | Set to 0 if the Common field in HE-SIG-B is present. Set to 1 if the Common field in HE-SIG-B is not present. (#16139) |
| | B23-B24 | GI + LTF Size | 2 | Indicates the GI duration and HE-LTF size: Set to 0 to indicate a 4x HE-LTF and 0.8 µs GI Set to 1 to indicate a 2x HE-LTF and 0.8 µs GI Set to 2 to indicate a 2x HE-LTF and 1.6 µs GI Set to 3 to indicate a 4x RE-LTF and 3.2 µs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link. Set to 0 otherwise. |

TABLE 2-continued

| Two Parts of HE-SIG-A | Bit | Field | Number of bits | Description |
|---|---|---|---|---|
| HE-SIG-A2 | B0-B6 | TXOP | 7 | Set to 127 to indicate no duration information if (#15496) TXVECTOR parameter TXOP_DURATION is set to UNSPECIFIED.<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor (TXOP_DURATION/8) (#16277).<br>Otherwise, B0 is set to 1 and B1-B6 is set to floor ((TXOP_DURATION-512)/128) (#16277).<br>where (#16061)<br>B0 indicates the TXOP length granulmity. Set to 0 for 8 μs; otherwise set to 1 for 128 μs.<br>B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0 (#15497) indicates the number of HE-LTF symbols:<br>Set to 0 for 1 HE-LTF symbol<br>Set to 1 for 2 HE-LTF symbols<br>Set to 2 for 4 HE-LTF symbols<br>Set to 3 for 6 HE-LTF symbols<br>Set to 4 for 8 HE-LTF symbols<br>Other values are reserved.<br>If the Doppler field is set to 1 (#15498), B8-B9 indicates the number of HE-LTF symbols (#16056) and B10 indicates midamble periodicity:<br>B8-B9 is encoded as follows:<br>0 indicates 1 HE-LTF symbol<br>1 indicates 2 HE-LTF symbols<br>2 indicates 4 HE-LTF symbols<br>3 is reserved<br>B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC.<br>Set to 1 if an extra OFDM symbol segment for LDPC is present.<br>Set to 0 otherwise. |
| | B12 | STBC | 1 | In an HE MU PPDU where each RU includes no more than 1 user, set to 1 to indicate all RUs are STBC encoded in the payload, set to 0 to indicate all RUs are not STBC encoded in the payload.<br>STBC does not apply to HE-SIG-B.<br>STBC is not applied if one or more RUs are used for MU-MIMO allocation. (#15661) |
| | B13-B14 | Pre-FEC Padding Factor | 2 | Indicates the pre-FEC padding factor.<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B15 | PE Disambiguity | 1 | Indicates PE disambiguity (#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU:<br>Set to 0 for an ILE TB PPDU |
| | B1-B6 | BSS Color | 6 | The BSS Color field is an identifier of the BSS.<br>Set to the value of the TXVECTOR parameter BSS_COLOR. |

TABLE 3-continued

| Two Parts of HE-SIG-A | Bit | Field | Number of bits | Description |
|---|---|---|---|---|
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz then this Spatial Reuse field applies to the first 20 MHz subband.<br>If the Bandwidth field indicates 160/80 + 80 MHz then this Spatial Reuse field applies to the first 40 MHz subband of the 160 MHz operating band.<br>Set to the value of the SPATIAL REUSE (1) parameter of the TX VECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B11-B14 | Spatial Reuse 2 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz, or 80 MHz:<br>This Spatial Reuse field applies to the second 20 MHz subband.<br>If (#Ed) the STA operating channel width is 20 MHz, then this field is set to the same value as Spatial Reuse 1 field.<br>If (#Ed) the STA operating channel width is 40 MHz in the 2.4 GHz band, this field is set to the same value as Spatial Reuse 1 field.<br>If the Bandwidth field indicates 160/80 + 80 MHz the this Spatial Reuse field applies to the second 40 MHz subband of the 160 MHz operating band.<br>Set to the value of the SPATIAL_REUSE (2) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_ SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the third 20 MHz subband.<br>if (#Ed) the STA operating channel width is 20 MHz or 40 MHz, this field is set to the same value as Spatial Reuse 1 field.<br>If the Bandwidth field indicates 160/80 + 80 MHz:<br>This Spatial Reuse field applies to the third 40 MHz subband of the 160 MHz operating band.<br>If (#Ed) the STA operating channel width is 80 +80 MHz, this field is set to the same value as Spatial Reuse 1 field.<br>Set to the value of the SPATIAL_REUSE (3) parameter of the TXVECTOR, which contains a value from Table 28-22 (Spatial Reuse field encoding for an HE TB PPDU) for an HE, TB PPDU (see 27.11.6 (SPATIAL_REUSE)). |

TABLE 3-continued

| Two Parts of HE-SIG-A | Bit | Field | Number of bits | Description |
|---|---|---|---|---|
| | | | | Set to SRP_DISALLOW to prohibit SRP-based spatial reuse during this PPM. Set to SRP_AND_NON_ SRG_OBSS_PD_PROHIBITED to prohibit both SRP-based spatial reuse and non-SRG OBSS PD-based spatial reuse during this PPDU. For the interpretation of other values see 27.11.6 (SPATIAL REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz or 80 MHz:<br>This Spatial Reuse field applies to the fourth 20 MHz subband.<br>If (#Ed) the STA operating channel width is 20 MHz, then this field is set to the same value as Spatial Reuse 1 field.<br>If (#Ed) the STA operating channel width is 40 MHz, then this field is set to the same value as Spatial Reuse 2 field.<br>If the Bandwidth field indicates 160/80 + 80 MHz:<br>This Spatial Reuse field applies to the fourth 40 MHz subband of the 160 MHz operating band.<br>If (#Ed) the STA operating channel width is 80 + 80 MHz, then this field is set to same value as Spatial Reuse 2 field.<br>Set to the value of the SPATIAL_REUSE (4) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_ SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B23 | Reserved | 1 | Reserved and set to 1.<br>NOTE—Unlike other Reserved fields in HE-SIG-A of the HE TB PPDU, B23 does not have a corresponding bit in the Trigger frame. |
| | B24-B25 | Bandwidth | 2 | (#16003) Set to 0 for 20 MHz<br>Set to 1 for 40 MHz<br>Set to 2 for 80 MHz<br>Set to 3 for 160 MHz and 80 + 80 MHz |
| HE-SIG-A2 | B0-B6 | TXOP | 7 | Set to 127 to indicate no duration information if (#15499) TXVECTOR parameter TXOP_DURATION is set to UNSPECIFIED.<br>Set to a value less than 127 to indicate duration - information for NAV setting and protection of the TXOP as follows:<br>If TXVECTOR parameter TXOP_DURATION is less than 512, then B0 is set to 0 and B1-B6 is set to floor (TXOP_DURATION/8) (#16277).<br>Otherwise, B0 is set to 1 and B1-B6 is set to floor ((TXOP_DURATION-512)/128) (#16277).<br>where (#16061)<br>B0 indicates the TXOP length granularity. Set to 0 for 8 μs; otherwise set to 1 for 128 μs.<br>B1-B6 indicates the scaled value of the TXOP_DURATION |
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder.<br>Set to 0. |

An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

Figure 8:
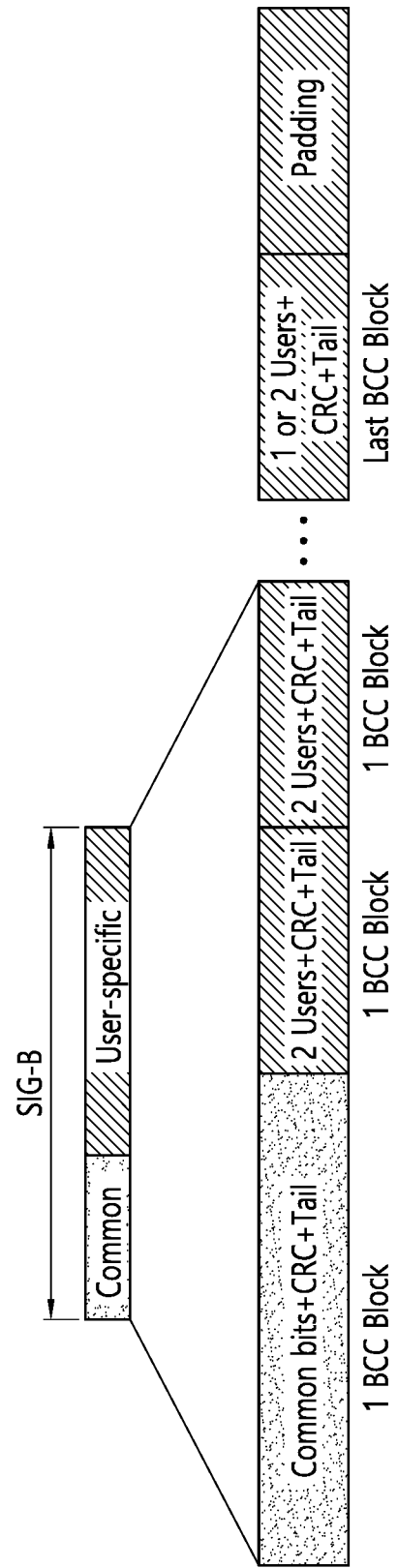
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 µs and the IDFT/DFT length applied to each symbol of the second field of the HE PPDU may be expressed as 3.2 µs*4 (=12.8 µs). The length of the OFDM symbol may be a value acquired by adding the length of a guard interval (GI) to the IDFT/DFT length. The length of the GI may have various values such as 0.4 µs, 0.8 µs, 1.6 µs, 2.4 µs, and 3.2 µs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present disclosure, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the total bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 9:
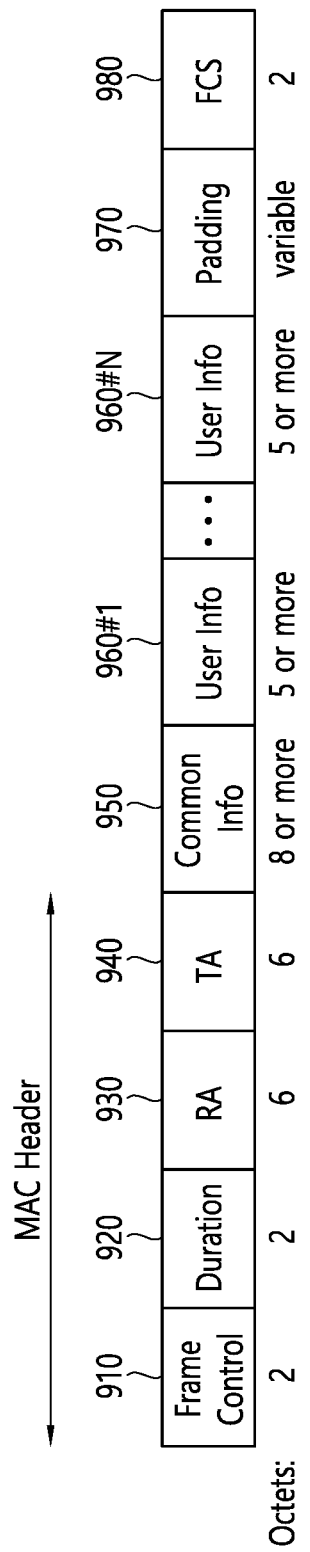
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

Also, the RA field 930 includes address information on a receiving STA of the corresponding trigger frame and may be omitted if necessary. The TA field 940 includes address information on an STA triggering the corresponding trigger frame (for example, an AP), and the common information field 950 includes common control information applied to a receiving STA that receives the corresponding trigger frame. For example, a field indicating the length of the L-SIG field of the UL PPDU transmitted in response to the corresponding trigger frame or information controlling the content of the SIG-A field (namely, the HE-SIG-A field) of the UL PPDU transmitted in response to the corresponding trigger frame may be included. Also, as common control information, information on the length of the CP of the UP PPDU transmitted in response to the corresponding trigger frame or information on the length of the LTF field may be included.

Also, it is preferable to include a per user information field (960 #1 to 960 #N) corresponding to the number of receiving STAs that receive the trigger frame of FIG. 9. The per user information field may be referred to as an "RU allocation field".

Also, the trigger frame of FIG. 9 may include a padding field 970 and a frame check sequence field 980.

It is preferable that each of the per user information fields (960 #1 to 960 #N) shown in FIG. 9 includes a plurality of subfields.

Figure 10:
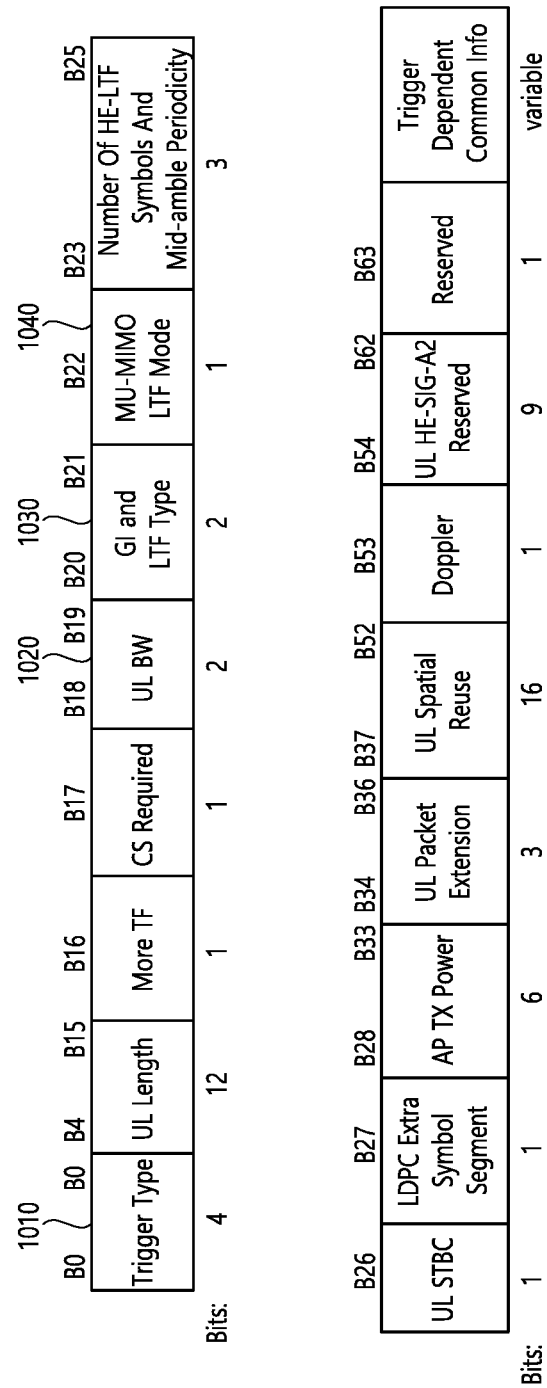
FIG. 10 illustrates an example of a common information field.

FIG. 10 illustrates an example of a common information field. Among the sub-fields of FIG. 10, some may be omitted, and other additional sub-fields may also be added. Additionally, the length of each of the sub-fields shown in the drawing may be varied.

The trigger type field 1010 of FIG. 10 may indicate a trigger frame variant and encoding of the trigger frame variant. The trigger type field 1010 may be defined as follows.

TABLE 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field 1020 of FIG. 10 indicates bandwidth in the HE-SIG-A field of an HE Trigger Based (TB) PPDU. The UL BW field 1020 may be defined as follows.

TABLE 5

| UL BW subfield value | Description |
|---|---|
| 0 | 20 MHz |
| 1 | 40 MHz |
| 2 | 80 MHz |
| 3 | 80 + 80 MHz or 160 MHz |

The Guard Interval (GI) and LTF type fields 1030 of FIG. 10 indicate the GI and HE-LTF type of the HE TB PPDU response. The GI and LTF type field 1030 may be defined as follows.

TABLE 6

| GI And LTF field value | Description |
|---|---|
| 0 | 1x HE-LTF + 1.6 µs GI |
| 1 | 2x HE-LTF + 1.6 µs GI |
| 2 | 4x HE-LTF + 3.2 µs GI (#15968) |
| 3 | Reserved |

Also, when the GI and LTF type fields 1030 have a value of 2 or 3, the MU-MIMO LTF mode field 1040 of FIG. 10 indicates the LTF mode of a UL MU-MIMO HE TB PPDU response. At this time, the MU-MIMO LTF mode field 1040 may be defined as follows.

If the trigger frame allocates an RU that occupies the whole HE TB PPDU bandwidth and the RU is allocated to one or more STAs, the MU-MIMO LTF mode field 1040 indicates one of an HE single stream pilot HE-LTF mode or an HE masked HE-LTF sequence mode.

If the trigger frame does not allocate an RU that occupies the whole HE TB PPDU bandwidth and the RU is not allocated to one or more STAs, the MU-MIMO LTF mode field 1040 indicates the HE single stream pilot HE-LTF mode. The MU-MIMO LTF mode field 1040 may be defined as follows.

TABLE 7

| MU-MIMO LTF subfield value | Description |
|---|---|
| 0 | HE single stream pilot HE-LTF mode |
| 1 | HE masked HE-LTF sequence mode |

Figure 11:
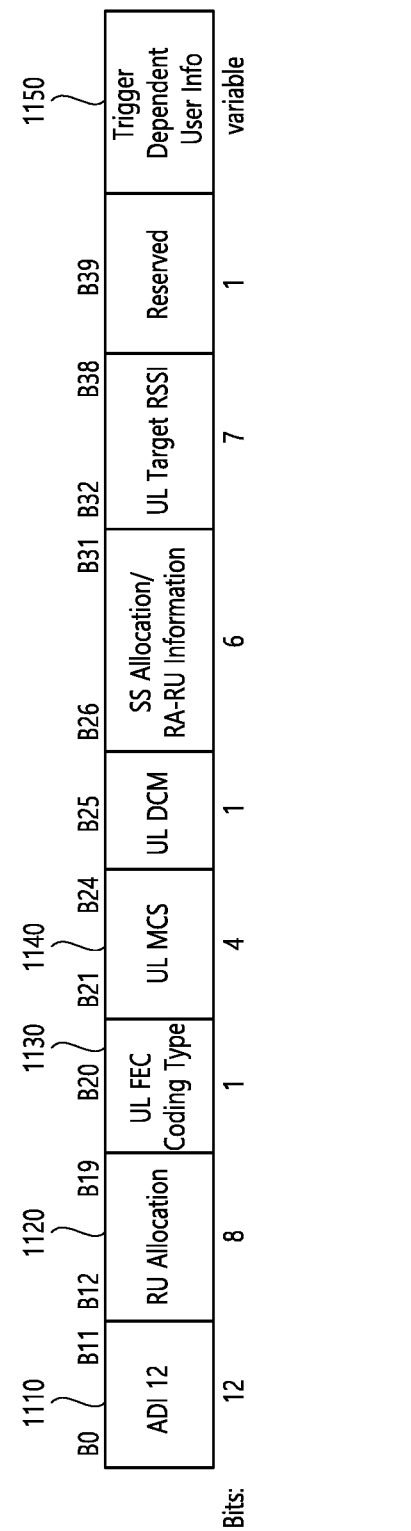
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

The User Identifier field of FIG. 11 (or AID12 field, 1110) indicates the identifier of an STA (namely, a receiving STA) corresponding to per user information, where an example of the identifier may be the whole or part of the AID.

Also, an RU Allocation field 1120 may be included. In other words, when a receiving STA identified by the User Identifier field 1110 transmits a UL PPDU in response to the trigger frame of FIG. 9, the corresponding UL PPDU is transmitted through an RU indicated by the RU Allocation field 1120. In this case, it is preferable that the RU indicated by the RU Allocation field 1120 corresponds to the RUs shown in FIGS. 4, 5, and 6. A specific structure of the RU Allocation field 1120 will be described later.

The subfield of FIG. 11 may include a (UL FEC) coding type field 1130. The coding type field 1130 may indicate the coding type of an uplink PPDU transmitted in response to the trigger frame of FIG. 9. For example, when BCC coding is applied to the uplink PPDU, the coding type field 1130 may be set to '1', and when LDPC coding is applied, the coding type field 1130 may be set to '0'.

Additionally, the sub-field of FIG. 11 may include a UL MCS field 1140. The MCS field 1140 may indicate a MCS scheme being applied to the uplink PPDU that is transmitted in response to the trigger frame of FIG. 9.

Also, the subfield of FIG. 11 may include a Trigger Dependent User Info field 1150. When the Trigger Type field 1010 of FIG. 10 indicates a basic trigger variant, the Trigger Dependent User Info field 1150 may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A 730 of FIG. 7, and the second control field may be the HE-SIG-B 740 shown in FIGS. 7 and 8.

Hereinafter, a specific example of improving the first or the second control field will be described.

In the following example, a control identifier inserted to the first control field or a second control field is proposed. The size of the control identifier may vary, which, for example, may be implemented with 1-bit information.

The control identifier (for example, a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (namely, 20 MHz). Accordingly, the control identifier (for example, 1-bit identifier) may indicate whether a single RU corresponding to the full bandwidth of the transmission frequency band is allocated.

For example, if the transmission frequency band has a bandwidth of 40 MHz, the control identifier (for example, a 1-bit identifier) may indicate whether a single RU corresponding to the full bandwidth (namely, bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (for example, a 1-bit identifier) may indicate whether a single RU corresponding to the full bandwidth (namely, bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (for example, 1-bit identifier).

First of all, when a single RU corresponding to the full bandwidth of the transmission frequency band is allocated through the control identifier (for example, a 1-bit identifier), allocation information on the RU may be omitted. In other words, since only one RU rather than a plurality of RUs is allocated over the whole transmission frequency band, allocation information on the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (for example, spatial multiplexing) may be used to multiplex the signals for multiple users in the same, single RU. Accordingly, the control identifier (for example, a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N RU allocation subfields). The format of the common field may be defined as follows.

TABLE 8

| Subfield | Number of bits | Description |
| --- | --- | --- |
| RU Allocation | N × 8 | Indicates the RU assignment to be used in the data portion in the frequency domain. It also indicates the number of users in each RU. For RIM of size greater than or equal to 106-tones that support MU-MIMO, it indicates the number of users multiplexed using MU-MIMO.<br>Consists of N RU Allocation subfields:<br>N = 1 for a 20 MHz and a 40 MHz HE MU PPDU<br>N = 2 for an 80 MHz HE MU PPDU<br>N = 4 for a 160 MHz or 80 + 80 MHz HE MU PPDU |
| Center 6-tone RU | 1 | This field is present only if (#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>Set to 1 to indicate that a user is allocated to the center 26-tone RU (see Figure 28-7 (RU locations in an 80 MHz HE PPDU (#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |

TABLE 8-continued

| Subfield | Number of bits | Description |
|---|---|---|
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate as follows with respect to 20 MHz PPDU bandwidth. RUs to be used as a data portion in the frequency domain are allocated using an index for RU size and disposition in the frequency domain. The mapping between an 8-bit RU allocation subfield for RU allocation and the number of users per RU may be defined as follows.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). |

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | | 52 | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | — | | 106 | | 52 | 8 |
| 00011$y_2y_1y_0$ | | 106 | | | — | | 52 | | 52 | 8 |
| 00100$y_2y_1y_0$ | 26 | 26 | 26 | 26 | 26 | | 106 | | | 8 |
| 00101$y_2y_1y_0$ | 26 | 26 | | 52 | 26 | | 106 | | | 8 |
| 00110$y_2y_1y_0$ | 52 | | 26 | 26 | 26 | | 106 | | | 8 |
| 00111$y_2y_1y_0$ | 52 | | 52 | | 26 | | 106 | | | 8 |
| 01000$y_2y_1y_0$ | | 106 | | | 26 | 26 | 26 | 26 | 26 | 8 |
| 01001$y_2y_1y_0$ | | 106 | | | 26 | 26 | 26 | 52 | | 8 |
| 01010$y_2y_1y_0$ | | 106 | | | 26 | 52 | | 26 | 26 | 8 |
| 01011$y_2y_1y_0$ | | 106 | | | 26 | 52 | | 52 | | 8 |
| 0110$y_2y_1y_0$ | | 106 | | | — | | 106 | | | 16 |
| 01110000 | 52 | | 52 | | — | | 52 | | 52 | 1 |
| 01110001 | 242-tone RU empty | | | | | | | | | 1 |
| 01110010 | 484-tone RU with zero User fields indicated in this RU Allocation subfield of the HE-SIG-B content channel | | | | | | | | | 1 |
| 01110011 | 996-tone RU with zero User fields indicated in this RU Allocation subfield of the HE-SIG-B content channel | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | | 106 | | | 26 | | 106 | | | 64 |
| 11000$y_2y_1y_0$ | | | | | 242 | | | | | 8 |
| 11001$y_2y_1y_0$ | | | | | 484 | | | | | 8 |
| 11010$y_2y_1y_0$ | | | | | 996 | | | | | 8 |
| 11011$y_2y_1y_0$ | Reserved | | | | | | | | | 8 |
| 111$x_4x_3x_2x_1x_0$ | Reserved | | | | | | | | | 32 |

If (#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$ = 00000-11111.
'—' means no STA in that RU.

TABLE 10-continued

| Subfield | Number of bits | Description |
|---|---|---|
| | | N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is composed of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only in one user field.

As an example, it may be assumed that the RU allocation subfield is configured with 8 bits of 01000010 to indicate that five 26-tone RUs are arranged next to one 106-tone RU and three user fields are included in the 106-tone RU. At this time, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

Figure 12:
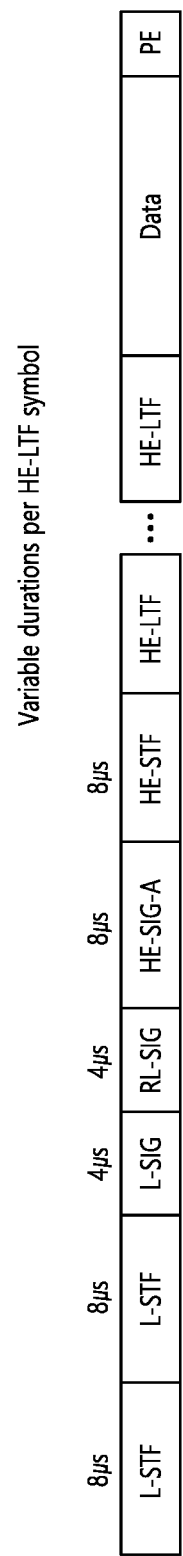
FIG. 12 illustrates one example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit an HE TB PPDU simultaneously with another STA which has received the trigger frame.

As shown in the figure, the PPDU of FIG. 12 includes various fields, each of which corresponds to the field shown in FIGS. 2, 3, and 7. Meanwhile, as shown in the figure, the HE TB PPDU (or uplink PPDU) of FIG. 12 may not include the HE-SIG-B field but only the HE-SIG-A field.

1. Basic Concept of STR

In what follows, Simultaneous Transmit and Receive (STR) will be described.

Figure 13:
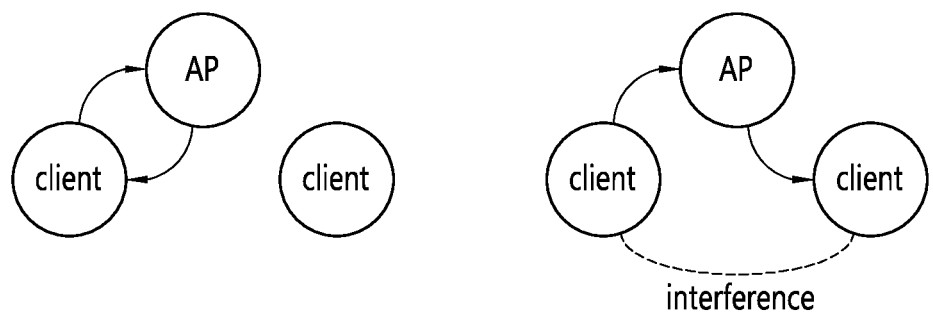
FIG. 13 illustrates types of STRs.

FIG. 13 illustrates types of STRs.

In-band STR is a technique that allows simultaneous transmission and reception in the same frequency band and also called Full-Duplex Radio (FDR). As shown in FIG. 13, in-band STR may be performed such that an AP and an STA form a pair to perform transmission and reception simultaneously with each other (see the left-side of the figure), or STAs perform only transmission or reception while the AP performs transmission and reception simultaneously (see the right-side of the figure). In the latter case (the right-side of FIG. 13), interference may occur between clients, and thus an additional interference cancellation technique may be needed.

Figure 14:
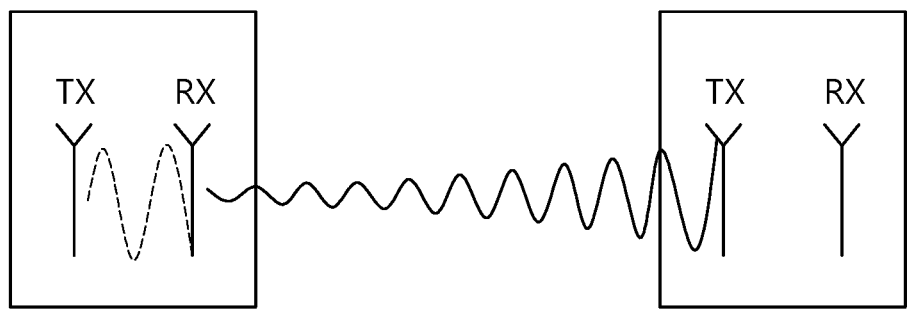
FIG. 14 illustrates an example in which a device performing STR generates self-interference.

FIG. 14 illustrates an example in which a device performing STR generates self-interference.

Referring to FIG. 14, when a wireless device performs STR, since a TX and RX antennas are adjacent to each other inside the wireless device, a transmission signal of the wireless device may interfere with a signal being received by the wireless device. Therefore, self-interference cancellation is required, for which various methods as shown in the following references may be applied.

TABLE 11

| Reference | Band | Bandwidth | # Antenna | # RF | Cancellation Antenna | Analog | Digital | Total |
|---|---|---|---|---|---|---|---|---|
| MSR [8] | 530 MHz | | 2 | 2 | 25~30 dB | 30 dB | | 55~60 dB |
| Rice [9] | 2.4 GHz | 625 KHz | 2 | 3 | 39~45 dB | 31~33 dB | | 78~80 dB |
| Stanford [10] | 2.4 GHz | 5 MHz 802.15.4 | 3 | 2 | 30 dB | 20 dB | 10 dB | 60 dB |
| Stanford [4] | 2.4 GHz | 10 MHz 802.11 n | 2 | 2 | | 45 dB | 28 dB | 73 dB |
| Stanford [7] | 2.4 GHz | 80 MHz 802.11 ax | 1 | 2 | | 60 dB | 50 dB | 110 dB |
| NEC [11] | 5 GHz | 10 MHz WiMAX | 4 | 2 | 10 (polar) + 45 dB | | 20 dB | 75 dB |
| Princeton [12] | 2.4 GHz | 625 KHz | 2 M + 2 N | M + N | 37 dB | | | |
| NYU [13] | 914 MHz | 26 MHz | 1 | 2 | 40~45 dB | 14 dB | | 59 dB |

Assumption: In general, DL refers to transmission from an AP to an STA, and UL refers to transmission from an STA to an AP. However, since the present disclosure assumes DL/UL for the convenience of description, an AP may be interpreted as an AP, a Mesh, a Relay, or an STA; likewise, an STA may be interpreted as an AP, a Mesh, a Relay, or an STA. Also, since fields such as STF and LTF are not relevant to the description of the present disclosure, they are omitted.

The present disclosure proposes a method for applying STR in a WiFi system by an AP by initiating STR. Methods for initiating STR by an AP may be divided largely into two types. To initiate STR, an AP may include signal information for a UL frame within a DL frame (method 1-1) when the DL frame is transmitted or use a separate trigger frame (method 1-2).

1-1. Method of Including Signal Information for a UL Frame within a DL Frame

Figure 15:
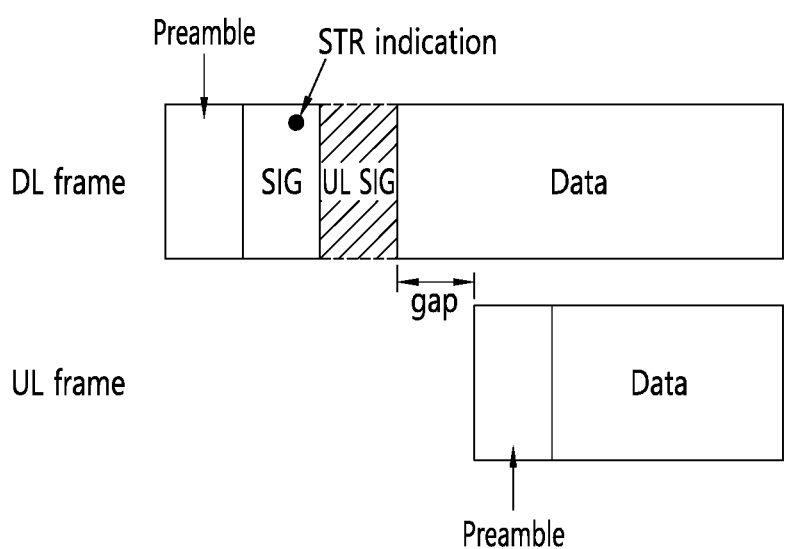
FIG. 15 illustrates an example of a DL/UL frame structure and transmission timing in the STR.

FIG. 15 illustrates an example of a DL/UL frame structure and transmission timing in the STR.

Regarding the first method, as shown in FIG. 15, to initiate STR, an AP may transmit a DL frame by including signal information for a UL frame within the DL frame. In this case, an STA has to transmit its UL frame after reading the information. At this time, since it takes time to generate a UL frame after the STA reads and decodes the signal information, the STA may transmit the UL frame only after a time period of 'gap' from the time the signal information is received. (The time period of 'gap' may be SIFS or DIFS, for example.)

The signal information for the UL frame (the UL SIG portion in FIG. 15) may be generated by newly adding a SIG field for the UL frame or by adding only the contents for UL frame allocation to the existing SIG field. However, an indication that the signal information has been included has to be placed before the UL SIG. If this is called STR indication, this indication may be added as a reserved bit of the existing SIG field or added as a new frame type. Or the indication may be defined as a new PHY structure. The UL SIG included in the SIG field should contain at least the ID of an STA to which a UL frame is transmitted. Or if a SIG field including the STA ID, such as the HE-SIG-B, is already included, the STA ID may be omitted. (if all the STAs receiving data of the DL frame transmit a UL frame through STR) in addition to the indication, information included in the existing SIG such as a TXOP value for UL transmission, RU allocation (if MU OFDMA is applied), frame length, MCS, or coding type may all be included. However, if TXOP, RU allocation, or frame length is to be matched to the DL frame, these values may be omitted; if MCS, coding type, and the like are subject to the determination made by an STA for transmission of the UL frame, these values may also be omitted. If all of the values may be omitted, an AP may trigger STR by using/based on only the STR indication. If all of the values are needed, as an example of using the existing frame format, UL SIG information may be provided by inserting the HE-SIG-B after STR indication is handled by using/based on a reserved bit (for example, B14) of the HE-SIG-A of the DL frame transmitted to the HE SU PPDU and the HE ER SU PPDU. In other words, in this case, the HE-SIG-B is transmitted to inform of configuration of the UL frame rather than the DL frame. As another example, to support STR by a DL frame transmitted to the HE MU PPDU, a reserved bit (for example, B7) of the HE-SIG-A field may be used for STR indication, and the HE-SIG field for the UL frame may be transmitted additionally after transmission of the HE-SIG-B for the DL frame. The UL SIG field may be similar to the HE-SIG-B but may not include any of the values that may be omitted.

Figure 16:
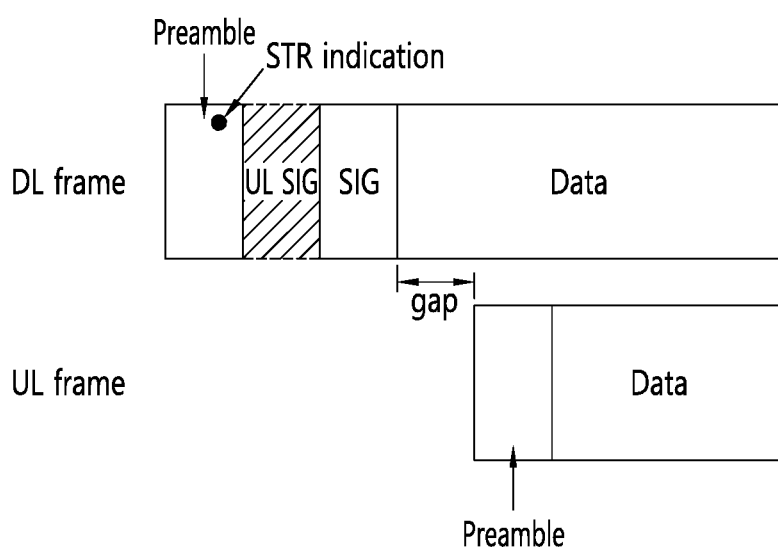
FIG. 16 illustrates another example of a DL/UL frame structure and transmission timing in the STR.

FIG. 16 illustrates another example of a DL/UL frame structure and transmission timing in the STR.

As another example, as shown in FIG. 16, for fast transmission of a UL frame, STR indication may be transmitted through a reserved bit of the L-SIG. In this case, the UL SIG field may be transmitted before the DL SIG field, and transmission of the UL frame may be initiated after a time period of 'gap' from the time the UL SIG field is received. At this time, since STAs have to check whether they are allocated to the STR, STA ID values have to be included in the UL SIG field. In addition, BSS ID (BSS color), RU allocation for configuration of the UL frame, BW, TXOP duration, UL PPDU length, MCS, and coding type may be included in the UL SIG field.

Now, a structure of the UL frame will be described.

Figure 17:
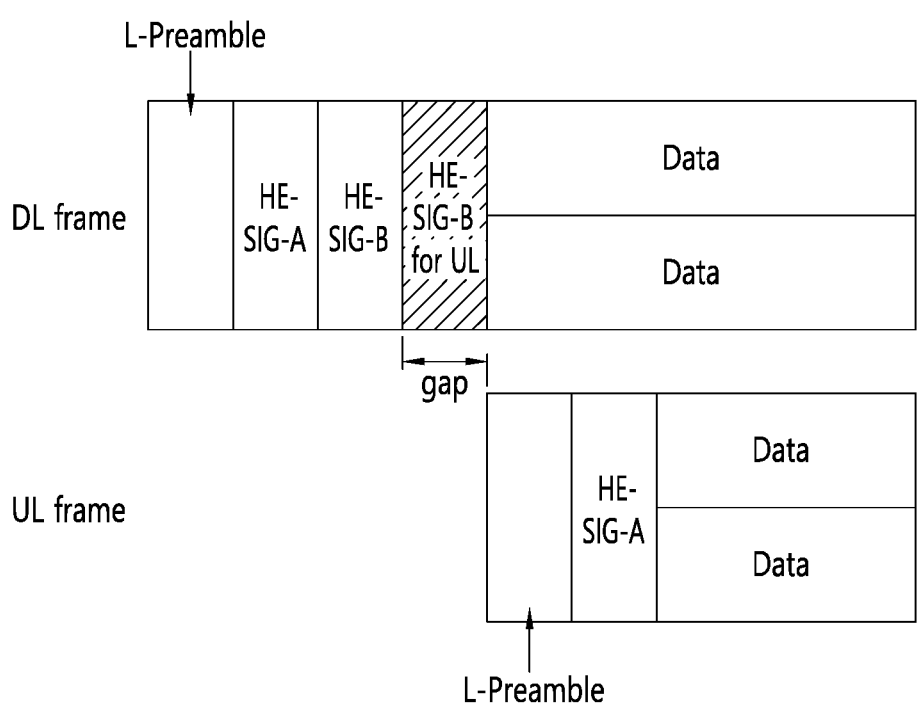
FIGS. 17 to 19 illustrate one example of a DL/UL frame structure and transmission timing for transmitting a UL frame in the STR.
Figure 18:
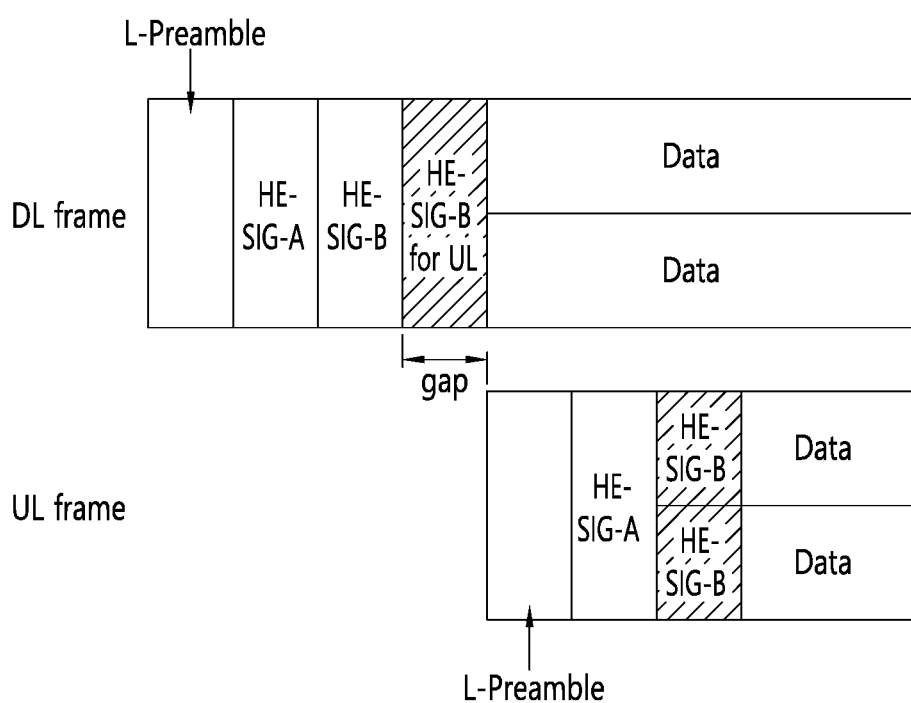
Figure 19:
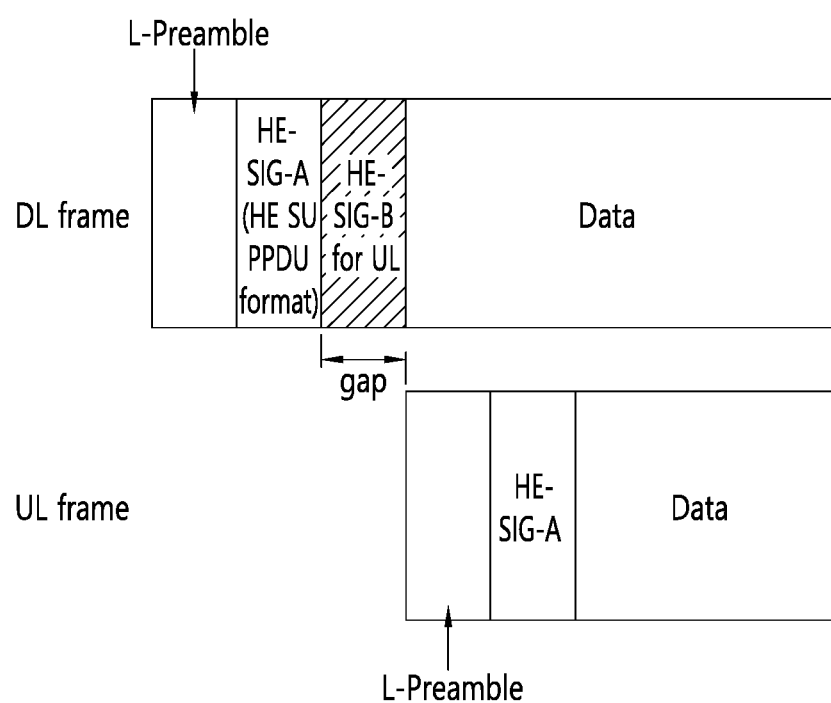

FIGS. 17 to 19 illustrate one example of a DL/UL frame structure and transmission timing for transmitting a UL frame in the STR.

A UL frame transmitted in the STR may include an L-preamble and a common SIG (HE-SIG-A in the case of 11ax format) for protection, decoding, and transmission time. At this time, the common SIG may include TXOP duration and UL frame length. At this time, the TXOP duration value may be obtained by subtracting a value measured from the L-preamble of a DL frame to the L-preamble of the UL frame from the TXOP duration included in a DL frame. Other specific UL SIG information may vary depending on the information on the UL SIG of the DL frame. In other words, if the DL frame specifies even the MCS and the coding type of the UL frame, no particular UL SIG information is necessary; for example, since the operation becomes similar to the UL MU procedure of the 11 ax (when an AP determines all of the structure of the UL frame), additional SIG information is not required. Therefore, in this case, the TB PPDU structure of the 11 ax may be used. Or if DL frame informs of only the ID of an STA to transmit the UL frame and RU allocation information (if a separate UL SIG or the same data as DL data are used to omit the other specific UL SIG information), since MCS, coding type, and so on should be informed to each STA before transmission of UL frame data, additional SIG information has to be transmitted before data transmission. If MU OFDMA transmission is performed while the 11ax frame structure is being used, since a SIG structure in which transmission is performed according to RU allocation is not supported, it becomes a newly defined SIG structure. Or if the transmission is based on an SU structure rather than an MU structure, transmission may be handled by using/based on the HE SU PPDU and the HE ER SU PPDU format (refer to the examples of FIGS. 17 to 19). Or even when a new STR UL frame structure is defined, a SIG structure is required, in which transmission is performed according to RU allocation after common SIG transmission. As described above, a newly defined SIG structure (the HE-SIG-B for UL of FIGS. 17 to 19) may include information such as MCS and coding type for data transmission for each STA.

1-2. Method of Using a Trigger Frame

Figure 20:
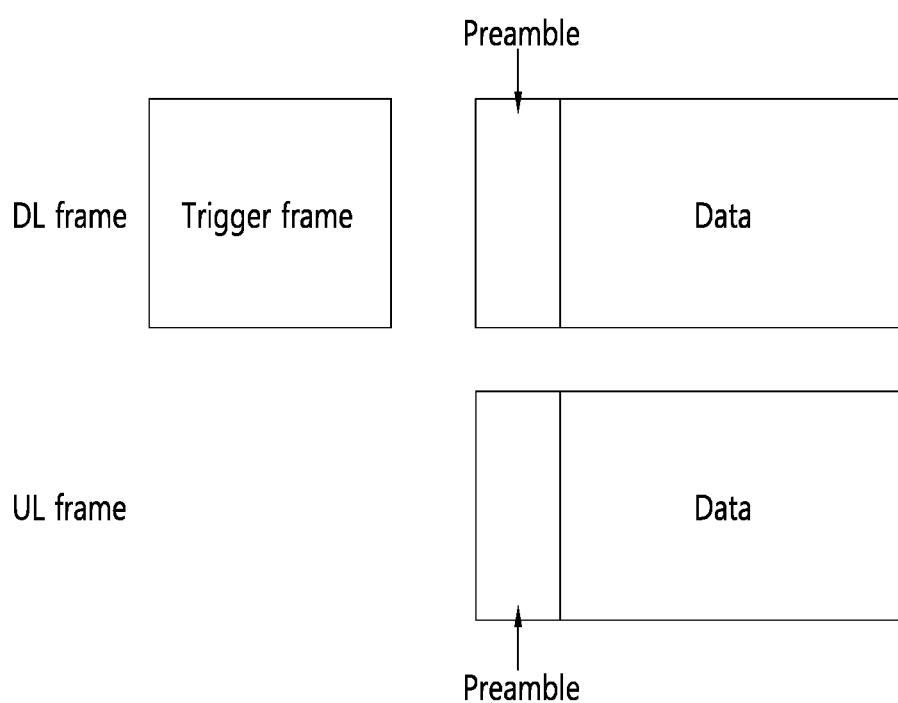
FIG. 20 illustrates one example of using a trigger frame to transmit a UL frame in the STR.

FIG. 20 illustrates one example of using a trigger frame to transmit a UL frame in the STR.

As a second method, as shown in FIG. 20, an AP may use a trigger frame separately for STR. At this time, unlike the UL MU procedure that uses a trigger frame of the existing 11ax, not only a UL frame but also a DL frame are transmitted after the trigger frame. (Or after the L-preamble of a DL frame is received or after up to the SIG information is received, the UL frame may be transmitted after a time period of 'gap') Therefore, in order to use the existing trigger frame, STR indication should be included. For example, STR may be added to the trigger frame type 1010. Or a Basic Trigger variant may be used for the trigger frame type, and a reserved bit (B5) of the Trigger Dependent User Info Field 1150 may be used for STR indication. When STR is applied to the MU OFDMA structure, it may be advantageous for interference cancellation and hidden node problems if RU allocations for DL and UL frames applied to one STR are the same and the frames end at the same timing. Therefore, in that case, SIG information such as an STA ID, RU allocation, TXOP duration, or frame length may be omitted when a DL frame following the trigger frame is transmitted.

For both cases above, the following rules may be applied.

(1) DL transmission and UL transmission may be synchronized to end at the same time to avoid a hidden node problem. Afterwards, if necessary, UL/DL Ack/BA frame may also be transmitted through STR.

(2) If MU OFDMA is used for STR, UL transmission may be performed by using/based on RUs such as DL RUs allocated to each STA or by using/based on part of the RUs. If part of the RUs are used, part of subcarriers at both ends of RUs to which a DL frame is allocated may be nulled for interference mitigation from packets of other STAs, after which a UL frame may be transmitted.

When the STR is applied as shown in FIGS. 15 to 20, an STA receiving a DL frame and an STA transmitting a UL frame may be different. In this case, STA ID and RU allocation information have to be included in each of the DL SIG and the UL SIG included in the DL STR frame. The remaining information may be configured as described above.

2. Proposed Embodiments

The present disclosure proposes a structure of an OFDMA-based FDR PPDU in the WLAN system (802.11).

The present disclosure proposes a method and a PPDU structure enabling UL or DL transmission by allocating a specific STA to an empty resource unit (RU) during DL or UL transmission using the 802.11 OFDMA structure (as shown in FIGS. 4 to 6). Various FDRs as shown below may be taken into consideration, and the present disclosure is based on a situation where DL transmission is performed first and a situation where UL transmission is performed first. In the FDR, first transmission is defined as primary transmission, and transmission performed later is defined as secondary transmission. The present disclosure assumes that in the case of secondary transmission, only one STA is allocated to a PPDU.

Also, the present disclosure may define an FDR PPDU based on a PPDU defined in the 802.11ax. In the embodiments as described below, an HE MU PPDU may correspond to the PPDU shown in FIG. 3, a trigger frame may correspond to the PPDU shown in FIG. 9, and an HE TB PPDU may correspond to the PPDU shown in FIG. 12. Also, the HE MU PPDU, HE SU PPDU, trigger frame, and fields (or subfield) included in the HE TB PPDU may also correspond to the fields (or subfields) of FIGS. 3 and 7 to 12.

Figure 21:
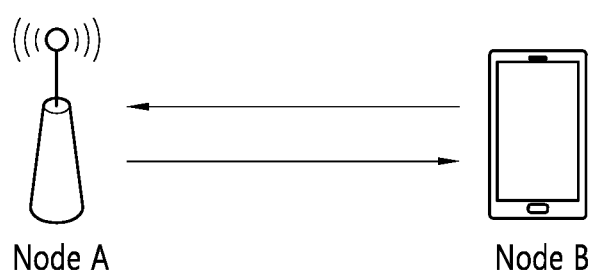
FIG. 21 illustrates an example of a symmetric FDR operation.
Figure 22:
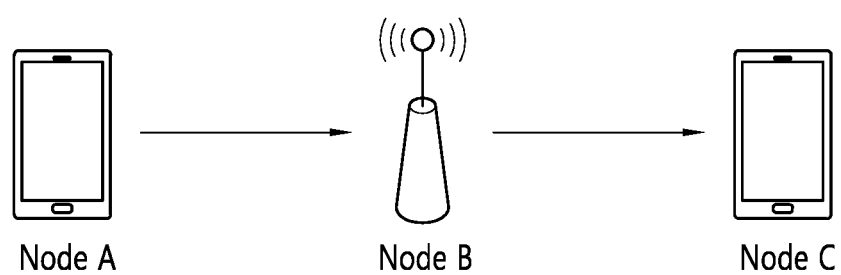
FIG. 22 illustrates an example of an asymmetric FDR operation.

FIG. 21 illustrates an example of a symmetric FDR operation. FIG. 22 illustrates an example of an asymmetric FDR operation.

Recently, Full-Duplex Radio (FDR), that is, a technique that enables a single transmitter and receiver to transmit and receive simultaneously, is actively researched. When FDR is employed, theoretical doubling of performance may be achieved in the MAC layer compared with the case when FDR is not employed, namely, a half-duplex scheme. However, one of major obstacles to implementing FDR is self-interference, that is, a signal transmitted by a specific STA is received back by the STA, interfering with the original signal to be received. Many studies have shown that cancellation performance more than 100 dB may be achieved at the current signal phase. If self-interference cancellation is successful in the PHY layer, a MAC protocol based on FDR operation is also required. FDR MAC is divided largely into two types: symmetric FDR and asymmetric FDR. FIGS. 8 and 9 illustrate examples of operations of the symmetric and the asymmetric FDR.

In the case of symmetric FDR, each transmission and reception occurs between two terminals. In other words, symmetric FDR is easier to implement than asymmetric FDR, but symmetric FDR exhibits a disadvantage that there should be data to be transmitted between exactly two terminals, which makes it difficult to be useful in real environments. On the other hand, in the case of asymmetric FDR, since two transmissions occur in pairs of different terminals, asymmetric FDR operation may occur with relatively more opportunities than the symmetric FDR; however, since transmission from node A to node B in FIG. 22 may cause inter-node interference to reception of node C, a terminal to perform FDR should be carefully selected.

2-1. DL Primary Transmission

<FDR MU PPDU>

FIG. 23 illustrates an example of an OFDMA-based FDR MU PPDU. For compatibility with the existing ax, an HE MU PPDU may be directly used. This is a case where FDR SIG-C is additionally inserted. FDR-SIG-A and FDR-SIG-B may be the same as the legacy HE-SIG-A and HE-SIG-B. FDR-STF and FDR-LTF may be the same as HE-STF and HE-LTF. FDR-STF and FDR-LTF may be located after FDR-SIG-C as shown in FIG. 23, but may be located after FDR-SIG-B. In addition, with a new format, FDR-STF and FDR-LTF may be located after RL-SIG or FDR-SIG-A, and RL-SIG may be omitted. In this case, however, an additional packet classification scheme is required. An FDR indication shall be performed before FDR-SIG-C and may be included in L-SIG (RL-SIG) or FDR-SIG-A or FDR-SIG-B. In L-SIG or RL-SIG, a reserved 1 bit (B4) between a rate field and a length field may be used. When inserted into the FDR-SIG-A, a B7 reserved field of the HE-SIG-A2 may be used. When inserted into the FDR-SIG-B, a new 1-bit FDR indication field may be defined in a common field of the HE-SIG-B. MCS of the FDR-SIG-C may be the same as that applied for the FDR-SIG-B.

In FIG. 23, a bandwidth may be 20/40/80/160 MHz. Although it is assumed that there are three RUs for convenience, a band plan of the existing 11ax may be directly used. This is a situation where a first RU is allocated to an STA1, a third RU is allocated to an STA2, and a second RU is not allocated to any STA. In this case, when considering a case where an opportunity to transmit UL data to a specific STA is given by using/based on the second RU, a design of FDR-SIG-B or FDR-SIG-C is proposed in the present specification according to an embodiment.

Alternatively, as shown in FIG. 24, without FDR-SIG-C, FDR-SIG-B may be transmitted by including related information. FIG. 24 illustrates another example of an OFDMA-based FDR MU PPDU.

In case of FIG. 24, an RU to be allocated to UL transmission, an STA ID to be allocated, and information on transmission timing shall be additionally carried on FDR-SIG-B. In this case, information on RU allocation can be prevented from being carried redundantly on the FDR-SIG-C, thereby reducing an overhead. An FDR indication may be included in L-SIG (RL-SIG) or FDR-SIG-A or FDR-SIG-B in the same manner as when FDR-SIG-C is used. An indication on the RU to be allocated to UL transmission may notify whether UL is used for each RU by adding a UL indication subfield to a common field. For example, if the RU allocation subfield is 00000001, first seven 26RUs and last one 52RU are used in DL transmission at 20 MHz. If each 1-bit UL indication subfield is added to 8 RUs and is set to 1, a corresponding RU is used for UL transmission, and information on an STA ID to be allocated to UL and information on transmission timing shall be carried additionally on a user specific field. In addition, essential information (information carried on the user specific field of HE-SIG-B such as NSTS, MCS, or the like) to be used for UL transmission may be directly carried.

<Secondary UL PPDU>

The second RU may be used so that a specific STA transmits an FDR secondary UL PPDU as follows.

Figure 25:
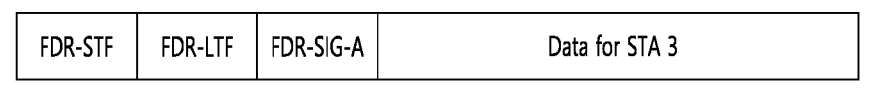

FIG. 25 illustrates an example of an OFDMA-based FDR UL PPDU.

In FIG. 25, a structure of an FDR UL PPDU is shown, and the legacy HE TB PPDU format may be directly used. That is, FDR-SIG-A, FDR-STF, and FDR-LTF may be HE-SIG-A, HE-STF, and HE-LTF of the HE TB PPDU. However, contents of FDR-SIG-A may be the same as HE-SIG-A of the HE SU PPDU.

FIG. 26 illustrates another example of an OFDMA-based FDR UL PPDU. According to information on FDR-SIG-B or FDR-SIG-C, the FDR-SIG-A of the FDR UL PPDU of FIG. 25 may be omitted as in FIG. 26. However, a BSS ID or the like may always be carried on FDR-SIG-A.

Figure 27:
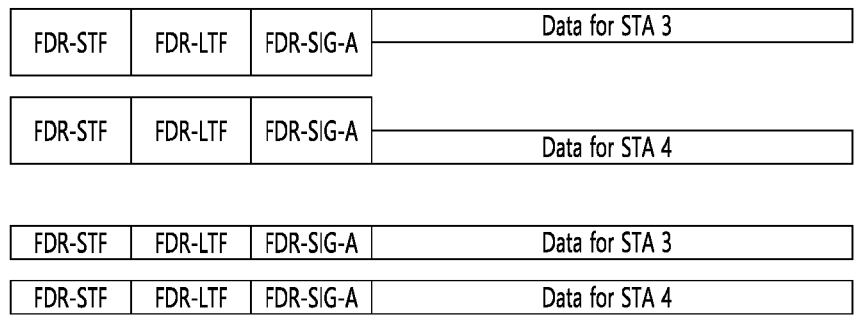
Figure 28:
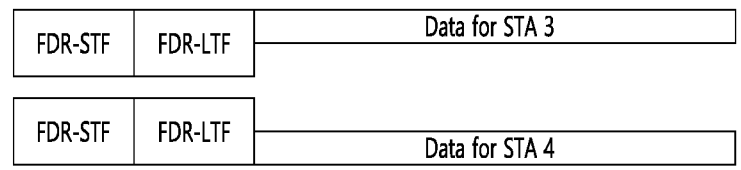

FIG. 27 to FIG. 29 illustrate another example of an OFDMA-based FDR UL PPDU. In a PPDU format of FIG. 27 to FIG. 29, a second RU is divided into at least two so that an STA3 and an STA4 can perform UL MU transmission.

2-1-i) Design on FDR-SIG-C

A design on FDR-SIG-C is proposed in a situation where the PPDU format of FIG. 23 is considered.

<FDR Indication>

In this case, L-STF to FDR-SIG-B may be the same as those in HE MU PPDU. However, a 1-bit FDR indication is required for L-SIG (or RL-SIG), FDR-SIG-A or FDR-SIG-B. This may be indicated by using/based on a reserved bit of each field or by allowing a common field of FDR-SIG-B to include a 1-bit FDR indication subfield.

<Default Configuration>

FDR-SIG-C may directly reuse the HE-SIG-B field of the HE MU PPDU, and may require additional information such as MU allocation (MU transmission in empty RU), transmission timing (UL transmission timing using empty RU), or the like. This will be described below in detail.

The FDR-SIG-C may directly reuse the HE-SIG-B field of FIG. 8.

FIG. 30 to FIG. 33 illustrate an encoding structure of an HE-SIG-B field per 20 Hz. An FDR-SIG-C filed may be divided into a common filed and a user specific filed similarly to the HE-SIG-B filed. The common filed may consist of common bits, CRC, and tail. The user specific field may be divided into several user block fields and padding. Each user block field may consist of 2 user bits, CRC, and tail except for a last user block field. The last user block field may consist of 1 or 2 user bits, CRC, and tail (see FIG. 8).

Figure 30:
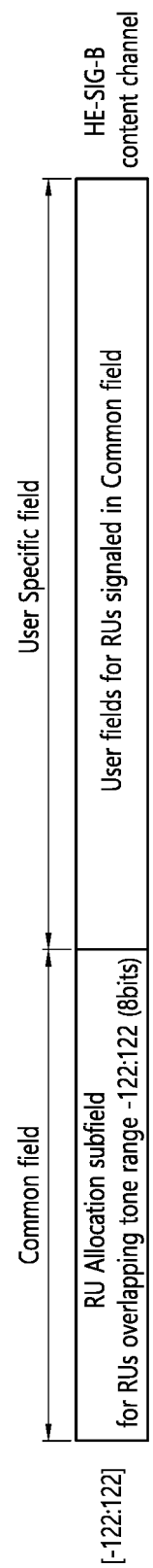
FIG. 30 illustrates an HE-SIG-B field for 20 Hz PPDU.

FIG. 30 illustrates an example of an HE-SIG-B field for a 20 MHz PPDU.

Referring to FIG. 30, the 20 MHz PPDU includes one of HE-SIG-B content channel including a common field and a user specific field. The common field includes an RU allocation signal for an RU generated in a 242-tone RU boundary.

Figure 31:
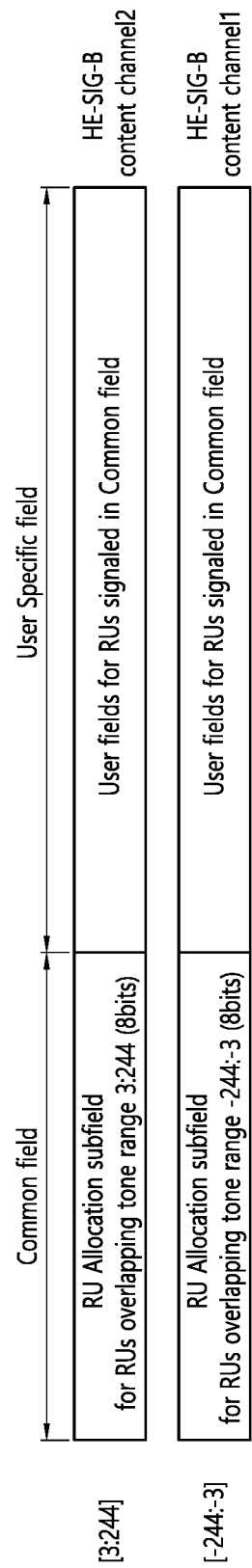
FIG. 31 illustrates an HE-SIG-B field for 40 Hz PPDU.

FIG. 31 is an example of an HE-SIG-B field for a 40 MHz PPDU.

Referring to FIG. 31, the 40 MHz PPDU includes two HE-SIG-B content channels, each of which occupies a 20 MHz frequency segment. Each HE-SIG-B content channel includes a common field and a user specific field. The HE-SIG-B content channel is aligned in an ascending order of absolute frequency. That is, a first HE-SIG-B content channel transfers a common field and user specific field corresponding to an RU of which a subcarrier index is [−244:−3]. A second HE-SIG-B content channel transfers a common field and user specific field corresponding to an RU of which a subcarrier index is [3:244].

Figure 32:
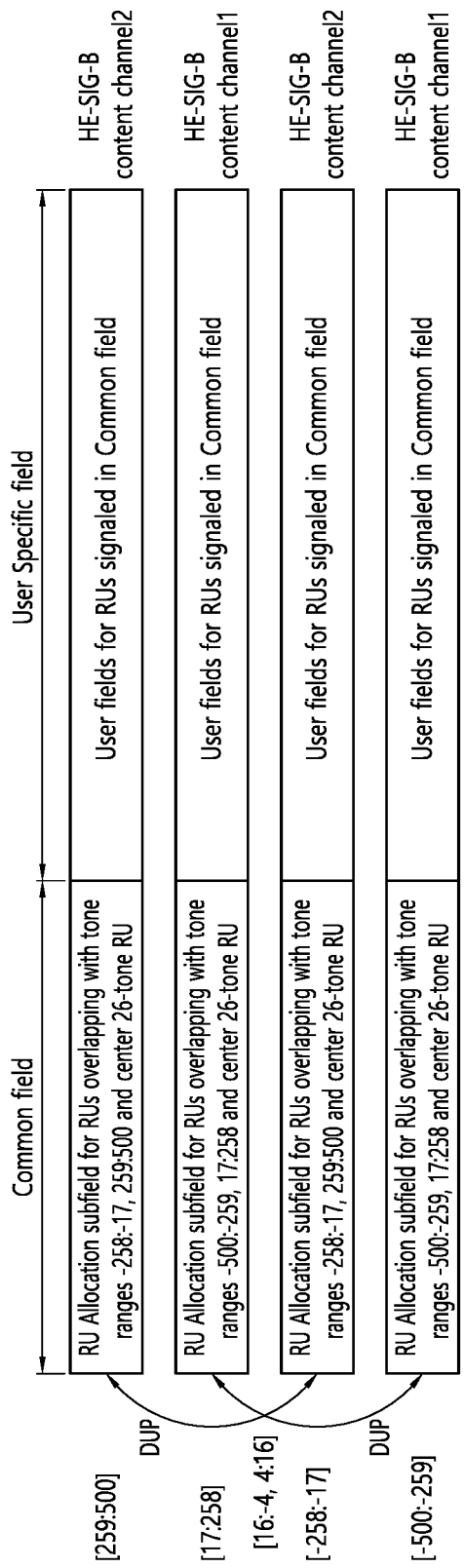
FIG. 32 illustrates an HE-SIG-B field for 80 Hz PPDU.

FIG. 32 is an example of an HE-SIG-B field for an 80 MHz PPDU.

Referring to FIG. 32, an 80 MHz PPDU includes two HE-SIG-B content channels, each of which is duplicated one time as follows.

When an SIGB compression field is set to 0 in an HE-SIG-A field of an HE MU PPDU, the two HE-SIG-B content channels are mapped by being duplicated in the 80 MHz PPDU. An HE-SIG-B content channel 1 occupies a 20 MHz frequency segment having lowest frequency, and is duplicated in a 20 MHz frequency segment having second lowest frequency. An HE-SIG-B content channel 2 occupies a 20 MHz frequency segment having second lowest frequency, and is duplicated in a 20 MHz frequency segment having fourth lowest frequency.

A first HE-SIG-B content channel of the 80 MHz PPDU transfers a common field and user specific field corresponding to an RU signaled in the common field. The common field of the HE-SIG-B content channel 1 includes the followings: an RU allocation subfield for an RU in the range of [−500:−259] or having a subcarrier index overlapping with [−500:−259] if the RU is greater than 242 subcarriers, a second RU allocation subfield in the range of [17:258] or having a subcarrier index overlapping with [17:258] if the RU is greater than 242 subcarriers, and a 1-bit central 26-tone RU subfield for indicating a presence of a user field corresponding to a center 26-tone RU across subcarriers [−16:−4, 4:16].

A second HE-SIG-B content channel of the 80 MHz PPDU transfers a common field and user specific field corresponding to an RU signaled in the common field. The common field of the HE-SIG-B content channel 2 includes the followings: an RU allocation subfield for an RU in the range of [−258:−17] or having a subcarrier index overlapping with [−258:−17] if the RU is greater than 242 subcarriers, a second RU allocation subfield in the range of [259:500] or having a subcarrier index overlapping with [259:500] if the RU is greater than 242 subcarriers, and a 1-bit central 26-tone RU subfield for indicating a presence of a user field corresponding to a center 26-tone RU across subcarriers [−16:−4, 4:16].

Figure 33:
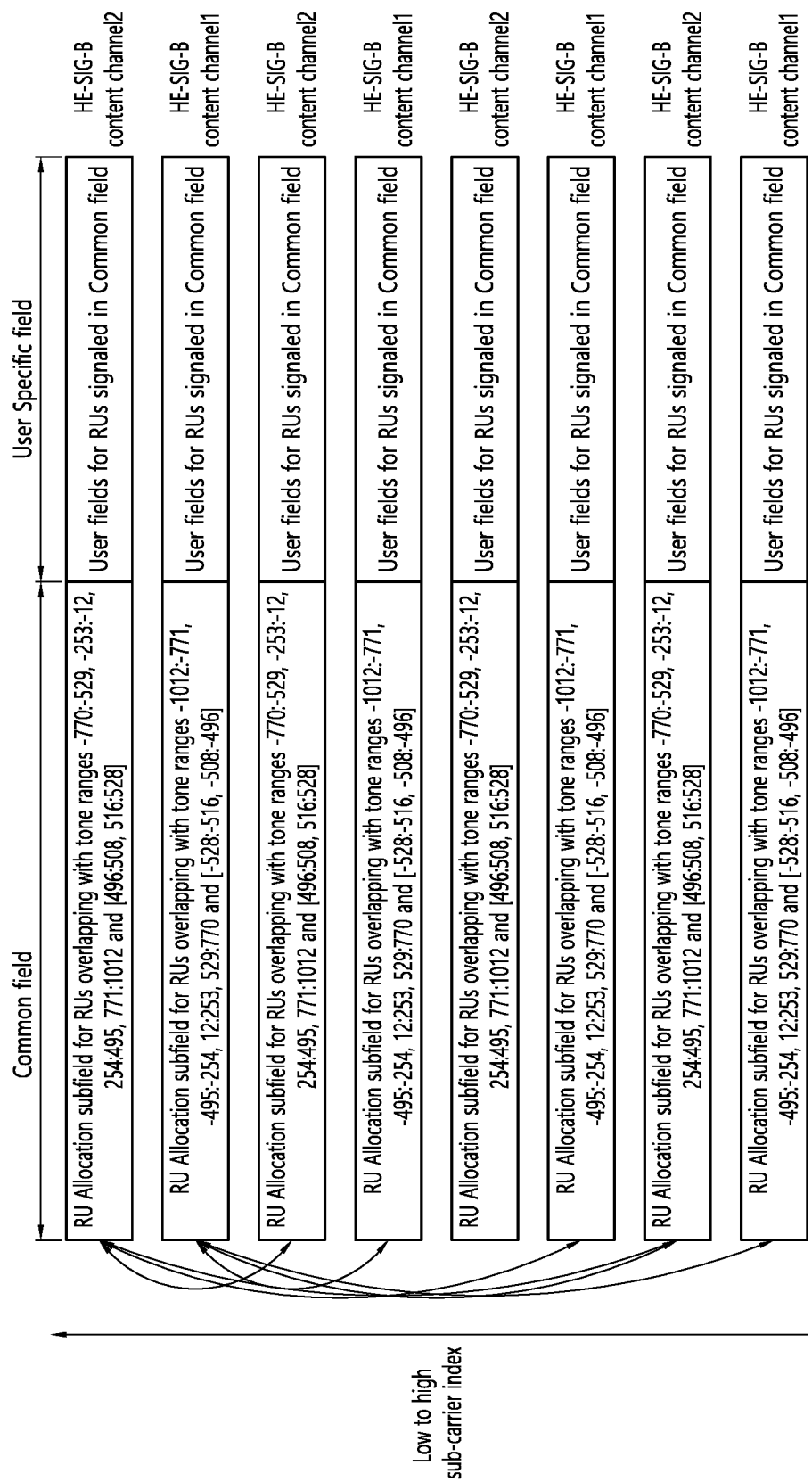
FIG. 33 illustrates an HE-SIG-B field for 160 Hz PPDU.

FIG. 33 is an example of an HE-SIG-B field for a 160 MHz PPDU.

Referring to FIG. 32, a 160 MHz PPDU includes two HE-SIG-B content channels, each of which is duplicated four times as follows.

When an SIGB compression field is set to 0 in an HE-SIG-A field of an HE MU PPDU, the two HE-SIG-B content channels are mapped by being duplicated in the 160 MHz PPDU. An HE-SIG-B content channel 1 occupies a 20 MHz frequency segment having lowest frequency, and is duplicated in a 20 MHz frequency segment having third, fifth, and seventh lowest frequency. An HE-SIG-B content channel 2 occupies a 20 MHz frequency segment having second lowest frequency, and is duplicated in a 20 MHz frequency segment having fourth, sixth, and eighth lowest frequency.

A first HE-SIG-B content channel of the 160 MHz PPDU transfers a common field and user specific field corresponding to an RU signaled in the common field. The common field of the HE-SIG-B content channel 1 includes the followings: an RU allocation subfield for an RU in the range of [−1012:−771] or having a subcarrier index overlapping with [−1012:−771] if the RU is greater than 242 subcarriers, a second RU allocation subfield in the range of [−495:−254]

or having a subcarrier index overlapping with [−495:−254] if the RU is greater than 242 subcarriers, a third RU allocation subfield for an RU in the range of [12:253] or having a subcarrier index overlapping with [12:253] if the RU is greater than 242 subcarriers, a fourth RU allocation subfield in the range of [529:770] or having a subcarrier index overlapping with [529:770] if the RU is greater than 242 subcarriers, and a 1-bit central 26-tone RU subfield for indicating a presence of a user field corresponding to a center 26-tone RU across subcarriers [−528:−516, −508:−496].

A second HE-SIG-B content channel of the 160 MHz PPDU transfers a common field and user specific field corresponding to an RU signaled in the common field. The common field of the HE-SIG-B content channel 2 includes the followings: an RU allocation subfield for an RU in the range of [−770:−529] or having a subcarrier index overlapping with [−770:−529] if the RU is greater than 242 subcarriers, a second RU allocation subfield in the range of [−253:−12] or having a subcarrier index overlapping with [−253:−12] if the RU is greater than 242 subcarriers, a third RU allocation subfield for an RU in the range of [254:459] or having a subcarrier index overlapping with [254:459] if the RU is greater than 242 subcarriers, a fourth RU allocation subfield in the range of [771:1012] or having a subcarrier index overlapping with [771:1012] if the RU is greater than 242 subcarriers, and a 1-bit central 26-tone RU subfield for indicating a presence of a user field corresponding to a center 26-tone RU across subcarriers [496:508, 516:528].

<FDR-SIG-C Common Field Option 1 (RU Allocation Subfield Reusing HE-SIG-B in HE MU PPDU)>

Information carried on each 20 MHz channel according to each bandwidth may also be designed in the same manner as the legacy HE-SIG-B. FIG. 30 is an HE-SIG-B content channel of a 20 MHz PPDU.

In FDR-SIG-C, an 8-bit RU allocation subfield may be contained in the common field, similarly to HE-SIG-B. In addition, information on a user field for each RU may be contained in the user specific field.

FIG. 31 illustrates an HE-SIG-B content channel of a 40 MHz PPDU, which may be directly applied to an FDR-SIG-C content channel of the 40 MHz PPDU. A content channel is configured in an increasing order of a frequency value. An 8-bit RU allocation subfield may be contained in the common field. In addition, information on a user field for each RU may be contained in the user specific field.

FIG. 32 illustrates an HE-SIG-B content channel of an 80 MHz PPDU, which may be directly applied to an FDR-SIG-C content channel of the 80 MHz PPDU. In addition, first and third 20 MHZ contents are duplicated, second and fourth 20 MHz contents are duplicated, and RU and user field information corresponding to 20 MHz are contained therein.

FIG. 33 illustrates an HE-SIG-B content channel of a 160 MHz PPDU, which may be directly applied to an FDR-SIG-C content channel of the 160 MHz PPDU. In addition, first, third, fifth, and seventh 20 MHZ contents are duplicated, second, fourth, sixth, and eighth 20 MHz contents are duplicated, and RU and user field information corresponding to 20 MHz are contained therein.

In addition, the common field of FDR-SIG-C may directly use the common field of HE-SIG-B of Table 8 above.

In addition, the RU allocation subfield in the common field of FDR-SIG-C may directly use the RU allocation subfield in the common field of HE-SIG-B of Table 9 above. However, this method requires bit information on a user specific field for all RUs, and has a disadvantage in that an overhead of the user specific field increases when there are many RUs which are not allocated for UL transmission. In this case, however, RU allocation different from RU allocation used in DL MU may be used for UL transmission (i.e., it may be configured as an RU allocation subfield suitable for UL transmission), and information such as an MU allocation subfield or the like newly proposed below is not be added, which may also be effective in UL MU MIMO transmission. For example, if the RU allocation subfield is set to 01011000 in FDR-SIG-B, it means that a different STA is allocated to each of 106RU, 26RU, 52RU, and 52RU to perform DL transmission. If MU MIMO transmission is performed by assigning two users to 106RU in UL transmission and if UL transmission is performed by splitting a last 52RU into two parts of 26RU and assigning each part to one different STA, an RU allocation subfield of FDR-SIG-C is set to 01010001. A center 26-tone RU subfield of FDR-SIG-C may indicate allocation of secondary UL transmission to the center 26 tone RU of 80/160/80+80 MHz according to a value of a bandwidth field of FDR-SIG-A.

<FDR-SIG-C User Field Option 1 (User Field Reusing HE-SIG-B in HE MU PPDU+Transmission Timing Field)>

A user field included in the user-specific field of the HE-SIG-B may be defined as follows. First, the user field for non-MU-MIMO allocation is as follows.

TABLE 12

| Bit | Subfield | Number of bits | Description |
| --- | --- | --- | --- |
| B0-B10 | STA-ID | 11 | Set to a value of the element indicated from TXVECTOR parameter STA_ID_LIST (see 27.11.1 (STA_ID_LIST)). |
| B11-B13 | NSTS | 3 | Number of space-time streams. Set to the number of space-time streams minus 1. |
| B14 | Beam-formed (#16038) | 1 | Use of transmit beamfoming. Set to 1 if a beamforming steering matrix is applied to the waveform in an SU transmission. Set to 0 otherwise. |
| B15-B18 | MCS | 4 | Modulation and coding scheme Set ton for MCSn, where n = 0, 1, 2 . . . , 11 Values 12 to 15 are reserved |
| B19 | DCM | 1 | Indicates whether or not DCM is used. Set to 1 to indicate that the payload (#Ed) of the corresponding user of the HE MU PPDU is modulated with DCM for the MCS. Set to 0 to indicate that the payload of the corresponding user of the PPDU is not modulated with DCM for the MCS. NOTE—DCM is not applied in combination with STBC. (#15664) |
| B20 | Coding | 1 | Indicates whether BCC or LDPC is used. Set to 0 for BCC Set to 1 for LDPC |

NOTE
If the STA-ID subfield is set to 2046, then the other subfields can be set to arbitrary values. (#15946)

The user field for MU-MIMO allocation is as follows.

TABLE 13

| Bit | Subfield | Number of bits | Description |
| --- | --- | --- | --- |
| B0-B10 | STA-ID | 11 | Set to a value of element indicated from |

TABLE 13-continued

| Bit | Subfield | Number of bits | Description |
|---|---|---|---|
| | | | TXVECTOR parameter STA_ID_LIST (see 27.11.1 (STA_ID_LIST)). |
| B11-B14 | Spatial Configuration | 4 | Indicates the number of spatial streams for a STA in an MU-MIMO allocation (see Table 28-28 (Spatial Configuration subfield encoding)). |
| B15-B18 | MCS | 4 | Modulation and coding scheme. Set ton for MCSn, where n = 0, 1, 2, . . . , 11 Values 12 to 15 are reserved |
| B19 | Reserved | 1 | Reserved and set to 0 |
| B20 | Coding | 1 | Indicates whether BCC or LDPC is used. Set to 0 for BCC Set to 1 for LDPC |

NOTE
If the STA-ID subfield is set to 2046, then the other subfields can be set to arbitrary values. (#15946)

Likewise, the user field of FDR-SIG-C may directly use the user field of HE-SIG-B.

In addition, the user field requires information on transmission timing (i.e., a transmission timing field). The information on transmission timing may be applied to FDR-SIG-C by directly taking a rate field and length field type of L-SIG. A method of notifying a PPDU length of the rate field and length field type of L-SIG may be directly applied by considering that the transmission timing corresponds to a PPDU length. In this case, a 4-bit rate field and a 12-bit length field, i.e., a 16-bit transmission timing field, may be defined in the user field. Alternatively, a 7-bit transmission timing field may be defined by reusing a 7-bit TXOP field used in HE-SIG-A in the user field. That is, a length of TXOP is directly applied by being determined as transmission timing. Alternatively, a transmission timing field with a bit having a specific length may be defined and indicated in unit of symbols. For example, a 2-bit transmission timing field may be used to indicate 4 cases in total. A specific symbol/time offset value may be substituted to a value corresponding to each bit (e.g., a 4/8/12/16 symbol or PPDU length of information on L-SIG is used to indicate a start part by dividing a length to a last part of PPDU after FDR-LTF into four parts, for example, a 0/5/10/15 symbol if the length to the last part of PPDU after the FDR-LTF to is 20 symbols, and if not dividable, a quotient is rounded up or down). A length (or the number of symbols) to the transmission timing may be a length to a transmission timing immediately after FDR-SIG-C of the FDR MU PPDU or a length to a transmission timing immediately after L-SIG of the FDR MU PPUD or a length to a transmission timing after FDR-LTF.

<FDR-SIG-C Common Field Option 2 (RU Allocation Subfield Reusing HE-SIG-B in HE MU PPDU+UL RU Allocation Subfield)>

An RU allocation subfield may be designed as follows. RU allocation of HE-SIG-B is reused, and in this case, a UL RU allocation subfield may be added to a common field. The UL RU allocation subfield is an indication for an RU used for UL transmission. 1-bit information may be added to each RU to indicate that UL transmission is performed if 1 (or 0) and UL transmission is not performed if 0 (or 1). In doing so, the user specific field requires only bit information for an RU corresponding to UL transmission, thereby reducing an overhead. In addition, an additional MU allocation subfield is not required in the common field, and UL MU MIMO transmission is also possible. For example, if the RU allocation subfield is set to 01110000 and the UL RU allocation subfield is set to 0011, it means that third and fourth 52RUs are used for UL transmission. Alternatively, 9 bits may be allocated to the UL RU allocation subfield based on 26RU (or based on a minimum RU unit) to indicate the RU used for UL transmission. For example, if the RU allocation subfield is set to 01110000 and the UL RU allocation subfield is set to 000001111, it means that sixth, seventh, eighth, and ninth 26RUs are used for UL transmission. Considering the RU allocation subfield, it is possible to derive the meaning that the third and fourth 52RUs are used for UL transmission. In doing so, the number of bits of the common field of FDR-SIG-C may be fixed to the same value irrespective of RU allocation (It has a different value only depending on a bandwidth). A center 26-tone RU subfield of FDR-SIG-C may indicate secondary UL transmission allocation for a center 26 tone RU of 80/160/80+80 MHz according to a value of a bandwidth field of FDR-SIG-A.

<FDR-SIG-C Common Field Option 3 (New RU Allocation Subfield+MU Allocation Subfield)>

An RU allocation subfield may be designed as follows. 9 bits are used per 20 MHz, and each 1 bit indicates information on 26 RU (or the number of bits can be fixed based on a minimum RU unit). In case of 1 (or 0), it means that UL allocation is achieved, and in case of 0 (or 1), it means that allocation is not achieved. In this case, it is possible to infer which RU size is used for UL transmission in consideration of an RU allocation subfield of FDR-SIG-B. For example, if the RU allocation subfield of FDR-SIG-B is 01110000, it means that four 52RUs are used, and if the RU allocation subfield of FDR-SIG-C is 001100011, it means that second and last 52RUs are allocated to specific STAs to perform UL transmission. That is, a user specific field requires only specific information on STAs allocated to the two RUs, thereby reducing an information amount. However, additional information (MU allocation subfield) shall be sent when the RU is split for use rather than one user uses each RU or when MU MIMO transmission is considered. A possible case may be limited such that the MU allocation subfield uses 1 bit for each RU, and when an indication for MU transmission is used in MU transmission, splitting is achieved in unit of 26RU (or based on a minimum RU unit) or in unit of a second smallest RU so that each different STA is allocated thereto. For example, when considering the aforementioned case where the RU allocation subfield is set to 001100011, if the MU allocation subfield is set to 10 (this value is indicated only for an RU used for UL transmission, and may be set to 0100 based on all RUs), it means that, in secondary UL transmission, a second 52RU is split to allocate one different STA to each 26RU and one STA is allocated to the entirety of a fourth 52RU. Alternatively, the MU allocation subfield may also indicate UL MU transmission by allocating 9 bits in unit of 26RU (or based on a minimum RU unit). For example, if the RU allocation subfield is set to 001100011 and the MU allocation subfield is set to 001100000, it means that the first 52RU is split to allocate one different STA to each 26RU and one STA is allocated to the entirety of a second 52RU. In doing so, the number of bits in the common field of FDR-SIG-C may be fixed to the same value irrespective of RU allocation (It has a different value only depending on a bandwidth). In addition, a center 26-tone RU subfield may be added to FDR-SIG-C, and secondary UL transmission allocation for center 26 tone RU of 80/160/80+80 MHz may be indicated according to a bandwidth field value of FDR-SIG-A. A center 26-tone UL RU allocation subfield may also be followed by the center 26-tone RU subfield.

<FDR-SIG-C Common Field Option 4 (UL RU Allocation Subfield in FDR-SIG-B+MU Allocation Subfield)>

Alternatively, RU allocation information on UL transmission RU (UL RU allocation subfield) may be contained in FDR-SIG-B. In this case, information regarding whether a corresponding RU will be used in a split manner may be contained in a common field of FDR-SIG-C to decrease a transmission overhead. In FDR-SIG-B, the UL RU allocation subfield may add 1-bit information to each RU in the common field to indicate that UL transmission is performed if 1 (or 0) and UL transmission is not performed if 0 (or 1). For example, if the RU allocation subfield of FDR-SIG-B is set to 01110000 (using 52RUs) and if the UL RU allocation subfield is set to 0011, it means that third and fourth 52RUs are used for UL transmission. In addition, if the MU allocation subfield in the common field of FDR-SIG-C is set to 01 (this value is indicated only for an RU used for UL transmission, and may be set to 0001 for all RUs), it means that the third 52RU is allocated to one STA for UL transmission, and the fourth 52RU is split into two 26RUs (or in a minimum RU unit), each of which is allocated to one different STA so as to be used for UL transmission. In this case, however, it is necessary to clearly define a case where UL transmission is allocated to an RU used for UL MU MIMO in FDR-SIG-B. In this case, without considering transmission of UL MU MIMO using a corresponding RU, it is proposed that UL transmission is performed by allocating one STA if the MU allocation subfield is 0 and MU transmission is performed by splitting the RU in unit of 26RU (or a minimum RU unit) or a next smallest RU unit if it is set to 1. Alternatively, in order to always equalize the number of bits of the common field of FDR-SIG-B and the number of bits of the common field of FDR-SIG-C (it differs only depending on a bandwidth), the UL RU allocation subfield and the MU allocation subfield may be used by allocating 9 bits, based on 26RU (or based on a minimum RU unit). For example, if the RU allocation subfield of FDR-SIG-B is set to 01110000, if the UL RU allocation subfield is set to 000001111, and if the MU allocation subfield of FDR-SIG-C is set to 000000011, it means that the third 52RU is allocated to one STA for UL transmission, and the fourth 52RU is split into two 26RUs, each of which is allocated to one different STA so as to be used for UL transmission. If the FDR-SIG-B is configured such that a center 26-tone RU is used for FDR DL MU PPDU transmission, the center 26-tone RU subfield may be followed by a center 26-tone UL RU allocation subfield. In addition, the center 26-tone RU MU allocation subfield may exist for the center 26-tone RU.

<MU Allocation Alternative Option>

In the aforementioned proposal, if MU indication is achieved for each RU unit according to RU allocation, an MU allocation subfield may use bit indication only for at least 52RU which is a minimum unit in which MU transmission is possible. Alternatively, in order to not only guarantee the same bits of a common field of FDR-SIG-C (it differs only depending on a bandwidth) but also reduce an overhead, the MU allocation subfield may be indicated not in unit of 26RU but in unit of 52RU which is a minimum unit in which MU transmission is possible, and only 4 bits may be used (since MU transmission is impossible due to split 26RU). For example, if the RU allocation subfield of FDR-SIG-B is set to 01110000, if the UL RU allocation subfield is set to 000001111, and if the MU allocation subfield of FDR-SIG-C is set to 0001, it means that the third 52RU is allocated to one STA for UL transmission, and the fourth 52RU may be split into two 26RUs, each of which is allocated to one different STA so as to be used for UL transmission.

<UL MU MIMO Indication>

A UL MU allocation subfield may be used to indicate UL MU MIMO as follows. 2 bits may be allocated to an RU in which MU MIMO is possible. 00 may indicate that one STA is allocated for UL transmission, 01 may indicate that the RU is split into a smaller RU unit and one STA is allocated to each RU for UL transmission, 10 may indicate UL MU MIMO transmission, and 11 may be reserved. In this case, however, it is necessary to indicate the number of bits for UL MU MIMO transmission. 3 bits (number-of-user subfield) may be used such that 000 is reserved or indicates 1 user (i.e., indicating that it is not MIMO transmission), 001 indicates 2 users, 010 indicates 3 users, 011 indicates 4 users, 100 indicates 5 users, 101 indicates 6 users, 110 indicates 7 users, and 111 indicates 8 users. In order to equalize the number of bits of a common field of FDR-SIG-C (it has a different value only depending on a bandwidth), the MU allocation subfield is based on unit of 26RU, each of which requires 2 bits, thereby requiring 18 bits in total, and the number-of-user subfield may indicate transmission based on an RU unit capable of performing MU MIMO transmission. If 106RU is a minimum RU unit in which MIMO is possible, the number-of-user subfield may use 6 bits in total based on 20 MHz.

In addition, in case of using UL MU MIMO, it may be necessary to indicate an MU-MIMO LTF mode, and this may be carried on a common field or a user info field for an STA allocated for UL MU MIMO transmission. In order to equalize the number of bits of the user info field, an indication for this may be carried on all user info fields irrespective of whether it corresponds to UL MU MIMO of a user. Table 7 indicates the MU-MIMO LTF mode subfield, and may be used without alteration.

In all proposals described above, the MU allocation subfield may be omitted when UL MU is not considered in secondary UL transmission. However, the following subfield may be added in UL MU transmission.

<Subfield to be Added in UL MU Transmission>

For UL MU transmission, an AP TX power subfield (it is defined in a UMRS (TBRS) control field or a common info field of a trigger frame. 5 bits and 6 bit are reused respectively) may be added to a common field of FDR-SIG-C, and a target RSSI subfield (it is defined in a UMRS (TBRS) control field or a common info field of a trigger frame. 5 bits and 7 bits are reused respectively) may be added to a user specific field.

<FDR-SIG-C MCS>

FDR-SIG-C MCS indication may not be separately indicated by using/based on MCS0, or SIGB MCS used for indication in FDR-SIG-A may be directly applied to SIGC MCS. Alternatively, an SIGC MCS subfield using 3 bits may be defined for indication in a common field of FDR-SIG-B. Alternatively, a delta MCS subfield using specific bits may be defined to indicate a difference from the SIGB MCS in the common field of FDR-SIG-B. FDR-SIG-C DCM indication may not be separately indicated by applying or not applying DCM by default, or SIGB DCM indicated in FDR-SIG A may be directly applied to SIGC DCM. Alternatively, a B7 reserved bit of HE-SIG-A2 may be used for indication by defining an SIGC DCM subfield in FDR-SIG-A. Alternatively, an SIGC DCM subfield using 1 bit may be defined for indication in a common field of FDR-SIG-B.

2-1-ii) FDR-SIG-B Design

Hereinafter, a design on FDR-SIG-B is proposed in a situation where the PPDU format of FIG. 24 is considered.

<FDR Indication>

In this case, L-STF to FDR-SIG-A may be the same as those in HE MU PPDU. However, a 1-bit FDR indication is required for L-SIG (or RL-SIG) and FDR-SIG-A. A reserved bit of each field may be used.

<Default Configuration>

The FDR-SIG-C may directly reuse the HE-SIG-B field of FIG. 8.

FIG. 30 to FIG. 33 illustrate an encoding structure of an HE-SIG-B field per 20 Hz. An FDR-SIG-C filed may be divided into a common filed and a user specific filed similarly to the HE-SIG-B filed. The common filed may consist of common bits, CRC, and tail. The user specific field may be divided into several user block fields and padding. Each user block field may consist of 2 user bits, CRC, and tail except for a last user block field. The last user block field may consist of 1 or 2 user bits, CRC, and tail (see FIG. 8).

<FDR-SIG-B Common Field (RU Allocation Subfield Reusing HE-SIG-B in HE MU PPDU+UL RU Allocation Subfield+UL MU Allocation Subfield)>

Information carried on each 20 MHz channel according to each bandwidth may also be designed in the same manner as the legacy HE-SIG-B. FIG. 30 is an HE-SIG-B content channel of a 20 MHz PPDU.

In FDR-SIG-B an 8-bit RU allocation subfield may be contained in the common field, similarly to HE-SIG-B, and additional information (UL RU allocation subfield and UL MU allocation subfield) may be necessary for a UL transmission indication. In addition, information on a user field for each RU may be contained in the user specific field.

FIG. 31 illustrates an HE-SIG-B content channel of a 40 MHz PPDU, which may be directly applied to an FDR-SIG-B content channel of the 40 MHz PPDU. However, additional information (UL RU allocation subfield and UL MU allocation subfield) may be necessary for a UL transmission indication. A content channel is configured in an increasing order of a frequency value.

FIG. 32 illustrates an HE-SIG-B content channel of an 80 MHz PPDU, which may be directly applied to an FDR-SIG-B content channel of the 80 MHz PPDU. However, additional information (UL RU allocation subfield and UL MU allocation subfield) may be necessary for a UL transmission indication. First and third 20 MHZ contents are duplicated, second and fourth 20 MHz contents are duplicated, and RU and user field information corresponding to 20 MHz are contained therein.

FIG. 33 illustrates an HE-SIG-B content channel of a 160 MHz PPDU, which may be directly applied to an FDR-SIG-B content channel of the 160 MHz PPDU. However, additional information (UL RU allocation subfield and UL MU allocation subfield) may be necessary for a UL transmission indication. In addition, first, third, fifth, and seventh 20 MHZ contents are duplicated, second, fourth, sixth, and eighth 20 MHz contents are duplicated, and RU and user field information corresponding to 20 MHz are contained therein.

In addition, the common field of FDR-SIG-B may directly use the common field of HE-SIG-B of Table 8 above.

However, RU allocation information (UL RU allocation subfield) for a UL transmission RU may be contained, and information on whether to split a corresponding RU to be used in MU transmission (UL MU allocation subfield) is also required. The UL RU allocation subfield may add 1-bit information to each RU in the common field to indicate that UL transmission is performed if 1 (or 0) and UL transmission is not performed if 0 (or 1). In addition, the UL MU allocation subfield may use 1 bit in the RU to be used in each UL transmission to indicate UL transmission. In MU transmission, except for MU MIMO, the number of cases may be limited in such a manner that the RU is split in unit of 26RU (or based on a minimum RU unit) or in unit of a next smallest sized RU, and one different STA is allocated to each of them. For example, if an RU allocation subfield of FDR-SIG-B is set to 01110000 (using four 52RUs) and if a UL RU allocation subfield is set to 0011, it means that third and fourth 52RUs are used for UL transmission. In addition, if the UL MU allocation subfield is set to 01, it means that the third 52RU is allocated to one STA for UL transmission, and the second 52RU is spilt into two parts (or in a minimum RU unit), each of which is allocated to one different STA so as to be used for UL transmission. Alternatively, in order to equalize the number of bits of the common field of FDR-SIG-B (it differs only depending on a bandwidth), the UL RU allocation subfield and the UL MU allocation subfield may be used by allocating 9 bits, based on 26RU (or based on a minimum RU unit). For example, if the RU allocation subfield of FDR-SIG-B is set to 01110000 and the UL MU RU allocation subfield is set to 000001111, it means that the third 52RU is allocated to one STA for UL transmission, and the fourth 52RU is split into two 26RUs, each of which is allocated to one different STA so as to be used for UL transmission. When a center 26-tone RU is used, a center 26-tone RU subfield may be followed by a center 26-tone UL RU allocation subfield. In addition, the center 26-tone RU UL MU allocation subfield may exist for the center 26-tone RU.

<Alternative MU Allocation Subfield>

In the aforementioned proposal, if MU indication is achieved for each RU unit according to RU allocation, a UL MU allocation subfield may use bit indication only for at least 52RU which is a minimum unit in which MU transmission is possible. Alternatively, in order to not only guarantee the same bits of a common field of FDR-SIG-B (it differs only depending on a bandwidth) but also reduce an overhead, the UL MU allocation subfield may be indicated not in unit of 26RU but in unit of 52RU which is a minimum unit in which MU transmission is possible, and only 4 bits may be used (since MU transmission is impossible due to split 26RU). For example, if the RU allocation subfield of FDR-SIG-B is set to 01110000, if the UL RU allocation subfield is set to 000001111, and if the UL MU allocation subfield is set to 0001, it means that the third 52RU is allocated to one STA for UL transmission, and the fourth 52RU may be split into two 26RUs, each of which is allocated to one different STA so as to be used for UL transmission.

<UL MU MIMO Indication>

A UL MU allocation subfield may be used to indicate UL MU MIMO as follows. 2 bits may be allocated to an RU in which MU MIMO is possible. 00 may indicate that one STA is allocated for UL transmission, 01 may indicate that the RU is split into a smaller RU unit and one STA is allocated to each RU for UL transmission, 10 may indicate UL MU MIMO transmission, and 11 may be reserved. In this case, however, it is necessary to indicate the number of bits for UL MU MIMO transmission. 3 bits (number-of-user subfield) may be used such that 000 is reserved or indicates 1 user (i.e., indicating that it is not MIMO transmission), 001 indicates 2 users, 010 indicates 3 users, 011 indicates 4 users, 100 indicates 5 users, 101 indicates 6 users, 110 indicates 7 users, and 111 indicates 8 users. In order to equalize the number of bits of a common field of FDR-SIG-B (it has a different value only depending on a bandwidth), the UL MU allocation subfield is based on unit of 26RU, each of which requires 2 bits, thereby requiring 18 bits in total, and the number-of-user subfield may indicate transmission based on an RU unit capable of performing MU MIMO transmission. If 106RU is a minimum RU unit in which MIMO is possible, the number-of-user subfield may use 6 bits in total based on 20 MHz.

In addition, in case of using UL MU MIMO, it may be necessary to indicate an MU-MIMO LTF mode, and this may be carried on a common field or a user info field for an STA allocated for UL MU MIMO transmission. In order to equalize the number of bits of the user info field, an indication for this may be carried on all user info fields irrespective of whether it corresponds to UL MU MIMO of a user.

In the proposal described above, the UL MU allocation subfield may be omitted when UL MU is not considered in secondary UL transmission.

<RU Allocation Subfield>

In addition, the RU allocation subfield in the common field of FDR-SIG-B may directly use the RU allocation subfield in the common field of HE-SIG-B of Table 9 above.

<FDR-SIG-B User Field (Primary (DL) User Specific Field Reusing HE-SIG-B in HE MU PPDU+Secondary (UL) User Specific Field Reusing HE-SIG-B in HE MU PPDU+UL Transmission Timing Field)>

A user field included in a user-specific field of the HE-SIG-B may be defined as shown in Table 12 and Table 13 above. First, a user field for non-MU-MIMO allocation may be as shown in Table 12 above. A user field for MU-MIMO allocation may be as shown in Table 13 above. However, a user field corresponding to DL and a user field corresponding to UL may be present, and the DL user field may be followed by the UL user field. Alternatively, the other way around may also be possible.

In addition, the UL user field requires information on transmission timing (i.e., a UL transmission timing field). The information on transmission timing may be applied to FDR-SIG-B by directly taking a rate field and length field type of L-SIG. A method of notifying a PPDU length of the rate field and length field type of L-SIG may be directly applied by considering that the transmission timing corresponds to a PPDU length. In this case, a 4-bit rate field and a 12-bit length field, i.e., a 16-bit UL transmission timing field, may be defined in the UL user field. Alternatively, a 7-bit UL transmission timing field may be defined by reusing a 7-bit TXOP field used in HE-SIG-A in the UL user field. That is, a length of TXOP is directly applied by being determined as transmission timing. Alternatively, a UL transmission timing field with a bit having a specific length may be defined and indicated in unit of symbols. For example, a 2-bit UL transmission timing field may be used to indicate 4 cases in total. A specific symbol/time offset value may be substituted to a value corresponding to each bit (e.g., a 4/8/12/16 symbol or PPDU length of information on L-SIG is used to indicate a start part by dividing a length to a last part of PPDU after FDR-LTF into four parts, for example, a 0/5/10/15 symbol if the length to the last part of PPDU after the FDR-LTF to is 20 symbols, and if not dividable, a quotient is rounded up or down). A length (or the number of symbols) to the transmission timing may be a length to a transmission timing immediately after FDR-SIG-B of the FDR MU PPDU or a length to a transmission timing immediately after L-SIG of the FDR MU PPUD or a length to a transmission timing after FDR-LTF.

<Subfield to be Added in UL MU Transmission>

For UL MU transmission, an AP TX power subfield (it is defined in a UMRS (TBRS) control field or a common info field of a trigger frame. 5 bits and 6 bit are reused respectively) may be added to a common field of FDR-SIG-B, and a target RSSI subfield (it is defined in a UMRS (TBRS) control field or a common info field of a trigger frame. 5 bits and 7 bits are reused respectively) may be added to a UL user specific field.

2-2. UL Primary Transmission 2-2-i) Primary UL PPDU

Through the legacy HE TB PPDU, an FDR TB PPDU may be first transmitted (UL primary transmission), followed by FDR SU or FDR MU PPDU transmission using an empty RU (UL secondary transmission).

<FDR Indication>

For transmission of FDR TB PPDU, a trigger frame may be transmitted in an AP, and an FDR indication may be included in the trigger frame as described in the conventional technique for transmission of FDR SU PPDU or FDR MU PPDU by using/based on an empty RU. In addition, a reserved field of a common info field may be used for FDR indication. Further, the FDR indication may be inserted to the FDR TB PPDU so that other STAs can prepare to receive a DL PPDU transmitted from the AP.

<FDR TB PPDU>

Figure 34:
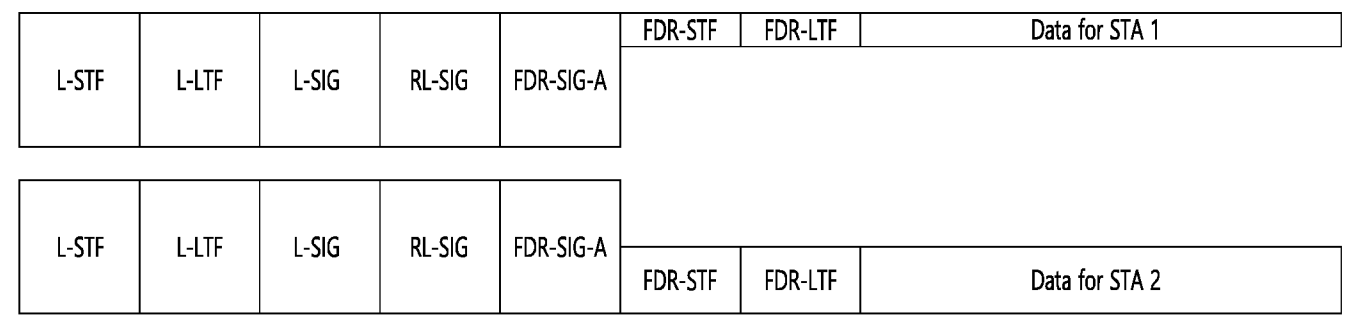

FIG. 34 illustrates an example of an OFDMA-based FDR TB PPDU.

In FIG. 34, a structure of an FDR TB PPDU is shown in a situation where transmission is performed by allocating an STA1 and an STA2 respectively to a first RU and a third RU, and a second RU is empty. In the figure, each PPDU may have a bandwidth of 20/40/80 MHz. Although three RUs are assumed for convenience, a tone plan of 11ax may be applied in practice.

Since an HE TB PPDU can be directly reused, FDR-SIG-A, FDR-STF, and FDR-LTF may be identical to the legacy HE-SIG-A, HE-STF, and HE-LTF. An FDR indication may be included, and one bit may be used by being selected from several reserved fields of L-SIG, RL-SIG, and HE-SIG-A of the HE TB PPDU.

2-2-ii) Secondary DL PPDU

Figure 35:
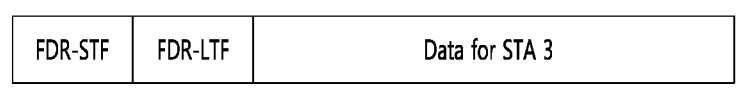

FIG. 35 illustrates an example of an OFDMA-based FDR MU PPDU.

In FIG. 35, an FDR secondary DL PPDU structure is shown for transmitting data to an STA3 by using/based on an empty second RU, and transmission may start after FDR-SIG-A of HE TB PPDU.

Figure 36:
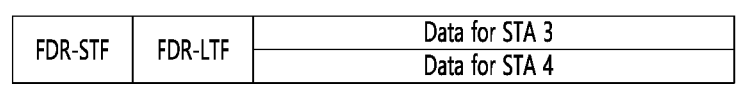

FIG. 36 illustrates another example of an OFDMA-based FDR MU PPDU. That is, as shown in FIG. 36, an FDR secondary DL PPDU structure is also possible in which data is transmitted to an STA3 and an STA4 by dividing an empty second RU in half.

Figure 37:
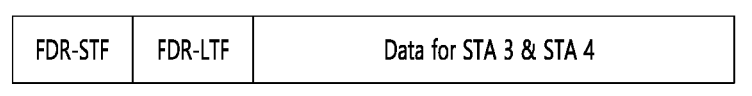

FIG. 37 illustrates another example of an OFDAM-based FDR MU PPDU. That is, as shown in FIG. 37, an FDR secondary DL PPDU structure is also possible in which data is transmitted to an STA3 and an STA4 by dividing an empty second RU with MU-MIMO.

Alternatively, FDR-SIG-A may be present next to FDR-LTF, and a BSS ID or the like may be carried thereon.

A trigger frame design will be proposed in such a situation.

<Default Configuration>

The existing trigger frame is shown in FIG. 9.

Referring to FIG. 9, the existing RA/common info/user info field may be directly reused by changing its name to UL or primary RA/UL or primary common info/UL or primary user info field. Herein, a DL RA 1~n or secondary RA 1~n field and a DL common info 1~n or secondary common info 1~n and DL user Info1~n or secondary user info 1~n field are additionally required. Herein, 1~n means that it is divided into n groups depending on a DL transmission timing, and information on transmission may be necessarily informed for each group. In addition, the primary RA and such field may be located before padding. The remaining fields other than a newly added field may directly use the existing trigger frame.

<Secondary RA Field>

The secondary RA field may be configured with IDs of STAs for receiving secondary DL transmission, a group ID, or the like.

<Secondary Common Info Field>

The secondary common info field may reuse a trigger frame common info field as shown in FIG. 10.

In the above structure, trigger type/cascade indication/CS required/MU-MIMO LTF mode/AP TX power/packet extension/spatial reuse (only some parts can be excluded, for example, only 4 bits can be used)/HE-SIG-A reserved subfield, or the like may be excluded, and since a length and BW of the primary common info field can be directly used, a length/BW subfield may also be excluded. However, information on a DL transmission timing (DL transmission timing subfield) may be added. Alternatively, a secondary user info field may be carried on the DL transmission timing subfield, whereas information carried on the secondary common inform field is information on a DL PPDU transmitted to STAs having the same transmission timing. Therefore, the DL transmission timing subfield may be preferably carried on the secondary common info field in terms of an overhead.

The information on transmission timing may be applied to a secondary common info field by directly taking a rate field and length field type of L-SIG. A method of notifying a PPDU length of the rate field and length field type of L-SIG may be directly applied by considering that the transmission timing corresponds to a PPDU length. In this case, a 4-bit rate field and a 12-bit length field, i.e., a 16-bit DL transmission timing field, may be defined in the UL user field. Alternatively, a 7-bit DL transmission timing field may be defined by reusing a 7-bit TXOP field used in HE-SIG-A in the UL user field. That is, a length of TXOP is directly applied by being determined as transmission timing. Alternatively, a DL transmission timing field with a bit having a specific length may be defined and indicated in unit of symbols. For example, a 2-bit DL transmission timing field may be used to indicate 4 cases in total. A specific symbol/time offset value may be substituted to a value corresponding to each bit (e.g., a 4/8/12/16 symbol). A length (or the number of symbols) to the transmission timing may be a length to a transmission timing from the start of the FDR TB PPDU or may be a length to a transmission timing immediately after FDR-SIG-A of the FDR TB PPDU.

<Secondary User Info Field>

The secondary user info field may reuse the user info field of the trigger frame as shown in FIG. 11. However, a target RSSI subfield may be excluded.

<Alternative Common Info Field Design>

In the default configuration proposed above, the length/BW subfield in the common field may be commonly used in primary UL and secondary DL. Accordingly, in this case, the common info field may be divided into common info/primary common info/secondary common info fields. The common info field consists of length/BW subfields. The primary common info field may exclude the length/BW subfield from the existing common info field. The secondary common info field may exclude a trigger type/length/cascade indication/CS required/BW/MU-MIMO LTF mode/AP TX power/packet extension/spatial reuse (only some parts can be excluded, for example, only 4 bits are used)/HE-SIG-A reserved subfield from the existing common info field or the like, and may include a DL transmission timing subfield.

In addition, a trigger frame of an AP may be used in both primary UL and primary DL situations. In this case, a primary RA field, a secondary RA 1~n field, a primary common info field, a secondary common info 1~n field, a primary user info field, a secondary user info 1~n field, or the like may be defined in the trigger frame. Each field may directly reuse the RA field, common info field, and user info field in the existing trigger frame. In particular, a field for DL may use the secondary RA field, secondary common info field, secondary user info field proposed in a situation where UL transmission is preferred.

Hereinafter, the aforementioned embodiment will be described according to a time flow with reference to FIG. 38 to FIG. 41.

Figure 38:
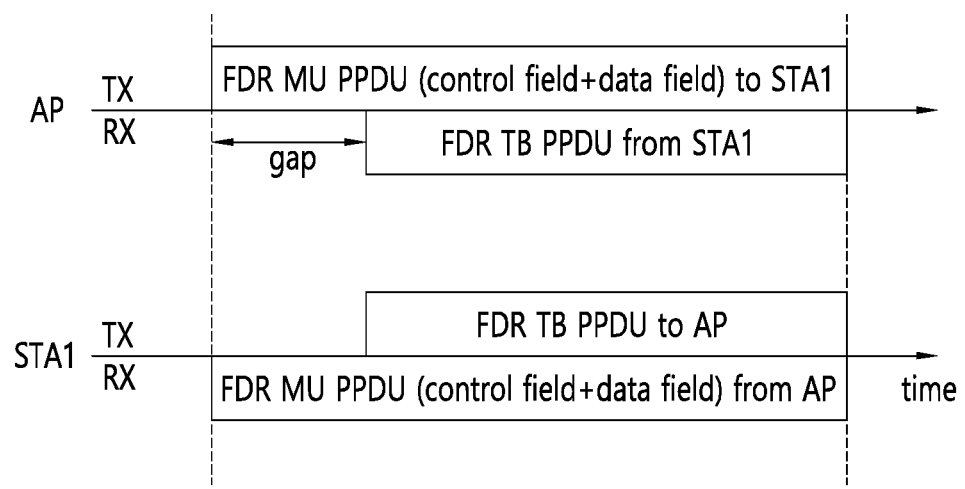
FIG. 38 illustrates a procedure according to which DL primary transmission and UL secondary transmission are performed based on symmetric FDR according to the present embodiment.

FIG. 38 illustrates a procedure according to which DL primary transmission and UL secondary transmission are performed based on symmetric FDR according to the present embodiment.

FIG. 38 illustrates symmetric FDR in which FDR-based transmission and reception occur only in an AP and an STA1. In addition, FIG. 38 illustrates an example in which FDR-based DL transmission occurs prior to UL transmission.

Referring to FIG. 38, the AP may generate FDR indication information on that the FDR can be performed, and may transmit an FDR MU PPDU to the STA1 by including the FDR indication information. The FDR MU PPDU may be generated by directly using an HE MU PPDU.

Since the procedure of FIG. 38 operates with symmetric FDR, the STA1 may receive both a control field and data field of the FDR MU PPDU. The STA1 which has received the FDR MU PPDU transmits an FDR TB PPDU after a time period corresponding to a gap. The FDR TB PPDU may be generated by directly using the HE TB PPDU. That is, the FDR MU PPDU and the FDR TB PPDU are transmitted and received based on the FDR. In this case, a legacy preamble and a signal field may be omitted in the FDR TB PPDU.

The STA1 requires a time until the FDR TB PPDU is generated after receiving and decoding a control field of the FDR MU PPDU. Therefore, the STA1 may transmit the FDR TB PPDU to the AP after a time period corresponding to the gap elapses from first timing of receiving the FDR MU PPDU. The time period corresponding to the gap may be, for example, SIFS or DIFS. In addition, the FDR MU PPDU and the FDR TB PPDU may be transmitted with different RUs to reduce interference caused by FDR.

The FDR MU PPDU and FDR TB PPDU will be described below in detail with reference to FIG. 42.

Figure 39:
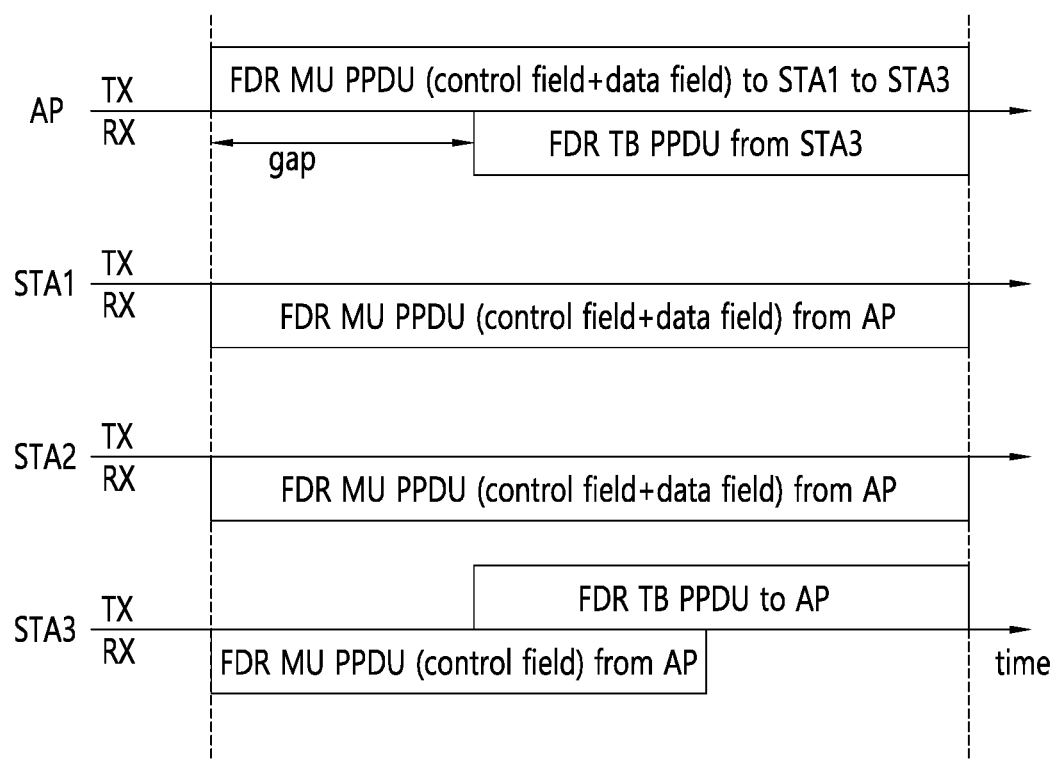
FIG. 39 illustrates a procedure according to which DL primary transmission and UL secondary transmission are performed based on asymmetric FDR according to the present embodiment.

FIG. 39 illustrates a procedure according to which DL primary transmission and UL secondary transmission are performed based on asymmetric FDR according to the present embodiment.

FIG. 39 illustrates asymmetric FDR in which FDR-based DL transmission occurs between an AP and an STA1 or STA2 and FDR-based UL transmission occurs between the AP and an STA3. In addition, FIG. 39 illustrates an example in which FDR-based DL transmission occurs prior to UL transmission.

Referring to FIG. 39, the AP may generate FDR indication information on that the FDR can be performed, and may transmit an FDR MU PPDU to the STA1 to the STA3 by including the FDR indication information. The FDR MU PPDU may be generated by directly using an HE MU PPDU.

Since the procedure of FIG. 39 operates with asymmetric FDR, the STA3 may receive only a control field of the FDR MU PPDU, and a (DL) data field for the STA3 is not allocated and is not received. The STA3 which has received the FDR MU PPDU transmits an FDR TB PPDU after a time period corresponding to a gap. The FDR TB PPDU may be generated by directly using the HE TB PPDU. In this case, the AP transmits the DL data field included in the FDR MU PPDU to the STA1 and the STA2. That is, the FDR MU PPDU transmitted to the STA1 and STA2 and the FDR TB PPDU transmitted by the STA3 are transmitted and received based on the FDR. In this case, a legacy preamble and a signal field may be omitted in the FDR TB PPDU.

The STA3 requires a time until the FDR TB PPDU is generated after receiving and decoding a control field of the FDR MU PPDU. Therefore, the STA3 may transmit the FDR TB PPDU to the AP after a time period corresponding to the gap elapses from first timing of receiving the FDR MU PPDU. The time period corresponding to the gap may be, for example, SIFS or DIFS. In addition, the FDR MU PPDU and the FDR TB PPDU may be transmitted with different RUs to reduce interference caused by FDR.

The FDR MU PPDU and FDR TB PPDU will be described below in detail with reference to FIG. 42.

Figure 40:
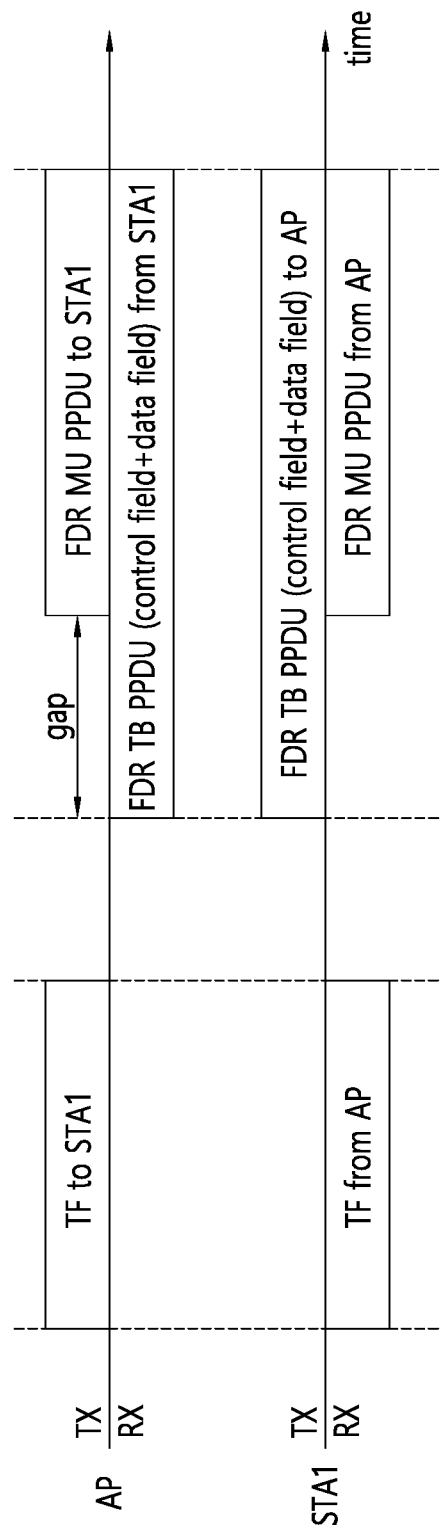
FIG. 40 illustrates a procedure according to which UL primary transmission and DL secondary transmission are performed based on symmetric FDR according to the present embodiment.

FIG. 40 illustrates a procedure according to which UL primary transmission and DL secondary transmission are performed based on symmetric FDR according to the present embodiment.

FIG. 40 illustrates symmetric FDR in which FDR-based transmission and reception occur only in an AP and an STA1. In addition, FIG. 40 illustrates an example in which FDR-based DL transmission occurs prior to UL transmission.

Referring to FIG. 40, the AP may generate FDR indication information on that FDR can be performed, and may first transmit a trigger frame by including the FDR indication information.

The STA1 may transmit an FDR TB PPDU to the AP, based on the trigger frame. The FDR TB PPDU may be generated by directly using the HE TB PPDU. In addition, the FDR TB PPDU includes both a control field and a data field.

The AP transmits the FDR MU PPDU to the STA1 after a time period corresponding to a gap from a timing of receiving the FDR TB PPDU. The FDR MU PPDU may be generated by directly using the HE MU PPDU. That is, the FDR TB PPDU and the FDR MU PPDU are transmitted and received based on the FDR. In this case, a legacy preamble and a signal field may be omitted in the FDR MU PPDU.

The AP requires a time until the FDR MU PPDU is generated after receiving and decoding a control field of the FDR TB PPDU. Therefore, the AP may transmit the FDR MU PPDU to the STA1 after a time period corresponding to the gap elapses from first timing of receiving the FDR TB PPDU. The time period corresponding to the gap may be, for example, SIFS or DIFS. In addition, the FDR MU PPDU and the FDR TB PPDU may be transmitted with different RUs to reduce interference caused by FDR.

The FDR TB PPDU and FDR MU PPDU will be described below in detail with reference to FIG. 43.

Figure 41:
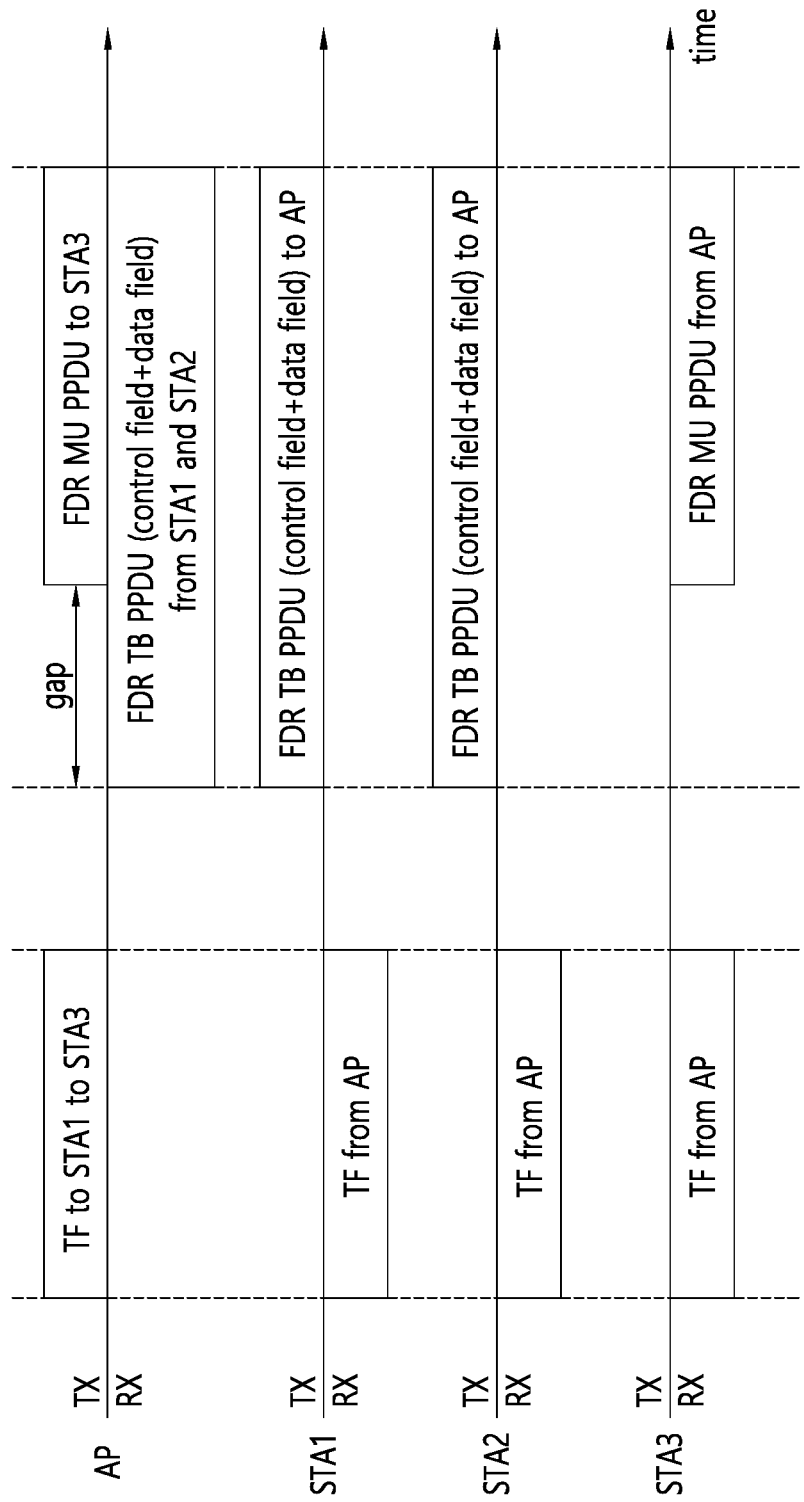
FIG. 41 illustrates a procedure according to which UL primary transmission and DL secondary transmission are performed based on asymmetric FDR according to the present embodiment.

FIG. 41 illustrates a procedure according to which UL primary transmission and DL secondary transmission are performed based on asymmetric FDR according to the present embodiment.

FIG. 41 illustrates asymmetric FDR in which FDR-based DL transmission occurs between an AP and an STA1 or STA2 and FDR-based UL transmission occurs between the AP and an STA3. In addition, FIG. 41 illustrates an example in which FDR-based DL transmission occurs prior to UL transmission.

Referring to FIG. 41, the AP may generate FDR indication information on that FDR can be performed, and may first transmit a trigger frame to the STA1 to the STA3 by including the FDR indication information.

The STA1 and the STA2 may transmit an FDR TB PPDU to the AP, based on the trigger frame. The FDR TB PPDU may be generated by directly using the HE TB PPDU. In addition, the FDR TB PPDU includes both a control field and a data field.

The AP transmits the FDR MU PPDU to the STA3 after a time period corresponding to a gap from a timing of receiving the FDR TB PPDU. The FDR MU PPDU may be generated by directly using the HE MU PPDU. In this case, the STA1 and the ST2 transmit a UL data field included in the FDR TB PPDU. That is, the FDR TB PPDU transmitted by the STA1 and STA2 and the FDR MU PPDU transmitted by the AP are transmitted and received based on the FDR. In this case, a legacy preamble and a signal field may be omitted in the FDR MU PPDU.

The AP requires a time until the FDR MU PPDU is generated after receiving and decoding a control field of the FDR TB PPDU. Therefore, the AP may transmit the FDR MU PPDU to the STA3 after a time period corresponding to the gap elapses from first timing of receiving the FDR TB PPDU. The time period corresponding to the gap may be, for example, SIFS or DIFS. In addition, the FDR MU PPDU and the FDR TB PPDU may be transmitted with different RUs to reduce interference caused by FDR.

The FDR TB PPDU and FDR MU PPDU will be described below in detail with reference to FIG. 43.

Figure 42:
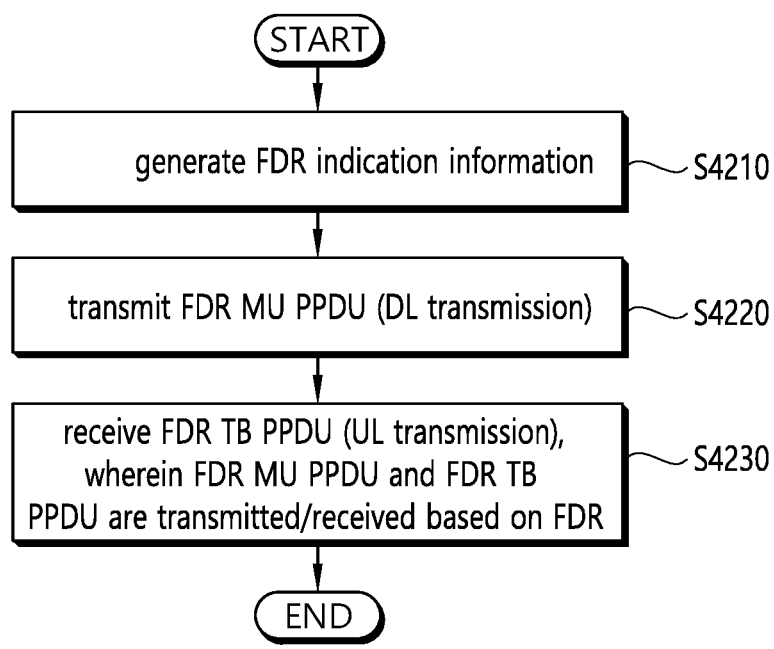
FIG. 42 is a flow diagram illustrating a procedure according to which DL primary transmission and UL secondary transmission are performed based on FDR in an AP according to the present embodiment.

FIG. 42 is a flow diagram illustrating a procedure according to which DL primary transmission and UL secondary transmission are performed based on FDR in an AP according to the present embodiment.

An example of FIG. 42 may be performed in a network environment in which a next-generation WLAN system is supported. The next-generation WLAN system is a WLAN system evolved from an 802.11ax system, and may satisfy backward compatibility with the 802.11ax system.

To summarize the terms, an HE MU PPDU, an HE TB PPDU, an HE SU PPDU, an HE-SIG-A field, an HE-SIG-B field, an HE-STF field, and an HE-LTF field may all be PPDUs and fields defined in the 802.11ax system. An FDR MU PPDU, an FDR TB PPDU, an FDR-SIG-A field (first signal field), an FDR-SIG-B field (second signal field), an FDR-STF field, and an FDR-LTF field may be PPDUs and fields defined in the next-generation WLAN system to perform FDR. An FDR-SIG-C field (third signal field) may be a signal field newly defined in the next-generation WLAN system to perform FDR. However, the PPDU and field defined to perform FDR may be generated by directly using the HE PPDU and HE field to satisfy backward compatibility with the 802.11ax system. A trigger frame is a (MAC)

frame defined in the 802.11ax system, and a field may be added or changed to perform FDR.

An example of FIG. 42 may be performed in a transmitting device, and the transmitting device may correspond to an AP. A receiving device of FIG. 42 may correspond to an STA (non AP STA) having FDR capability. In addition, the example of FIG. 42 may include both a symmetric FDR operation and an asymmetric FDR operation.

In step S4210, the AP generates FDR indication information on that the FDR can be performed.

In step S4220, the AP transmits a downlink (DL) PPDU including the FDR indication information to a first STA. The DL PPDU may be generated by using/based on a high efficiency multi user PPDU (HE MU PPDU). That is, the DL PPDU may be an FDR MU PPDU generated by reusing the HE MU PPDU.

In step S4230, the AP receives an uplink (UL) PPDU from the first STA. The UL PPDU may be generated by using/based on a high efficiency trigger-based PPDU (HE TB PPDU). That is, the UL PPDU may be an FDR TB PPDU generated by using/based on the HE TB PPDU. In this case, the DL PPDU and the UL PPDU are transmitted/received based on the FDR.

Regarding DL primary transmission, the DL PPDU may include a legacy signal field, a first signal field, a second signal field, a third signal field, and a DL data field. The legacy signal field may be related to a legacy-signal (L-SIG) field or repeated legacy signal (RL-SIG) field included in the HE MU PPDU. The first signal field may be related to an HE-SIG-A field included in the HE MU PPDU. The first signal field is defined to perform an FDR operation, and thus may be named as an FDR-SIG-A field. The second signal field may be related to an HE-SIG-B field included in the HE MU PPDU. The second signal field is defined to perform the FDR operation, and thus may be named as an FDR-SIG-B field. The DL data field may be related to data received by an STA through a configured RU during MU DL transmission.

The second signal field includes information on a resource unit (RU) layout in a full frequency band and allocation information on a first RU to which the DL data field is allocated. The information on the RU layout and the allocation information on the first RU may be an 8-bit RU allocation subfield for RU allocation as shown in Table 9 above. The information on the RU layout and the allocation information on the first RU may be included in a common field of the second signal field.

The third signal field includes allocation information on a second RU to which the UL PPDU is allocated based on the information on the RU layout. This case is an embodiment in which a field of an HE MU PPDU is reused in the DL PPDU, and the third signal field is additionally inserted to generate a PPDU. The third signal field is newly defined to perform an FDR operation, and thus may be named as an FDR-SIG-C field. The allocation information on the second RU may be included in a common field of the third signal field.

Allocation information on the second RU included in the third signal field is described in detail in the present embodiment.

The allocation information on the second RU includes a bitmap regarding whether the UL PPDU is allocated in unit of 26RU. The information on the RU layout may be configured with 8 bits. The bitmap may be configured with 9 bits for 20 MHz. Each 1 bit of the bitmap may include allocation information on the UL PPDU for each 26RU within 20 MHz.

For example, it is assumed that information on the RU layout included in the common field of the second signal field is '01110000' (8 bits). According to the 8-bit RU allocation subfield as shown in Table 9 above, the bitmap '01110000' includes RU layout information on that four 52RUs are used in the full frequency band (herein, 20 MHz is assumed). That is, if the information on the RU layout is 01110000, the full frequency band may be arranged with four 52RUs.

In a state where the information on the RU layout is known, it is assumed that the bitmap included in the common field of the third signal field is '001100011' (9 bits). The bitmap '001100011' includes information on that third and fourth 26RUs and eighth and ninth 26RUs are allocated for the UL PPDU in the full frequency band. However, since it is known through the information (01110000) for the RU layout that the full frequency band is configured with not nine 26RUs but four 52RUs, the bitmap '001100011' may be interpreted as information on that a second 52RU and a fourth 52RU are allocated for the UL PPDU in the full frequency band.

Accordingly, a location of the second RU (the order of 56RU to which to-be-allocated RU corresponds) may be confirmed based on the bitmap, and a size of the second RU (a size of the to-be-allocated RU is 56RU) may be confirmed based on the information on the RU layout.

The bitmap may use 9 bits per 20 MHz. Therefore, the bitmap may be configured with 9 bits when the full frequency band is 20 MHz. The bitmap may be configured with 18 bits when the full frequency band is 40 MHz. The bitmap may be configured with 37 bits when the full frequency band is 80 MHz. The bitmap may be configured with 74 bits when the full frequency band is 160 MHz.

Information on an identifier of an STA for transmitting a DL PPDU may be included in a user-specific field of the second signal field. Information on an identifier of an STA for transmitting a UL PPDU and information on a transmitting timing of the UL PPDU may be included in a user-specific field of the third signal field.

In this case, the second RU is an RU remaining after excluding the first RU from the full frequency band. That is, the present embodiment proposes a method of performing FDR in such a manner that the DL PPDU is transmitted through a specific RU and the UL PPDU is received through another RU except for the specific RU.

Specifically, the DL data field may be transmitted through the first RU. The UL PPDU may be received through the second RU, based on the third signal field. The identifier of the STA for transmitting the UL PPDU may include an identifier of the first STA. The DL PPDU may be preferentially transmitted over the UL PPDU (DL primary transmission and UL secondary transmission). The DL PPDU and the UL PPDU may be transmitted and received simultaneously after a transmitting timing of the UL PPDU.

The information on the identifier of the STA for transmitting the UL PPDU may be configured with an 11-bit STA identifier (ID), a 9-bit partial association ID (PAID), or a 12-bit association ID (AID). That is, a specific STA for transmitting a UL PPDU may be indicated by using/based on one of the aforementioned three methods.

Allocation information on the second RU may be configured with a bitmap consisting of 1 bit per 26RU. That is, by using/based on 26RU as a minimum unit, a bit may be set to 1 if a UL PPDU is transmitted in each 26RU, and the bit may be set to 0 if the UL PPDU is not transmitted.

The information on the transmission timing of the UL PPDU may include a length to a transmission timing of the UL PPDU after the third signal field or a length to a transmission timing of the UL PPDU after the legacy signal field. In particular, the transmitting timing of the UL PPDU may be indicated by directly using a rate field and length field type of L-SIG, or may be indicated by directly using a 7-bit TXOP field used in HE-SIG-A in the user field, or may be indicated on a symbol basis by using/based on a specific bit and substituting a specific symbol count to each bit.

The FDR indication information may be included in the legacy signal field, the first signal field, or the second signal field.

Regarding UL secondary transmission, the UL PPDU may include only a high efficiency-short training field (HE-STF) field, high efficiency-long training field (HE-LTF) field, and UL data field included in the HE TB PPDU. That is, the UL PPDU may be configured by reusing the HE TB PPDU or by omitting (excluding) the legacy preamble and the FDR-SIG-A. Accordingly, the DL PPDU (FDR MU PPDU) is completely divided in frequency (completely divided into a first RU and a second RU), so as to be less affected by interference caused by FDR.

In addition, if the second RU is 20 MHz or 40 MHz, the UL PPDU may be generated by using/based on a high efficiency single user PPDU (HE SU PPDU). Since the entire band is used for UL transmission, transmission may be performed by using/based on the HE SU PPDU. The UL PPDU may include only an HE-STF field, HE-LTF field, and UL data field included in the HE SU PPDU. That is, the UL PPDU may be configured by reusing the HE SU PPDU or by omitting (excluding) the legacy preamble and the FDR-SIG-A. Accordingly, the DL PPDU (FDR MU PPDU) is completely divided in frequency (completely divided into a first RU and a second RU), so as to be less affected by interference caused by FDR.

Figure 43:
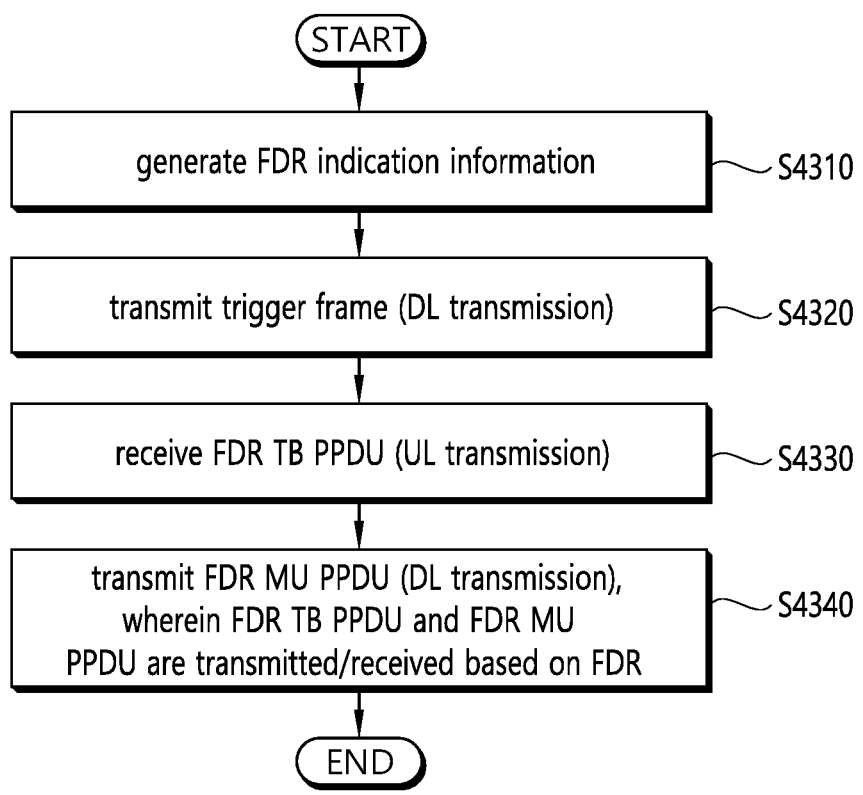
FIG. 43 is a flow diagram illustrating a procedure according to which UL primary transmission and DL secondary transmission are performed based on FDR in an AP according to the present embodiment.

FIG. 43 is a flow diagram illustrating a procedure according to which UL primary transmission and DL secondary transmission are performed based on FDR in an AP according to the present embodiment.

An example of FIG. 43 may be performed in a network environment in which a next-generation WLAN system is supported. The next-generation WLAN system is a WLAN system evolved from an 802.11ax system, and may satisfy backward compatibility with the 802.11ax system.

To summarize the terms, an HE MU PPDU, an HE TB PPDU, an HE SU PPDU, an HE-SIG-A field, an HE-SIG-B field, an HE-STF field, and an HE-LTF field may all be PPDUs and fields defined in the 802.11ax system. An FDR MU PPDU, an FDR TB PPDU, an FDR-SIG-A field (first signal field), an FDR-SIG-B field (second signal field), an FDR-STF field, and an FDR-LTF field may be PPDUs and fields defined in the next-generation WLAN system to perform FDR. An FDR-SIG-C field (third signal field) may be a signal field newly defined in the next-generation WLAN system to perform FDR. However, the PPDU and field defined to perform FDR may be generated by directly using the HE PPDU and HE field to satisfy backward compatibility with the 802.11ax system. A trigger frame is a (MAC) frame defined in the 802.11ax system, and a field may be added or changed to perform FDR.

An example of FIG. 43 may be performed in a transmitting device, and the transmitting device may correspond to an AP. A receiving device of FIG. 43 may correspond to an STA (non AP STA) having FDR capability. In addition, the example of FIG. 43 may include both a symmetric FDR operation and an asymmetric FDR operation.

In step S4310, an access point (AP) generate FDR indication information on that the FDR can be performed.

In step S4320, the AP transmits a trigger frame to a plurality of STAs including a first STA. The FDR indication information may be included in the trigger frame (or a common info field of the trigger frame).

In step S4330, the AP may receive a trigger-based PPDU (UL PPCU) from an STA capable of performing UL transmission. The STA capable of performing the UL transmission may be included in a first STA. The trigger-based PPDU may be generated by using/based on a high efficiency trigger-based PPDU (HE TB PPDU). That is, the trigger-based PPDU may be an FDR TB PPDU generated by reusing the HE TB PPDU. The FDR indication information may be included in the trigger-based PPCU.

In step S4340, the AP transmits the DL PPDU to the first STA. The DL PPDU may be generated by using/based on a high efficiency multi user PPDU (HE MU PPDU). That is, the DL PPCU may be an FDR MU PPDU generated by reusing the HE MU PPDU. In this case, the trigger-based PPDU (UL PPDU) is transmitted/received based on the FDR.

Regarding UL primary transmission, the trigger frame may allocate a resource for UL MU transmission (it is assumed as a first RU). Accordingly, the STA capable of performing UL transmission may transmit a trigger-based PPDU to the AP.

That is, the trigger-based PPDU may include a legacy signal field, a first signal field, and a UL data field. The legacy signal field may be related to a legacy-signal (L-SIG) field or repeated legacy-signal (RL-SIG) field included in the HE TB PPDU. The first signal field may be related to ah HE-SIG-A field included in the HE TB PPDU. The first signal field is defined to perform an FDR operation, and thus may be named as an FDR-SIG-A field. The UL data field may be related to data transmitted by the STA through a configured RU, based on UL MU transmission.

The trigger frame includes allocation information on a first resource unit (RU) to which the UL data field is allocated. The allocation information on the first RU may be the common info field 950.

In addition, the trigger frame may further include indication information for transmission of a DL PPDU. That is, the trigger frame includes allocation information on a second RU to which the DL PPDU is allocated, information on an identifier of an STA for transmitting the DL PPDU, and information on transmission timing of the DL PPDU.

In this case, the second RU may be an RU remaining after excluding the first RU from the entire band. That is, the present embodiment proposes a method of performing FDR in such a manner that a UL PPDU is received first through a specific RU and a DL PPDU is transmitted through another RU except for the specific RU.

Specifically, the UL data field may be transmitted through the first RU. The trigger-based PPDU may be received through the first RU, based on the trigger frame. An identifier of an STA for receiving the DL PPDU may include an identifier of the first STA. The UL PPDU may be preferentially transmitted over the DL PPDU (UL primary transmission and DL secondary transmission). The UL PPDU and the DL PPDU may be transmitted and received simultaneously after a transmitting timing of the DL PPDU.

The information on the identifier of the STA for receiving the DL PPDU may be included in an FDR-RA field which is a new definition of an RA field of the trigger frame. The FDR-RA field may have a size of 6 octets similarly to the RA field of the existing trigger frame, and may indicate a specific STA for receiving the DL PPDU.

The allocation information on the second RU and the information on transmission timing of the DL PPDU may be included in an FDR user info field which is a new definition of the user info field of the trigger frame. The FDR user info field may have a size of at least 5 octets similarly to the user info field of the existing trigger frame.

That is, the trigger frame may be newly defined to perform FDR. That is, the trigger frame may include a UL (or priority) RA field, UL (or primary) common info field, and UL (or primary) user info field for primary UL transmission. In addition, the trigger frame may further include a DL (or secondary) RA field, DL (or secondary) common Info field, and DL (or secondary) user info field for secondary DL transmission. That is, the trigger frame may be used to control both UL transmission and DL transmission in which FDR is performed.

Likewise, allocation information on the second RU may be configured with a bitmap consisting of 1 bit per 26RU. That is, by using/based on 26RU as a minimum unit, a bit may be set to 1 if a DL PPDU is transmitted in each 26RU, and the bit may be set to 0 if the DL PPDU is not transmitted. Accordingly, the bitmap may be configured with 9 bits when the full frequency band is 20 MHz (there are 9 26-RUs). The bitmap may be configured with 18 bits when the full frequency band is 40 MHz (there are nine 18 26-RUs). The bitmap may be configured with 37 bits when the full frequency band is 80 MHz (there are 37 26-RUs). The bitmap may be configured with 74 bits when the full frequency band is 160 MHz (there are 74 26-RUs).

In particular, the transmitting timing of the DL PPDU may be indicated by directly using a rate field and length field type of L-SIG, or may be indicated by directly using a 7-bit TXOP field used in HE-SIG-A in the user field, or may be indicated on a symbol basis by using/based on a specific bit and substituting a specific symbol count to each bit.

In addition, allocation information on the second RU may be included in a common info field of the trigger frame. The common info field of the trigger frame may further include indication information whether the DL PPDU will be transmitted through an RU allocated based on allocation information on the first RU. That is, the indication information related to the DL PPDU transmission may be additionally included in the common info field of the trigger frame.

Regarding DL secondary transmission, the DL PPDU may include only a high efficiency-short training field (HE-STF) field, high efficiency-long training field (HE-LTF) field, and DL data field included in the HE MU PPDU. That is, the UL PPDU may be configured by reusing the HE MU PPDU or by omitting (excluding) the legacy preamble and the FDR-SIG-A. Accordingly, the UL PPDU (FDR TB PPDU) is completely divided in frequency (completely divided into a first RU and a second RU), so as to be less affected by interference caused by FDR.

In addition, if the second RU is 20 MHz or 40 MHz, the DL PPDU may be generated by using/based on a high efficiency single user PPDU (HE SU PPDU). Since the entire band is used for DL transmission, transmission may be performed by using/based on the HE SU PPDU. The DL PPDU may include only an HE-STF field, HE-LTF field, and DL data field included in the HE SU PPDU. That is, the DL PPDU may be configured by reusing the HE SU PPDU or by omitting (excluding) the legacy preamble and the FDR-SIG-A. Accordingly, the UL PPDU (FDR TB PPDU) is completely divided in frequency (completely divided into a first RU and a second RU), so as to be less affected by interference caused by FDR.

Figure 44:
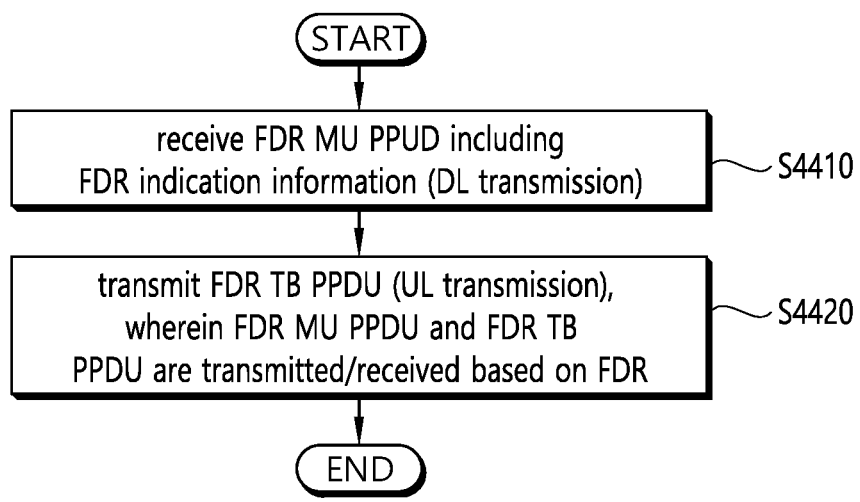
FIG. 44 is a flow diagram illustrating a procedure according to which DL primary transmission and UL secondary transmission are performed based on FDR in an STA according to the present embodiment.

FIG. 44 is a flow diagram illustrating a procedure according to which DL primary transmission and UL secondary transmission are performed based on FDR in an STA according to the present embodiment.

An example of FIG. 44 may be performed in a network environment in which a next-generation WLAN system is supported. The next-generation WLAN system is a WLAN system evolved from an 802.11ax system, and may satisfy backward compatibility with the 802.11ax system.

To summarize the terms, an HE MU PPDU, an HE TB PPDU, an HE SU PPDU, an HE-SIG-A field, an HE-SIG-B field, an HE-STF field, and an HE-LTF field may all be PPDUs and fields defined in the 802.11ax system. An FDR MU PPDU, an FDR TB PPDU, an FDR-SIG-A field (first signal field), an FDR-SIG-B field (second signal field), an FDR-STF field, and an FDR-LTF field may be PPDUs and fields defined in the next-generation WLAN system to perform FDR. An FDR-SIG-C field (third signal field) may be a signal field newly defined in the next-generation WLAN system to perform FDR. However, the PPDU and field defined to perform FDR may be generated by directly using the HE PPDU and HE field to satisfy backward compatibility with the 802.11ax system. A trigger frame is a (MAC) frame defined in the 802.11ax system, and a field may be added or changed to perform FDR.

The example of FIG. 44 may be performed in a receiving device, and the receiving device may correspond to an STA (non AP STA). In addition, the example of FIG. 44 may include both a symmetric FDR operation and an asymmetric FDR operation.

In step S4410, the STA receives a downlink (DL) PPDU (FDR MU PPDU) including the FDR indication information to a first STA. The DL PPDU may be generated by using/based on a high efficiency multi user PPDU (HE MU PPDU). That is, the DL PPDU may be an FDR MU PPDU generated by reusing the HE MU PPDU.

In step S4420, the STA transmits an uplink (UL) PPDU (FDR TB PPDU) to the AP. The UL PPDU may be generated by using/based on a high efficiency trigger-based PPDU (HE TB PPDU). That is, the UL PPDU may be an FDR TB PPDU generated by using/based on the HE TB PPDU. In this case, the DL PPDU and the UL PPDU are transmitted/received based on the FDR.

Regarding DL primary transmission, the DL PPDU may include a legacy signal field, a first signal field, a second signal field, a third signal field, and a DL data field. The legacy signal field may be related to a legacy-signal (L-SIG) field or repeated legacy signal (RL-SIG) field included in the HE MU PPDU. The first signal field may be related to an HE-SIG-A field included in the HE MU PPDU. The first signal field is defined to perform an FDR operation, and thus may be named as an FDR-SIG-A field. The second signal field may be related to an HE-SIG-B field included in the HE MU PPDU. The second signal field is defined to perform the FDR operation, and thus may be named as an FDR-SIG-B field. The DL data field may be related to data received by an STA through a configured RU during MU DL transmission.

The second signal field includes information on a resource unit (RU) layout in a full frequency band and allocation information on a first RU to which the DL data field is allocated. The information on the RU layout and the allocation information on the first RU may be an 8-bit RU allocation subfield for RU allocation as shown in Table 9 above. The information on the RU layout and the allocation information on the first RU may be included in a common field of the second signal field.

The third signal field includes allocation information on a second RU to which the UL PPDU is allocated based on the information on the RU layout. This case is an embodiment in which a field of an HE MU PPDU is reused in the DL PPDU, and the third signal field is additionally inserted to generate a PPDU. The third signal field is newly defined to perform an FDR operation, and thus may be named as an FDR-SIG-C field. The allocation information on the second RU may be included in a common field of the third signal field.

Allocation information on the second RU included in the third signal field is described in detail in the present embodiment.

The allocation information on the second RU includes a bitmap regarding whether the UL PPDU is allocated in unit of 26RU. The information on the RU layout may be configured with 8 bits. The bitmap may be configured with 9 bits for 20 MHz. Each 1 bit of the bitmap may include allocation information on the UL PPDU for each 26RU within 20 MHz.

For example, it is assumed that information on the RU layout included in the common field of the second signal field is '01110000' (8 bits). According to the 8-bit RU allocation subfield as shown in Table 9 above, the bitmap '01110000' includes RU layout information on that four 52RUs are used in the full frequency band (herein, 20 MHz is assumed). That is, if the information on the RU layout is 01110000, the full frequency band may be arranged with four 52RUs.

In a state where the information on the RU layout is known, it is assumed that the bitmap included in the common field of the third signal field is '001100011' (9 bits). The bitmap '001100011' includes information on that third and fourth 26RUs and eighth and ninth 26RUs are allocated for the UL PPDU in the full frequency band. However, since it is known through the information (01110000) for the RU layout that the full frequency band is configured with not nine 26RUs but four 52RUs, the bitmap '001100011' may be interpreted as information on that a second 52RU and a fourth 52RU are allocated for the UL PPDU in the full frequency band.

Accordingly, a location of the second RU (the order of 56RU to which to-be-allocated RU corresponds) may be confirmed based on the bitmap, and a size of the second RU (a size of the to-be-allocated RU is 56RU) may be confirmed based on the information on the RU layout.

The bitmap may use 9 bits per 20 MHz. Therefore, the bitmap may be configured with 9 bits when the full frequency band is 20 MHz. The bitmap may be configured with 18 bits when the full frequency band is 40 MHz. The bitmap may be configured with 37 bits when the full frequency band is 80 MHz. The bitmap may be configured with 74 bits when the full frequency band is 160 MHz.

Information on an identifier of an STA for transmitting a DL PPDU may be included in a user-specific field of the second signal field. Information on an identifier of an STA for transmitting a UL PPDU and information on a transmitting timing of the UL PPDU may be included in a user-specific field of the third signal field.

In this case, the second RU is an RU remaining after excluding the first RU from the full frequency band. That is, the present embodiment proposes a method of performing FDR in such a manner that the DL PPDU is transmitted through a specific RU and the UL PPDU is received through another RU except for the specific RU.

Specifically, the DL data field may be transmitted through the first RU. The UL PPDU may be received through the second RU, based on the third signal field. The identifier of the STA for transmitting the UL PPDU may include an identifier of the first STA. The DL PPDU may be preferentially transmitted over the UL PPDU (DL primary transmission and UL secondary transmission). The DL PPDU and the UL PPDU may be transmitted and received simultaneously after a transmitting timing of the UL PPDU.

The information on the identifier of the STA for transmitting the UL PPDU may be configured with an 11-bit STA identifier (ID), a 9-bit partial association ID (PAID), or a 12-bit association ID (AID). That is, a specific STA for transmitting a UL PPDU may be indicated by using/based on one of the aforementioned three methods.

Allocation information on the second RU may be configured with a bitmap consisting of 1 bit per 26RU. That is, by using/based on 26RU as a minimum unit, a bit may be set to 1 if a UL PPDU is transmitted in each 26RU, and the bit may be set to 0 if the UL PPDU is not transmitted.

The information on the transmission timing of the UL PPDU may include a length to a transmission timing of the UL PPDU after the third signal field or a length to a transmission timing of the UL PPDU after the legacy signal field. In particular, the transmitting timing of the UL PPDU may be indicated by directly using a rate field and length field type of L-SIG, or may be indicated by directly using a 7-bit TXOP field used in HE-SIG-A in the user field, or may be indicated on a symbol basis by using/based on a specific bit and substituting a specific symbol count to each bit.

The FDR indication information may be included in the legacy signal field, the first signal field, or the second signal field.

Regarding UL secondary transmission, the UL PPDU may include only a high efficiency-short training field (HE-STF) field, high efficiency-long training field (HE-LTF) field, and UL data field included in the HE TB PPDU. That is, the UL PPDU may be configured by reusing the HE TB PPDU or by omitting (excluding) the legacy preamble and the FDR-SIG-A. Accordingly, the DL PPDU (FDR MU PPDU) is completely divided in frequency (completely divided into a first RU and a second RU), so as to be less affected by interference caused by FDR.

In addition, if the second RU is 20 MHz or 40 MHz, the UL PPDU may be generated by using/based on a high efficiency single user PPDU (HE SU PPDU). Since the entire band is used for UL transmission, transmission may be performed by using/based on the HE SU PPDU. The UL PPDU may include only an HE-STF field, HE-LTF field, and UL data field included in the HE SU PPDU. That is, the UL PPDU may be configured by reusing the HE SU PPDU or by omitting (excluding) the legacy preamble and the FDR-SIG-A. Accordingly, the DL PPDU (FDR MU PPDU) is completely divided in frequency (completely divided into a first RU and a second RU), so as to be less affected by interference caused by FDR.

Figure 45:
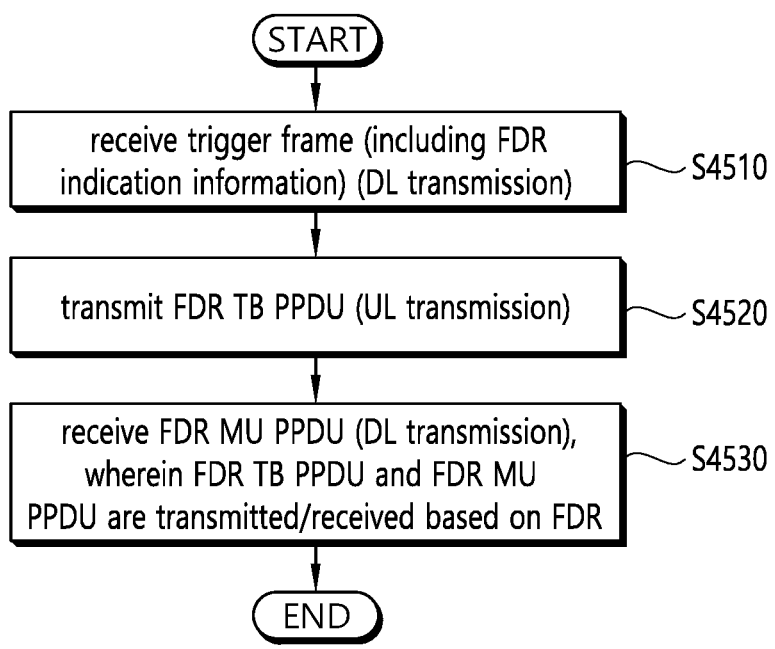
FIG. 45 is a flow diagram illustrating a procedure according to which UL primary transmission and DL secondary transmission are performed based on FDR in an STA according to the present embodiment.

FIG. 45 is a flow diagram illustrating a procedure according to which UL primary transmission and DL secondary transmission are performed based on FDR in an STA according to the present embodiment.

An example of FIG. 45 may be performed in a network environment in which a next-generation WLAN system is supported. The next-generation WLAN system is a WLAN system evolved from an 802.11ax system, and may satisfy backward compatibility with the 802.11ax system.

To summarize the terms, an HE MU PPDU, an HE TB PPDU, an HE SU PPDU, an HE-SIG-A field, an HE-SIG-B field, an HE-STF field, and an HE-LTF field may all be PPDUs and fields defined in the 802.11ax system. An FDR MU PPDU, an FDR TB PPDU, an FDR-SIG-A field (first signal field), an FDR-SIG-B field (second signal field), an FDR-STF field, and an FDR-LTF field may be PPDUs and fields defined in the next-generation WLAN system to perform FDR. An FDR-SIG-C field (third signal field) may be a signal field newly defined in the next-generation WLAN system to perform FDR. However, the PPDU and field defined to perform FDR may be generated by directly using the HE PPDU and HE field to satisfy backward compatibility with the 802.11ax system. A trigger frame is a (MAC) frame defined in the 802.11ax system, and a field may be added or changed to perform FDR.

The example of FIG. 45 may be performed in a receiving device, and the receiving device may correspond to an STA (non AP STA). In addition, the example of FIG. 45 may include both a symmetric FDR operation and an asymmetric FDR operation.

In step S4510, the STA receives a trigger frame including FDR indication information on that the FDR can be performed. The FDR indication information may be included in a common info field of the trigger frame.

In step S4520, the STA may transmit the trigger-based PPDU (UL PPDU). The trigger-based PPDU may be generated by using/based on a high efficiency trigger-based PPDU (HE TB PPDU). That is, the trigger-based PPDU may be an FDR TB PPDU generated by reusing the HE TB PPDU. The FDR indication information may be included in the trigger-based PPCU.

In step S4530, the STA receives a DL PPDU from the AP. The DL PPDU may be generated by using/based on a high efficiency multi user PPDU (HE MU PPDU). That is, the DL PPDU may be an FDR MU PPDU generated by reusing the HE MU PPDU. In this case, the trigger-based PPDU (UL PPDU) and the DL PPCU are transmitted/received based on the FDR.

Regarding UL primary transmission, the trigger frame may allocate a resource for UL MU transmission (it is assumed as a first RU). Accordingly, the STA capable of performing UL transmission may transmit a trigger-based PPDU to the AP.

That is, the trigger-based PPDU may include a legacy signal field, a first signal field, and a UL data field. The legacy signal field may be related to a legacy-signal (L-SIG) field or repeated legacy-signal (RL-SIG) field included in the HE TB PPDU. The first signal field may be related to ah HE-SIG-A field included in the HE TB PPDU. The first signal field is defined to perform an FDR operation, and thus may be named as an FDR-SIG-A field. The UL data field may be related to data transmitted by the STA through a configured RU, based on UL MU transmission.

The trigger frame includes allocation information on a first resource unit (RU) to which the UL data field is allocated. The allocation information on the first RU may be the common info field 950.

In addition, the trigger frame may further include indication information for transmission of a DL PPDU. That is, the trigger frame includes allocation information on a second RU to which the DL PPDU is allocated, information on an identifier of an STA for transmitting the DL PPDU, and information on transmission timing of the DL PPDU.

In this case, the second RU may be an RU remaining after excluding the first RU from the entire band. That is, the present embodiment proposes a method of performing FDR in such a manner that a UL PPDU is received first through a specific RU and a DL PPDU is transmitted through another RU except for the specific RU.

Specifically, the UL data field may be transmitted through the first RU. The trigger-based PPDU may be received through the first RU, based on the trigger frame. An identifier of an STA for receiving the DL PPDU may include an identifier of the first STA. The UL PPDU may be preferentially transmitted over the DL PPDU (UL primary transmission and DL secondary transmission). The UL PPDU and the DL PPDU may be transmitted and received simultaneously after a transmitting timing of the DL PPDU.

The information on the identifier of the STA for receiving the DL PPDU may be included in an FDR-RA field which is a new definition of an RA field of the trigger frame. The FDR-RA field may have a size of 6 octets similarly to the RA field of the existing trigger frame, and may indicate a specific STA for receiving the DL PPDU.

The allocation information on the second RU and the information on transmission timing of the DL PPDU may be included in an FDR user info field which is a new definition of the user info field of the trigger frame. The FDR user info field may have a size of at least 5 octets similarly to the user info field of the existing trigger frame.

That is, the trigger frame may be newly defined to perform FDR. That is, the trigger frame may include a UL (or priority) RA field, UL (or primary) common info field, and UL (or primary) user info field for primary UL transmission. In addition, the trigger frame may further include a DL (or secondary) RA field, DL (or secondary) common Info field, and DL (or secondary) user info field for secondary DL transmission. That is, the trigger frame may be used to control both UL transmission and DL transmission in which FDR is performed.

Likewise, allocation information on the second RU may be configured with a bitmap consisting of 1 bit per 26RU. That is, by using/based on 26RU as a minimum unit, a bit may be set to 1 if a DL PPDU is transmitted in each 26RU, and the bit may be set to 0 if the DL PPDU is not transmitted. Accordingly, the bitmap may be configured with 9 bits when the full frequency band is 20 MHz (there are 9 26-RUs). The bitmap may be configured with 18 bits when the full frequency band is 40 MHz (there are nine 18 26-RUs). The bitmap may be configured with 37 bits when the full frequency band is 80 MHz (there are 37 26-RUs). The bitmap may be configured with 74 bits when the full frequency band is 160 MHz (there are 74 26-RUs).

In particular, the transmitting timing of the DL PPDU may be indicated by directly using a rate field and length field type of L-SIG, or may be indicated by directly using a 7-bit TXOP field used in HE-SIG-A in the user field, or may be indicated on a symbol basis by using/based on a specific bit and substituting a specific symbol count to each bit.

In addition, allocation information on the second RU may be included in a common info field of the trigger frame. The common info field of the trigger frame may further include indication information whether the DL PPDU will be transmitted through an RU allocated based on allocation information on the first RU. That is, the indication information related to the DL PPDU transmission may be additionally included in the common info field of the trigger frame.

Regarding DL secondary transmission, the DL PPDU may include only a high efficiency-short training field (HE-STF) field, high efficiency-long training field (HE-LTF) field, and DL data field included in the HE MU PPDU. That is, the UL PPDU may be configured by reusing the HE MU PPDU or by omitting (excluding) the legacy preamble and the FDR-SIG-A. Accordingly, the UL PPDU (FDR TB PPDU) is completely divided in frequency (completely divided into a first RU and a second RU), so as to be less affected by interference caused by FDR.

In addition, if the second RU is 20 MHz or 40 MHz, the DL PPDU may be generated by using/based on a high efficiency single user PPDU (HE SU PPDU). Since the entire band is used for DL transmission, transmission may be performed by using/based on the HE SU PPDU. The DL PPDU may include only an HE-STF field, HE-LTF field, and DL data field included in the HE SU PPDU. That is, the DL PPDU may be configured by reusing the HE SU PPDU or by omitting (excluding) the legacy preamble and the FDR-SIG-A. Accordingly, the UL PPDU (FDR TB PPDU) is completely divided in frequency (completely divided into a first RU and a second RU), so as to be less affected by interference caused by FDR.

3. Device Configuration

Figure 46:
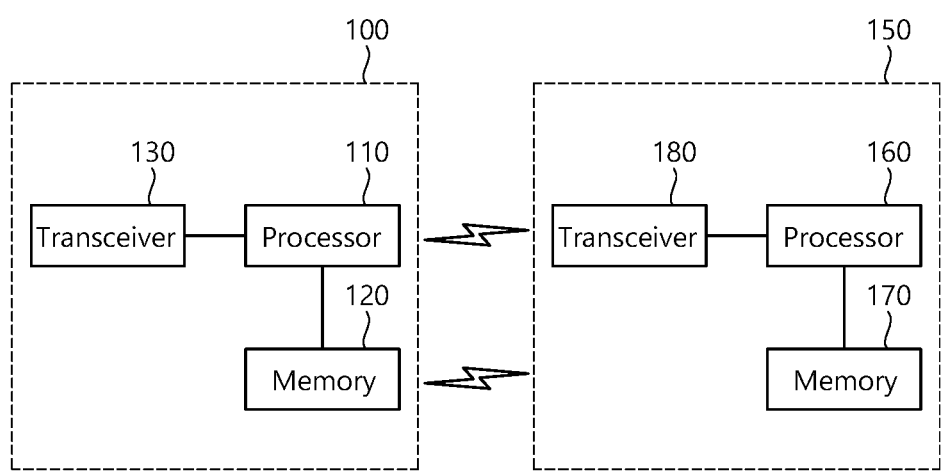
FIG. 46 illustrates a device implementing the method described above.

FIG. 46 is a diagram describing a device for implementing the above-described method.

A wireless device (100) of FIG. 46 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present disclosure, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor 110, 160 may implement the functions, processes and/or methods proposed in the present disclosure. For example, the processor 110, 160 may perform the operation according to the present embodiment.

Specifically, an operation of the processor 110 of the transmitting device is as follows. The processor 110 of the transmitting device generates FDR indication information on that the FDR can be performed, and transmits a downlink (DL) PPDU including the FDR indication information to a first station (STA). In addition, the processor 110 of the transmitting device receives an uplink (UL) PPDU from the first STA. In this case, the DL PPDU and the UL PPDU are transmitted/received based on the FDR.

Specifically, an operation of the processor 160 of the receiving device is as follows. The processor 160 of the receiving device receives a downlink (DL) PPDU including FDR indication information on that the FDR can be performed, and transmits an uplink (UL) PPDU to the AP. In this case, the DL PPDU and the UL PPDU are transmitted/received based on the FDR.

A method of transmitting the PPDU based on the FDR will be described in detail as follows.

Regarding DL primary transmission, the DL PPDU may include a legacy signal field, a first signal field, a second signal field, a third signal field, and a DL data field. The legacy signal field may be related to a legacy-signal (L-SIG) field or repeated legacy signal (RL-SIG) field included in the HE MU PPDU. The first signal field may be related to an HE-SIG-A field included in the HE MU PPDU. The first signal field is defined to perform an FDR operation, and thus may be named as an FDR-SIG-A field. The second signal field may be related to an HE-SIG-B field included in the HE MU PPDU. The second signal field is defined to perform the FDR operation, and thus may be named as an FDR-SIG-B field. The DL data field may be related to data received by an STA through a configured RU during MU DL transmission.

The second signal field includes information on a resource unit (RU) layout in a full frequency band and allocation information on a first RU to which the DL data field is allocated. The information on the RU layout and the allocation information on the first RU may be an 8-bit RU allocation subfield for RU allocation as shown in Table 9 above. The information on the RU layout and the allocation information on the first RU may be included in a common field of the second signal field.

The third signal field includes allocation information on a second RU to which the UL PPDU is allocated based on the information on the RU layout. This case is an embodiment in which a field of an HE MU PPDU is reused in the DL PPDU, and the third signal field is additionally inserted to generate a PPDU. The third signal field is newly defined to perform an FDR operation, and thus may be named as an FDR-SIG-C field. The allocation information on the second RU may be included in a common field of the third signal field.

Allocation information on the second RU included in the third signal field is described in detail in the present embodiment.

The allocation information on the second RU includes a bitmap regarding whether the UL PPDU is allocated in unit of 26RU. The information on the RU layout may be configured with 8 bits. The bitmap may be configured with 9 bits for 20 MHz. Each 1 bit of the bitmap may include allocation information on the UL PPDU for each 26RU within 20 MHz.

For example, it is assumed that information on the RU layout included in the common field of the second signal field is '01110000' (8 bits). According to the 8-bit RU allocation subfield as shown in Table 9 above, the bitmap '01110000' includes RU layout information on that four 52RUs are used in the full frequency band (herein, 20 MHz is assumed). That is, if the information on the RU layout is 01110000, the full frequency band may be arranged with four 52RUs.

In a state where the information on the RU layout is known, it is assumed that the bitmap included in the common field of the third signal field is '001100011' (9 bits). The bitmap '001100011' includes information on that third and fourth 26RUs and eighth and ninth 26RUs are allocated for the UL PPDU in the full frequency band. However, since it is known through the information (01110000) for the RU layout that the full frequency band is configured with not nine 26RUs but four 52RUs, the bitmap '001100011' may be interpreted as information on that a second 52RU and a fourth 52RU are allocated for the UL PPDU in the full frequency band.

Accordingly, a location of the second RU (the order of 56RU to which to-be-allocated RU corresponds) may be confirmed based on the bitmap, and a size of the second RU (a size of the to-be-allocated RU is 56RU) may be confirmed based on the information on the RU layout.

The bitmap may use 9 bits per 20 MHz. Therefore, the bitmap may be configured with 9 bits when the full frequency band is 20 MHz. The bitmap may be configured with 18 bits when the full frequency band is 40 MHz. The bitmap may be configured with 37 bits when the full frequency band is 80 MHz. The bitmap may be configured with 74 bits when the full frequency band is 160 MHz.

Information on an identifier of an STA for transmitting a DL PPDU may be included in a user-specific field of the second signal field. Information on an identifier of an STA for transmitting a UL PPDU and information on a transmitting timing of the UL PPDU may be included in a user-specific field of the third signal field.

In this case, the second RU is an RU remaining after excluding the first RU from the full frequency band. That is, the present embodiment proposes a method of performing FDR in such a manner that the DL PPDU is transmitted through a specific RU and the UL PPDU is received through another RU except for the specific RU.

Specifically, the DL data field may be transmitted through the first RU. The UL PPDU may be received through the second RU, based on the third signal field. The identifier of the STA for transmitting the UL PPDU may include an identifier of the first STA. The DL PPDU may be preferentially transmitted over the UL PPDU (DL primary transmission and UL secondary transmission). The DL PPDU and the UL PPDU may be transmitted and received simultaneously after a transmitting timing of the UL PPDU.

The information on the identifier of the STA for transmitting the UL PPDU may be configured with an 11-bit STA identifier (ID), a 9-bit partial association ID (PAID), or a 12-bit association ID (AID). That is, a specific STA for transmitting a UL PPDU may be indicated by using/based on one of the aforementioned three methods.

Allocation information on the second RU may be configured with a bitmap consisting of 1 bit per 26RU. That is, by using/based on 26RU as a minimum unit, a bit may be set to 1 if a UL PPDU is transmitted in each 26RU, and the bit may be set to 0 if the UL PPDU is not transmitted.

The information on the transmission timing of the UL PPDU may include a length to a transmission timing of the UL PPDU after the third signal field or a length to a transmission timing of the UL PPDU after the legacy signal field. In particular, the transmitting timing of the UL PPDU may be indicated by directly using a rate field and length field type of L-SIG, or may be indicated by directly using a 7-bit TXOP field used in HE-SIG-A in the user field, or may be indicated on a symbol basis by using/based on a specific bit and substituting a specific symbol count to each bit.

The FDR indication information may be included in the legacy signal field, the first signal field, or the second signal field.

Regarding UL secondary transmission, the UL PPDU may include only a high efficiency-short training field (HE-STF) field, high efficiency-long training field (HE-LTF) field, and UL data field included in the HE TB PPDU. That is, the UL PPDU may be configured by reusing the HE TB PPDU or by omitting (excluding) the legacy preamble and the FDR-SIG-A. Accordingly, the DL PPDU (FDR MU PPDU) is completely divided in frequency (completely divided into a first RU and a second RU), so as to be less affected by interference caused by FDR.

In addition, if the second RU is 20 MHz or 40 MHz, the UL PPDU may be generated by using/based on a high efficiency single user PPDU (HE SU PPDU). Since the entire band is used for UL transmission, transmission may be performed by using/based on the HE SU PPDU. The UL PPDU may include only an HE-STF field, HE-LTF field, and UL data field included in the HE SU PPDU. That is, the UL PPDU may be configured by reusing the HE SU PPDU or by omitting (excluding) the legacy preamble and the FDR-SIG-A. Accordingly, the DL PPDU (FDR MU PPDU) is completely divided in frequency (completely divided into a first RU and a second RU), so as to be less affected by interference caused by FDR.

What is claimed is:

1. A method of transmitting and receiving a physical layer protocol data unit (PPDU) based on full-duplex radio (FDR) in a wireless local area network (WLAN) system, the method comprising:
   generating, by an access point (AP), FDR indication information on that the FDR can be performed;
   transmitting, by the AP, a downlink (DL) PPDU comprising the FDR indication information to a first station (STA); and
   receiving, by the AP, an uplink (UL) PPDU from the first STA,
   wherein the DL PPDU comprises a legacy signal field, a first signal field, a second signal field, a third signal field, and a DL data field,
   wherein the second signal field comprises information on a resource unit (RU) layout in a full frequency band and allocation information on a first RU to which the DL data field is allocated,
   wherein the third signal field comprises allocation information on a second RU to which the UL PPDU is allocated based on the information on the RU layout,
   wherein the second RU is an RU remaining after excluding the first RU from the full frequency band,
   wherein the allocation information on the second RU comprises a bitmap regarding whether the UL PPDU is allocated in unit of 26RU, and
   wherein the DL PPDU and the UL PPDU are transmitted/received based on the FDR.

2. The method of claim 1,
   wherein the information on the RU layout and the allocation information on the first RU are comprised in a common field of the second signal field,
   wherein the allocation information on the second RU is comprised in a common field of the third signal field,
   wherein the information on the RU layout is configured with 8 bits,
   wherein the bitmap is configured with 9 bits for 20 MHz, and
   wherein each 1 bit of the bitmap comprises allocation information on the UL PPDU for each 26RU within 20 MHz.

3. The method of claim 2,
wherein a location of the second RU is confirmed based on the bitmap, and
wherein a size of the second RU is confirmed based on the information on the RU layout.

4. The method of claim 2,
wherein the bitmap is configured with 9 bits when the full frequency band is 20 MHz,
wherein the bitmap is configured with 18 bits when the full frequency band is 40 MHz,
wherein the bitmap is configured with 37 bits when the full frequency band is 80 MHz, and
wherein the bitmap is configured with 74 bits when the full frequency band is 160 MHz.

5. The method of claim 1,
wherein information on an identifier of an STA for transmitting the DL PPDU is comprised in a user-specific field of the second signal field, and
wherein information on an identifier of an STA for transmitting the UL PPDU and information on a transmitting timing of the UL PPDU are comprised in a user-specific field of the third signal field.

6. The method of claim 5,
wherein the DL data field is transmitted through the first RU,
wherein the UL PPDU is received through the second RU, based on the third signal field,
wherein the identifier of the STA for transmitting the UL PPDU comprises an identifier of the first STA,
wherein the DL PPDU is transmitted preferentially over the UL PPDU, and
wherein the DL PPDU and the UL PPDU are simultaneously transmitted/received after the transmitting timing of the UL PPDU.

7. The method of claim 5, wherein the information on the identifier of the STA for transmitting the UL PPDU is configured with an 11-bit STA identifier (ID), a 9-bit partial association ID (PAID), or a 12-bit association ID (AID).

8. The method of claim 4, wherein the information on the transmission timing of the UL PPDU comprises a length to a transmission timing of the UL PPDU after the third signal field or a length to a transmission timing of the UL PPDU after the legacy signal field.

9. The method of claim 1, wherein the FDR indication information is comprised in the legacy signal field, the first signal field, or the second signal field.

10. The method of claim 1,
wherein the DL PPDU is generated by using a high efficiency multi user PPDU (HE MU PPDU),
wherein the legacy signal field is related to a legacy-signal (L-SIG) field or repeated legacy signal (RL-SIG) field comprised in the HE MU PPDU,
wherein the first signal field is related to an HE-SIG-A field comprised in the HE MU PPDU,
wherein the second signal field is related to an HE-SIG-B field comprised in the HE MU PPDU,
wherein the UL PPDU is generated by using a high efficiency trigger-based PPDU (HE TB PPDU), and
wherein the UL PPDU comprises only a high efficiency-short training field (HE-STF) field, high efficiency-long training field (HE-LTF) field, and UL data field included in the HE TB PPDU.

11. A wireless device of an access point (AP) for transmitting/receiving a physical layer protocol data unit (PPDU) based on full-duplex radio (FDR) in a wireless local area network (WLAN) system, the wireless device comprising:
a transceiver transmitting or receiving a radio signal; and
a processor controlling the transceiver, wherein the processor is configured to:
generate FDR indication information on that the FDR can be performed;
transmit a downlink (DL) PPDU comprising the FDR indication information to a first station (STA); and
receive an uplink (UL) PPDU from the first STA,
wherein the DL PPDU comprises a legacy signal field, a first signal field, a second signal field, a third signal field, and a DL data field,
wherein the second signal field comprises information on a resource unit (RU) layout in a full frequency band and allocation information on a first RU to which the DL data field is allocated,
wherein the third signal field comprises allocation information on a second RU to which the UL PPDU is allocated based on the information on the RU layout,
wherein the second RU is an RU remaining after excluding the first RU from the full frequency band,
wherein the allocation information on the second RU comprises a bitmap regarding whether the UL PPDU is allocated in unit of 26RU, and
wherein the DL PPDU and the UL PPDU are transmitted/received based on the FDR.

12. The wireless device of claim 11,
wherein the information on the RU layout and the allocation information on the first RU are comprised in a common field of the second signal field,
wherein the allocation information on the second RU is comprised in a common field of the third signal field,
wherein the information on the RU layout is configured with 8 bits,
wherein the bitmap is configured with 9 bits for 20 MHz, and
wherein each 1 bit of the bitmap comprises allocation information on the UL PPDU for each 26RU within 20 MHz.

13. The wireless device of claim 12,
wherein a location of the second RU is confirmed based on the bitmap, and
wherein a size of the second RU is confirmed based on the information on the RU layout.

14. The wireless device of claim 12,
wherein the bitmap is configured with 9 bits when the full frequency band is 20 MHz,
wherein the bitmap is configured with 18 bits when the full frequency band is 40 MHz,
wherein the bitmap is configured with 37 bits when the full frequency band is 80 MHz, and
wherein the bitmap is configured with 74 bits when the full frequency band is 160 MHz.

15. The wireless device of claim 11,
wherein information on an identifier of an STA for transmitting the DL PPDU is comprised in a user-specific field of the second signal field, and
wherein information on an identifier of an STA for transmitting the UL PPDU and information on a transmitting timing of the UL PPDU are comprised in a user-specific field of the third signal field.

16. A method of transmitting and receiving a physical layer protocol data unit (PPDU) based on full-duplex radio (FDR) in a wireless local area network (WLAN) system, the method comprising:
  receiving, by a first station (STA), a downlink (DL) PPDU comprising FDR indication information on that the FDR can be performed, from an access point (AP); and
  transmitting, by the first STA, an uplink (UL) PPDU to the AP,
  wherein the DL PPDU comprises a legacy signal field, a first signal field, a second signal field, a third signal field, and a DL data field,
  wherein the second signal field comprises information on a resource unit (RU) layout in a full frequency band and allocation information on a first RU to which the DL data field is allocated,
  wherein the third signal field comprises allocation information on a second RU to which the UL PPDU is allocated based on the information on the RU layout,
  wherein the second RU is an RU remaining after excluding the first RU from the full frequency band,
  wherein the allocation information on the second RU comprises a bitmap regarding whether the UL PPDU is allocated in unit of 26RU, and
  wherein the DL PPDU and the UL PPDU are transmitted/received based on the FDR.

* * * * *